US009239673B2

(12) United States Patent
Shaffer et al.

(10) Patent No.: US 9,239,673 B2
(45) Date of Patent: Jan. 19, 2016

(54) GESTURING WITH A MULTIPOINT SENSING DEVICE

(75) Inventors: Joshua H. Shaffer, San Jose, CA (US); Steven P. Hotelling, Los Gatos, CA (US); Myra Haggerty, San Mateo, CA (US); Nima Parivar, South San Francisco, CA (US); Duncan Robert Kerr, San Francisco, CA (US); Wayne Westerman, Burlingame, CA (US)

(73) Assignee: Apple Inc., Cupertino, CA (US)

(*) Notice: Subject to any disclaimer, the term of this patent is extended or adjusted under 35 U.S.C. 154(b) by 457 days.

(21) Appl. No.: 13/610,672

(22) Filed: Sep. 11, 2012

(65) Prior Publication Data

US 2013/0241847 A1     Sep. 19, 2013

Related U.S. Application Data

(63) Continuation-in-part of application No. 11/700,636, filed on Jan. 30, 2007, and a continuation-in-part of application No. 10/903,964, filed on Jul. 30, 2004, now Pat. No. 8,479,122, and a continuation-in-part of application No. 11/015,434, filed on Dec. 17, 2004, now Pat. No. 7,339,580, which is a continuation of application No. 09/236,513, filed on Jan. 25, 1999, now Pat. No. 6,323,846.

(60) Provisional application No. 60/763,605, filed on Jan. 30, 2006, provisional application No. 60/072,509, filed on Jan. 26, 1998.

(51) Int. Cl.
*G06F 3/033* (2013.01)
*G06F 3/0488* (2013.01)
*G06F 3/038* (2013.01)

(52) U.S. Cl.
CPC .............. *G06F 3/0488* (2013.01); *G06F 3/038* (2013.01); *G06F 3/04883* (2013.01); *G06F 2203/0381* (2013.01); *G06F 2203/04808* (2013.01)

(58) Field of Classification Search
None
See application file for complete search history.

(56) References Cited

U.S. PATENT DOCUMENTS

| 3,333,160 A | 7/1967 | Gorski |
| 3,541,541 A | 11/1970 | Englebart |
| 3,609,695 A | 9/1971 | Pirkle |
| 3,662,105 A | 5/1972 | Hurst et al. |
| 3,748,751 A | 7/1973 | Breglia et al. |
| 3,757,322 A | 9/1973 | Barkan et al. |
| 3,798,370 A | 3/1974 | Hurst |

(Continued)

FOREIGN PATENT DOCUMENTS

| CA | 1243096 | 10/1988 |
| CN | 1326564 A | 12/2001 |

(Continued)

OTHER PUBLICATIONS

International Search Report mailed Dec. 4, 2013, for PCT Application No. PCT/US2013/059314, filed Sep. 11, 2013, six pages.

(Continued)

*Primary Examiner* — Stephen Alvesteffer
(74) *Attorney, Agent, or Firm* — Morrison & Foerster LLP

(57) ABSTRACT

Methods and systems for implementing gestures with sensing devices are disclosed. More particularly, methods and systems related to gesturing with multipoint sensing devices are disclosed.

16 Claims, 50 Drawing Sheets

(56) References Cited

U.S. PATENT DOCUMENTS

| | | |
|---|---|---|
| 3,825,730 A | 7/1974 | Worthington, Jr. et al. |
| 3,846,826 A | 11/1974 | Mueller |
| 4,014,000 A | 3/1977 | Uno et al. |
| 4,017,848 A | 4/1977 | Tannas, Jr. |
| 4,146,924 A | 3/1979 | Birk et al. |
| 4,202,041 A | 5/1980 | Kaplow et al. |
| 4,219,847 A | 8/1980 | Pinkney et al. |
| 4,246,452 A | 1/1981 | Chandler |
| 4,303,856 A | 12/1981 | Serras-Paulet |
| 4,305,071 A | 12/1981 | Bell et al. |
| 4,305,131 A | 12/1981 | Best |
| 4,346,376 A | 8/1982 | Mallos |
| 4,375,674 A | 3/1983 | Thornton |
| 4,396,945 A | 8/1983 | DiMatteo et al. |
| 4,435,835 A | 3/1984 | Sakow et al. |
| 4,475,122 A | 10/1984 | Green |
| 4,484,179 A | 11/1984 | Kasday |
| 4,542,375 A | 9/1985 | Alles et al. |
| 4,550,221 A | 10/1985 | Mabusth |
| 4,561,017 A | 12/1985 | Greene |
| 4,613,942 A | 9/1986 | Chen |
| 4,629,319 A | 12/1986 | Clarke et al. |
| 4,631,525 A | 12/1986 | Serravalle, Jr. |
| 4,631,676 A | 12/1986 | Pugh |
| 4,644,100 A | 2/1987 | Brenner et al. |
| 4,644,326 A | 2/1987 | Villalobos et al. |
| 4,654,872 A | 3/1987 | Hisano et al. |
| 4,672,364 A | 6/1987 | Lucas |
| 4,672,558 A | 6/1987 | Beckes et al. |
| 4,686,374 A | 8/1987 | Liptay-Wagner et al. |
| 4,692,809 A | 9/1987 | Beining et al. |
| 4,695,827 A | 9/1987 | Reining et al. |
| 4,703,306 A | 10/1987 | Barritt |
| 4,710,760 A | 12/1987 | Kasday |
| 4,733,222 A | 3/1988 | Evans |
| 4,734,685 A | 3/1988 | Watanabe |
| 4,746,770 A | 5/1988 | McAvinney |
| 4,763,356 A | 8/1988 | Day, Jr. et al. |
| 4,771,276 A | 9/1988 | Parks |
| 4,772,028 A | 9/1988 | Rockhold et al. |
| 4,787,040 A | 11/1988 | Ames et al. |
| 4,788,384 A | 11/1988 | Bruere-Dawson et al. |
| 4,806,846 A | 2/1989 | Kerber |
| 4,814,759 A | 3/1989 | Gombrich et al. |
| 4,853,888 A | 8/1989 | Lata et al. |
| 4,898,555 A | 2/1990 | Sampson |
| 4,914,624 A | 4/1990 | Dunthorn |
| 4,948,371 A | 8/1990 | Hall |
| 4,968,877 A | 11/1990 | McAvinney et al. |
| 4,988,981 A | 1/1991 | Zimmerman et al. |
| 4,993,806 A | 2/1991 | Clausen et al. |
| 5,003,519 A | 3/1991 | Noirjean |
| 5,017,030 A | 5/1991 | Crews |
| 5,038,401 A | 8/1991 | Inotsume |
| 5,045,843 A | 9/1991 | Hansen |
| 5,045,846 A | 9/1991 | Gay et al. |
| 5,060,135 A | 10/1991 | Levine et al. |
| 5,072,294 A | 12/1991 | Engle |
| 5,119,079 A | 6/1992 | Hube et al. |
| 5,148,155 A | 9/1992 | Martin et al. |
| 5,153,829 A | 10/1992 | Furuya et al. |
| 5,168,531 A | 12/1992 | Sigel |
| 5,178,477 A | 1/1993 | Gambaro |
| 5,189,403 A | 2/1993 | Franz et al. |
| 5,194,862 A | 3/1993 | Edwards |
| 5,212,555 A | 5/1993 | Stoltz |
| 5,224,861 A | 7/1993 | Glass et al. |
| 5,227,985 A | 7/1993 | DeMenthon |
| 5,241,308 A | 8/1993 | Young |
| 5,252,951 A | 10/1993 | Tannenbaum et al. |
| 5,260,697 A | 11/1993 | Barrett et al. |
| 5,281,966 A | 1/1994 | Walsh |
| 5,297,041 A | 3/1994 | Kushler et al. |
| 5,305,017 A | 4/1994 | Gerpheide |
| 5,319,386 A | 6/1994 | Gunn et al. |
| 5,328,190 A | 7/1994 | Dart et al. |
| 5,345,543 A | 9/1994 | Capps et al. |
| 5,347,295 A | 9/1994 | Agulnick et al. |
| 5,347,629 A | 9/1994 | Barrett et al. |
| 5,363,051 A | 11/1994 | Jenstrom et al. |
| 5,367,453 A | 11/1994 | Capps et al. |
| 5,376,948 A | 12/1994 | Roberts |
| 5,379,057 A | 1/1995 | Clough et al. |
| 5,398,310 A | 3/1995 | Tchao et al. |
| 5,412,189 A | 5/1995 | Cragun |
| 5,418,760 A | 5/1995 | Kawashima et al. |
| 5,422,656 A | 6/1995 | Allard et al. |
| 5,442,742 A | 8/1995 | Greyson et al. |
| 5,459,793 A | 10/1995 | Naoi et al. |
| 5,463,388 A | 10/1995 | Boie et al. |
| 5,463,696 A | 10/1995 | Beernink et al. |
| 5,463,725 A | 10/1995 | Henckel et al. |
| 5,471,578 A | 11/1995 | Moran et al. |
| 5,479,528 A | 12/1995 | Speeter |
| 5,483,261 A | 1/1996 | Yasutake |
| 5,488,204 A | 1/1996 | Mead et al. |
| 5,495,077 A | 2/1996 | Miller et al. |
| 5,495,269 A | 2/1996 | Elrod et al. |
| 5,495,576 A | 2/1996 | Ritchey |
| 5,502,514 A | 3/1996 | Vogeley et al. |
| 5,510,806 A | 4/1996 | Busch |
| 5,511,148 A | 4/1996 | Wellner |
| 5,513,309 A | 4/1996 | Meier et al. |
| 5,515,079 A | 5/1996 | Hauck |
| 5,523,775 A | 6/1996 | Capps |
| 5,530,455 A | 6/1996 | Gillick et al. |
| 5,530,456 A | 6/1996 | Kokubo |
| 5,543,590 A | 8/1996 | Gillespie et al. |
| 5,543,591 A | 8/1996 | Gillespie et al. |
| 5,548,667 A | 8/1996 | Tu |
| 5,559,301 A | 9/1996 | Bryan, Jr. et al. |
| 5,563,632 A | 10/1996 | Roberts |
| 5,563,996 A | 10/1996 | Tchao |
| 5,565,658 A | 10/1996 | Gerpheide et al. |
| 5,568,604 A | 10/1996 | Hansen |
| 5,570,113 A * | 10/1996 | Zetts ................ G06F 3/04883 345/156 |
| 5,572,239 A | 11/1996 | Jaeger |
| 5,572,647 A | 11/1996 | Blades |
| 5,579,036 A | 11/1996 | Yates, IV |
| 5,581,243 A | 12/1996 | Ouellette et al. |
| 5,581,681 A | 12/1996 | Tchao et al. |
| 5,583,946 A | 12/1996 | Gourdol |
| 5,589,856 A | 12/1996 | Stein et al. |
| 5,590,219 A | 12/1996 | Gourdol |
| 5,592,566 A | 1/1997 | Pagallo et al. |
| 5,594,469 A | 1/1997 | Freeman et al. |
| 5,594,810 A | 1/1997 | Gourdol |
| 5,596,694 A | 1/1997 | Capps |
| 5,612,719 A | 3/1997 | Beernink et al. |
| 5,613,913 A | 3/1997 | Ikematsu et al. |
| 5,625,715 A | 4/1997 | Trew et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,642,108 A | 6/1997 | Gopher et al. |
| 5,644,657 A | 7/1997 | Capps et al. |
| 5,649,706 A | 7/1997 | Treat, Jr. et al. |
| 5,666,113 A | 9/1997 | Logan |
| 5,666,502 A | 9/1997 | Capps |
| 5,666,552 A | 9/1997 | Greyson et al. |
| 5,675,361 A | 10/1997 | Santilli |
| 5,675,362 A | 10/1997 | Clough et al. |
| 5,677,710 A | 10/1997 | Thompson-Rohrlich |
| 5,689,253 A | 11/1997 | Hargreaves et al. |
| 5,689,667 A | 11/1997 | Kurtenbach |
| 5,709,219 A | 1/1998 | Chen et al. |
| 5,710,844 A | 1/1998 | Capps et al. |
| 5,711,624 A | 1/1998 | Klauber |
| 5,712,661 A | 1/1998 | Jaeger |
| 5,726,685 A | 3/1998 | Kuth et al. |
| 5,729,249 A | 3/1998 | Yasutake |
| 5,729,250 A | 3/1998 | Bishop et al. |

(56) References Cited

U.S. PATENT DOCUMENTS

| | | |
|---|---|---|
| 5,730,165 A | 3/1998 | Philipp |
| 5,736,974 A | 4/1998 | Selker |
| 5,736,975 A | 4/1998 | Lunetta |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,745,719 A | 4/1998 | Falcon |
| 5,746,818 A | 5/1998 | Yatake |
| 5,748,184 A | 5/1998 | Shieh |
| 5,748,269 A | 5/1998 | Harris et al. |
| 5,748,512 A | 5/1998 | Vargas |
| 5,764,222 A | 6/1998 | Shieh |
| 5,764,818 A | 6/1998 | Capps et al. |
| 5,767,457 A | 6/1998 | Gerpheide et al. |
| 5,767,842 A | 6/1998 | Korth |
| 5,777,603 A | 7/1998 | Jaeger |
| 5,790,104 A | 8/1998 | Shieh |
| 5,790,107 A | 8/1998 | Kasser et al. |
| 5,798,760 A | 8/1998 | Vayda et al. |
| 5,801,941 A | 9/1998 | Bertram |
| 5,802,516 A | 9/1998 | Shwarts et al. |
| 5,805,145 A | 9/1998 | Jaeger |
| 5,805,146 A | 9/1998 | Jaeger et al. |
| 5,805,167 A | 9/1998 | Van Cruyningen |
| 5,808,567 A | 9/1998 | McCloud |
| 5,808,605 A | 9/1998 | Shieh |
| 5,809,267 A | 9/1998 | Moran et al. |
| 5,818,451 A | 10/1998 | Bertram et al. |
| 5,821,690 A | 10/1998 | Martens et al. |
| 5,821,930 A | 10/1998 | Hansen |
| 5,823,782 A | 10/1998 | Marcus et al. |
| 5,825,232 A | 10/1998 | Kimura |
| 5,825,308 A | 10/1998 | Rosenberg |
| 5,825,351 A | 10/1998 | Tam |
| 5,825,352 A | 10/1998 | Bisset et al. |
| 5,831,601 A | 11/1998 | Vogeley et al. |
| 5,835,079 A | 11/1998 | Shieh |
| 5,841,428 A | 11/1998 | Jaeger et al. |
| 5,844,506 A | 12/1998 | Binstead |
| 5,844,547 A | 12/1998 | Minakuchi et al. |
| 5,850,218 A | 12/1998 | LaJoie et al. |
| 5,854,625 A | 12/1998 | Frisch et al. |
| 5,859,631 A | 1/1999 | Bergman et al. |
| 5,867,149 A | 2/1999 | Jaeger |
| 5,870,091 A | 2/1999 | Lazarony et al. |
| 5,871,251 A | 2/1999 | Welling et al. |
| 5,874,948 A | 2/1999 | Shieh |
| 5,877,751 A | 3/1999 | Kanemitsu et al. |
| 5,880,411 A | 3/1999 | Gillespie et al. |
| 5,883,619 A | 3/1999 | Ho et al. |
| 5,886,697 A | 3/1999 | Naughton et al. |
| 5,898,434 A | 4/1999 | Small et al. |
| 5,900,876 A | 5/1999 | Yagita et al. |
| 5,910,800 A | 6/1999 | Shields et al. |
| 5,920,309 A | 7/1999 | Bisset et al. |
| 5,923,319 A | 7/1999 | Bishop et al. |
| 5,933,134 A | 8/1999 | Shieh |
| 5,933,141 A | 8/1999 | Smith |
| 5,936,613 A | 8/1999 | Jaeger et al. |
| 5,943,043 A | 8/1999 | Furuhata et al. |
| 5,943,044 A | 8/1999 | Martinelli et al. |
| 5,943,052 A | 8/1999 | Allen et al. |
| 5,949,345 A | 9/1999 | Beckert et al. |
| 5,956,291 A | 9/1999 | Nehemiah et al. |
| 5,956,822 A | 9/1999 | Brieden et al. |
| 5,963,671 A | 10/1999 | Comerford et al. |
| 5,974,541 A | 10/1999 | Hall et al. |
| 5,977,867 A | 11/1999 | Blouin |
| 5,982,302 A | 11/1999 | Ure |
| 5,982,352 A | 11/1999 | Pryor |
| 5,982,353 A | 11/1999 | Gallery et al. |
| 5,982,355 A | 11/1999 | Jaeger et al. |
| 5,995,101 A | 11/1999 | Clark et al. |
| 5,995,104 A | 11/1999 | Kataoka et al. |
| 5,995,106 A | 11/1999 | Naughton et al. |
| 5,999,895 A | 12/1999 | Forest |
| 6,002,389 A | 12/1999 | Kasser |
| 6,002,808 A | 12/1999 | Freeman |
| 6,005,549 A | 12/1999 | Forest |
| 6,005,555 A | 12/1999 | Katsurahira et al. |
| 6,008,800 A | 12/1999 | Pryor |
| 6,013,956 A | 1/2000 | Anderson, Jr. |
| 6,020,881 A | 2/2000 | Naughton et al. |
| 6,028,271 A | 2/2000 | Gillespie et al. |
| 6,031,469 A | 2/2000 | Dodd |
| 6,031,524 A | 2/2000 | Kunert |
| 6,034,685 A | 3/2000 | Kuriyama et al. |
| 6,037,882 A | 3/2000 | Levy |
| 6,040,824 A | 3/2000 | Maekawa et al. |
| 6,049,326 A | 4/2000 | Beyda et al. |
| 6,049,328 A | 4/2000 | Vanderheiden |
| 6,050,825 A | 4/2000 | Nichol et al. |
| 6,052,339 A | 4/2000 | Frenkel et al. |
| 6,054,984 A | 4/2000 | Alexander |
| 6,054,990 A | 4/2000 | Tran |
| 6,057,540 A | 5/2000 | Gordon et al. |
| 6,057,845 A | 5/2000 | Dupouy |
| 6,061,177 A | 5/2000 | Fujimoto |
| 6,066,075 A | 5/2000 | Poulton |
| 6,072,494 A | 6/2000 | Nguyen |
| 6,073,036 A | 6/2000 | Heikkinen et al. |
| 6,075,531 A | 6/2000 | DeStefano |
| 6,084,576 A | 7/2000 | Leu et al. |
| 6,094,197 A | 7/2000 | Buxton et al. |
| 6,104,384 A | 8/2000 | Moon et al. |
| 6,105,419 A | 8/2000 | Michels et al. |
| 6,107,997 A | 8/2000 | Ure |
| 6,128,003 A | 10/2000 | Smith et al. |
| 6,130,665 A | 10/2000 | Ericsson |
| 6,131,299 A | 10/2000 | Raab et al. |
| 6,135,958 A | 10/2000 | Mikula-Curtis et al. |
| 6,144,380 A | 11/2000 | Shwarts et al. |
| 6,151,596 A | 11/2000 | Hosomi |
| 6,154,194 A | 11/2000 | Singh |
| 6,154,201 A | 11/2000 | Levin et al. |
| 6,154,209 A | 11/2000 | Naughton et al. |
| 6,160,551 A | 12/2000 | Naughton et al. |
| 6,169,538 B1 | 1/2001 | Nowlan et al. |
| 6,175,610 B1 | 1/2001 | Peter |
| 6,188,391 B1 | 2/2001 | Seely et al. |
| 6,198,515 B1 | 3/2001 | Cole |
| 6,208,329 B1 | 3/2001 | Ballare |
| 6,219,035 B1 | 4/2001 | Skog |
| 6,222,465 B1 | 4/2001 | Kumar et al. |
| 6,222,531 B1 | 4/2001 | Smith |
| 6,229,502 B1 | 5/2001 | Schwab |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,255,604 B1 | 7/2001 | Tokioka et al. |
| 6,256,020 B1 | 7/2001 | Pabon et al. |
| 6,259,436 B1 | 7/2001 | Moon et al. |
| 6,271,835 B1 | 8/2001 | Hoeksma |
| 6,278,441 B1 | 8/2001 | Gouzman et al. |
| 6,278,443 B1 | 8/2001 | Amro et al. |
| 6,288,707 B1 | 9/2001 | Philipp |
| 6,289,326 B1 | 9/2001 | LaFleur |
| 6,292,178 B1 | 9/2001 | Bernstein et al. |
| 6,292,179 B1 | 9/2001 | Lee |
| 6,295,049 B1 | 9/2001 | Minner |
| 6,295,052 B1 | 9/2001 | Kato et al. |
| 6,308,144 B1 | 10/2001 | Bronfield et al. |
| 6,310,610 B1 | 10/2001 | Beaton et al. |
| 6,313,853 B1 | 11/2001 | Lamontagne et al. |
| 6,323,846 B1 | 11/2001 | Westerman et al. |
| 6,326,956 B1 | 12/2001 | Jaeger et al. |
| 6,333,753 B1 | 12/2001 | Hinckley |
| 6,337,678 B1 | 1/2002 | Fish |
| 6,339,748 B1 | 1/2002 | Hiramatsu |
| 6,344,861 B1 | 2/2002 | Naughton et al. |
| 6,347,290 B1 | 2/2002 | Bartlett |
| 6,359,572 B1 | 3/2002 | Vale |

(56) References Cited

U.S. PATENT DOCUMENTS

| | | |
|---|---|---|
| 6,359,632 B1 | 3/2002 | Eastty et al. |
| 6,377,009 B1 | 4/2002 | Philipp |
| 6,380,931 B1 | 4/2002 | Gillespie et al. |
| 6,400,379 B1 | 6/2002 | Johnson et al. |
| 6,411,287 B1 | 6/2002 | Scharff et al. |
| 6,414,671 B1 | 7/2002 | Gillespie et al. |
| 6,414,672 B2 | 7/2002 | Rekimoto et al. |
| 6,414,674 B1 | 7/2002 | Kamper et al. |
| 6,421,042 B1 | 7/2002 | Omura et al. |
| 6,421,046 B1 | 7/2002 | Edgren |
| 6,421,234 B1 | 7/2002 | Ricks et al. |
| 6,424,338 B1 | 7/2002 | Anderson |
| 6,429,846 B2 | 8/2002 | Rosenberg et al. |
| 6,433,801 B1 | 8/2002 | Moon et al. |
| 6,441,806 B1 | 8/2002 | Jaeger |
| 6,441,807 B1 | 8/2002 | Yamaguchi |
| 6,442,440 B1 | 8/2002 | Miller |
| 6,452,514 B1 | 9/2002 | Philipp |
| 6,456,952 B1 | 9/2002 | Nathan |
| 6,457,355 B1 | 10/2002 | Philipp |
| 6,457,834 B1 | 10/2002 | Cotton et al. |
| 6,466,036 B1 | 10/2002 | Philipp |
| 6,469,722 B1 | 10/2002 | Kinoe et al. |
| 6,473,069 B1 | 10/2002 | Gerpheide |
| 6,473,102 B1 | 10/2002 | Rodden et al. |
| 6,478,432 B1 | 11/2002 | Dyner |
| 6,480,188 B1 | 11/2002 | Horsley |
| 6,481,851 B1 | 11/2002 | McNelley et al. |
| 6,489,978 B1 | 12/2002 | Gong et al. |
| 6,501,464 B1 | 12/2002 | Cobbley et al. |
| 6,501,515 B1 | 12/2002 | Iwamura |
| 6,515,669 B1 | 2/2003 | Mohri |
| 6,525,711 B1 | 2/2003 | Shaw et al. |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,545,670 B1 | 4/2003 | Pryor |
| 6,563,492 B1 | 5/2003 | Furuya |
| 6,570,557 B1 | 5/2003 | Westerman et al. |
| 6,570,584 B1 | 5/2003 | Cok et al. |
| 6,573,844 B1 | 6/2003 | Venolia et al. |
| 6,583,676 B2 | 6/2003 | Krah et al. |
| 6,593,916 B1 | 7/2003 | Aroyan |
| 6,597,345 B2 | 7/2003 | Hirshberg |
| 6,610,936 B2 | 8/2003 | Gillespie et al. |
| 6,611,252 B1 | 8/2003 | DuFaux |
| 6,624,833 B1 | 9/2003 | Kumar et al. |
| 6,639,577 B2 | 10/2003 | Eberhard |
| 6,639,584 B1 | 10/2003 | Li |
| 6,650,319 B1 | 11/2003 | Hurst et al. |
| 6,654,733 B1 | 11/2003 | Goodman et al. |
| 6,658,994 B1 | 12/2003 | McMillan |
| 6,661,920 B1 | 12/2003 | Skinner |
| 6,664,989 B1 | 12/2003 | Snyder et al. |
| 6,670,894 B2 | 12/2003 | Mehring |
| 6,677,932 B1 | 1/2004 | Westerman |
| 6,677,933 B1 | 1/2004 | Yogaratnam |
| 6,677,934 B1 | 1/2004 | Blanchard |
| 6,680,677 B1 | 1/2004 | Tiphane |
| 6,690,275 B2 | 2/2004 | Long et al. |
| 6,690,387 B2 | 2/2004 | Zimmerman et al. |
| 6,697,721 B2 | 2/2004 | Arlinsky |
| 6,703,999 B1 | 3/2004 | Iwanami et al. |
| 6,710,771 B1 | 3/2004 | Yamaguchi et al. |
| 6,721,784 B1 | 4/2004 | Leonard et al. |
| 6,724,366 B2 | 4/2004 | Crawford |
| 6,757,002 B1 | 6/2004 | Oross et al. |
| 6,760,020 B1 | 7/2004 | Uchiyama et al. |
| 6,791,467 B1 | 9/2004 | Ben-Ze'ev |
| 6,795,059 B2 | 9/2004 | Endo |
| 6,798,768 B1 | 9/2004 | Gallick et al. |
| 6,803,905 B1 | 10/2004 | Capps et al. |
| 6,803,906 B1 | 10/2004 | Morrison et al. |
| 6,806,869 B2 | 10/2004 | Yamakado |
| 6,819,312 B2 | 11/2004 | Fish |
| 6,842,672 B1 | 1/2005 | Straub et al. |
| 6,856,259 B1 | 2/2005 | Sharp |
| 6,857,800 B2 | 2/2005 | Zhang et al. |
| 6,874,129 B2 | 3/2005 | Smith |
| 6,882,641 B1 | 4/2005 | Gallick et al. |
| 6,888,536 B2 | 5/2005 | Westerman et al. |
| 6,896,375 B2 | 5/2005 | Peterson et al. |
| 6,900,795 B1 | 5/2005 | Knight, III et al. |
| 6,903,730 B2 | 6/2005 | Mathews et al. |
| 6,920,619 B1 | 7/2005 | Milevic |
| 6,926,609 B2 | 8/2005 | Martin |
| 6,927,761 B2 | 8/2005 | Badaye et al. |
| 6,930,661 B2 | 8/2005 | Uchida et al. |
| 6,942,571 B1 | 9/2005 | McAllister et al. |
| 6,944,591 B1 | 9/2005 | Raghunandan |
| 6,952,203 B2 | 10/2005 | Banerjee et al. |
| 6,954,583 B2 | 10/2005 | Nagasaka et al. |
| 6,958,749 B1 | 10/2005 | Matsushita et al. |
| 6,961,912 B2 | 11/2005 | Aoki et al. |
| 6,965,375 B1 | 11/2005 | Gettemy et al. |
| 6,970,749 B1 | 11/2005 | Chinn et al. |
| 6,972,401 B2 | 12/2005 | Akitt et al. |
| 6,972,749 B2 | 12/2005 | Hinckley et al. |
| 6,975,304 B1 | 12/2005 | Hawkins et al. |
| 6,977,666 B1 | 12/2005 | Hedrick |
| 6,985,801 B1 | 1/2006 | Straub et al. |
| 6,992,659 B2 | 1/2006 | Gettemy |
| 7,002,749 B2 | 2/2006 | Kremen |
| 7,015,894 B2 | 3/2006 | Morohoshi |
| 7,022,075 B2 | 4/2006 | Grunwald et al. |
| 7,030,861 B1 | 4/2006 | Westerman et al. |
| 7,030,863 B2 | 4/2006 | Longe et al. |
| 7,031,228 B2 | 4/2006 | Born et al. |
| 7,038,659 B2 | 5/2006 | Rajkowski |
| 7,057,607 B2 | 6/2006 | Mayoraz et al. |
| 7,058,902 B2 | 6/2006 | Iwema et al. |
| 7,075,512 B1 | 7/2006 | Fabre et al. |
| 7,079,114 B1 | 7/2006 | Smith et al. |
| 7,084,859 B1 | 8/2006 | Pryor |
| 7,091,410 B2 | 8/2006 | Ito et al. |
| 7,098,891 B1 | 8/2006 | Pryor |
| 7,098,896 B2 | 8/2006 | Kushler et al. |
| 7,100,105 B1 | 8/2006 | Nishimura et al. |
| 7,129,416 B1 | 10/2006 | Steinfeld et al. |
| 7,143,355 B2 | 11/2006 | Yamaguchi et al. |
| 7,149,981 B1 | 12/2006 | Lundy et al. |
| 7,151,528 B2 | 12/2006 | Taylor et al. |
| 7,158,123 B2 | 1/2007 | Myers et al. |
| 7,180,502 B2 | 2/2007 | Marvit et al. |
| 7,184,064 B2 | 2/2007 | Zimmerman et al. |
| 7,194,699 B2 | 3/2007 | Thomson et al. |
| 7,233,316 B2 | 6/2007 | Smith et al. |
| 7,233,319 B2 | 6/2007 | Johnson et al. |
| 7,240,289 B2 | 7/2007 | Naughton et al. |
| 7,242,311 B2 | 7/2007 | Hoff et al. |
| 7,260,422 B2 | 8/2007 | Knoedgen |
| 7,310,781 B2 | 12/2007 | Chen et al. |
| 7,319,454 B2 | 1/2008 | Thacker et al. |
| 7,320,112 B2 | 1/2008 | Yamaguchi et al. |
| RE40,153 E | 3/2008 | Westerman et al. |
| 7,339,580 B2 | 3/2008 | Westerman et al. |
| 7,340,077 B2 | 3/2008 | Gokturk et al. |
| 7,340,685 B2 | 3/2008 | Chen et al. |
| 7,346,853 B2 | 3/2008 | Chen et al. |
| 7,417,681 B2 | 8/2008 | Lieberman et al. |
| 7,443,316 B2 | 10/2008 | Lim |
| 7,466,843 B2 | 12/2008 | Pryor |
| 7,474,772 B2 | 1/2009 | Russo et al. |
| 7,475,390 B2 | 1/2009 | Berstis et al. |
| 7,477,240 B2 | 1/2009 | Yanagisawa |
| 7,478,336 B2 | 1/2009 | Chen et al. |
| 7,489,303 B1 | 2/2009 | Pryor |
| 7,509,113 B2 | 3/2009 | Knoedgen |
| 7,515,810 B2 | 4/2009 | Nagasaka et al. |
| 7,519,223 B2 | 4/2009 | Dehlin et al. |
| 7,526,738 B2 | 4/2009 | Ording et al. |
| RE40,867 E | 8/2009 | Binstead |
| 7,593,552 B2 | 9/2009 | Higaki |

(56) References Cited

U.S. PATENT DOCUMENTS

| | | |
|---|---|---|
| 7,614,008 B2 | 11/2009 | Ording |
| 7,653,883 B2 | 1/2010 | Hotelling et al. |
| 7,663,607 B2 | 2/2010 | Hotelling et al. |
| 7,664,748 B2 | 2/2010 | Harrity |
| 7,694,231 B2 | 4/2010 | Kocienda et al. |
| 7,706,616 B2 | 4/2010 | Kristensson et al. |
| 7,714,849 B2 | 5/2010 | Pryor |
| 7,746,325 B2 | 6/2010 | Roberts |
| 7,831,932 B2 | 11/2010 | Josephsoon et al. |
| 7,856,472 B2 | 12/2010 | Arav |
| 7,861,188 B2 | 12/2010 | Josephsoon et al. |
| 7,877,705 B2 | 1/2011 | Chambers et al. |
| 7,898,529 B2 | 3/2011 | Fitzmaurice et al. |
| 8,228,305 B2 | 7/2012 | Pryor |
| 8,239,784 B2 | 8/2012 | Hotelling et al. |
| 8,314,775 B2 | 11/2012 | Westerman et al. |
| 8,330,727 B2 | 12/2012 | Westerman et al. |
| 8,334,846 B2 | 12/2012 | Westerman et al. |
| 8,381,135 B2 | 2/2013 | Hotelling et al. |
| 8,384,675 B2 | 2/2013 | Westerman et al. |
| 8,427,449 B2 | 4/2013 | Pryor |
| 8,441,453 B2 | 5/2013 | Westerman et al. |
| 8,466,880 B2 | 6/2013 | Westerman et al. |
| 8,466,881 B2 | 6/2013 | Westerman et al. |
| 8,479,122 B2 | 7/2013 | Hotelling et al. |
| 8,482,533 B2 | 7/2013 | Westerman et al. |
| 8,482,535 B2 | 7/2013 | Pryor |
| 8,514,183 B2 | 8/2013 | Westerman et al. |
| 8,576,177 B2 | 11/2013 | Westerman et al. |
| 8,593,426 B2 | 11/2013 | Westerman et al. |
| 8,612,856 B2 | 12/2013 | Hotelling et al. |
| 8,629,840 B2 | 1/2014 | Westerman et al. |
| 8,633,898 B2 | 1/2014 | Westerman et al. |
| 8,665,240 B2 | 3/2014 | Westerman |
| 8,674,943 B2 | 3/2014 | Westerman et al. |
| 8,698,755 B2 | 4/2014 | Westerman et al. |
| 8,730,177 B2 | 5/2014 | Westerman et al. |
| 8,730,192 B2 | 5/2014 | Westerman et al. |
| 8,736,555 B2 | 5/2014 | Westerman et al. |
| 8,866,752 B2 | 10/2014 | Westerman et al. |
| 8,902,175 B2 | 12/2014 | Westerman et al. |
| 9,001,068 B2 | 4/2015 | Westerman et al. |
| 9,098,142 B2 | 8/2015 | Westerman et al. |
| 2001/0012001 A1 | 8/2001 | Rekimoto et al. |
| 2001/0012022 A1 | 8/2001 | Smith |
| 2001/0012769 A1 | 8/2001 | Sirola et al. |
| 2001/0015718 A1 | 8/2001 | Hinckley et al. |
| 2001/0026678 A1 | 10/2001 | Nagasaka et al. |
| 2001/0040554 A1 | 11/2001 | Nakagawa |
| 2001/0055038 A1 | 12/2001 | Kim |
| 2002/0015024 A1 | 2/2002 | Westerman et al. |
| 2002/0018051 A1 | 2/2002 | Singh |
| 2002/0044132 A1 | 4/2002 | Fish |
| 2002/0044161 A1 | 4/2002 | Sugai |
| 2002/0051018 A1 | 5/2002 | Yeh |
| 2002/0054175 A1 | 5/2002 | Miettinen et al. |
| 2002/0075317 A1 | 6/2002 | Dardick |
| 2002/0080123 A1 | 6/2002 | Kennedy et al. |
| 2002/0085037 A1 | 7/2002 | Leavitt et al. |
| 2002/0113778 A1 | 8/2002 | Rekimoto et al. |
| 2002/0118848 A1 | 8/2002 | Karpenstein |
| 2002/0120543 A1 | 8/2002 | Brittingham et al. |
| 2002/0130839 A1 | 9/2002 | Wallace et al. |
| 2002/0133522 A1 | 9/2002 | Greetham et al. |
| 2002/0135615 A1 | 9/2002 | Lang |
| 2002/0140633 A1 | 10/2002 | Rafii et al. |
| 2002/0140668 A1 | 10/2002 | Crawford |
| 2002/0140679 A1 | 10/2002 | Wen |
| 2002/0140680 A1 | 10/2002 | Lu |
| 2002/0167545 A1 | 11/2002 | Kang et al. |
| 2002/0180763 A1 | 12/2002 | Kung et al. |
| 2002/0191029 A1 | 12/2002 | Gillespie et al. |
| 2002/0196227 A1 | 12/2002 | Surloff et al. |
| 2002/0196238 A1 | 12/2002 | Tsukada et al. |
| 2002/0196274 A1 | 12/2002 | Comfort et al. |
| 2003/0001899 A1 | 1/2003 | Partanen et al. |
| 2003/0005454 A1 | 1/2003 | Rodriguez et al. |
| 2003/0006974 A1 | 1/2003 | Clough et al. |
| 2003/0016253 A1 | 1/2003 | Aoki et al. |
| 2003/0030664 A1 | 2/2003 | Parry |
| 2003/0063073 A1 | 4/2003 | Geaghan et al. |
| 2003/0071850 A1 | 4/2003 | Geidl |
| 2003/0071858 A1 | 4/2003 | Morohoshi |
| 2003/0072077 A1 | 4/2003 | Peterson et al. |
| 2003/0073461 A1 | 4/2003 | Sinclair |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0076363 A1 | 4/2003 | Murphy |
| 2003/0095095 A1 | 5/2003 | Pihlaja |
| 2003/0095096 A1 | 5/2003 | Robbin et al. |
| 2003/0095135 A1 | 5/2003 | Kaasila et al. |
| 2003/0098858 A1 | 5/2003 | Perski et al. |
| 2003/0128188 A1 | 7/2003 | Wilbrink et al. |
| 2003/0128195 A1 | 7/2003 | Banerjee et al. |
| 2003/0132922 A1 | 7/2003 | Philipp |
| 2003/0132950 A1 | 7/2003 | Sucuru et al. |
| 2003/0152241 A1 | 8/2003 | Eastty et al. |
| 2003/0160808 A1 | 8/2003 | Foote et al. |
| 2003/0164820 A1 | 9/2003 | Kent |
| 2003/0169303 A1 | 9/2003 | Islam et al. |
| 2003/0179201 A1 | 9/2003 | Thacker |
| 2003/0193481 A1 | 10/2003 | Sokolsky |
| 2003/0197736 A1 | 10/2003 | Murphy |
| 2003/0201972 A1 | 10/2003 | Usuda |
| 2003/0206202 A1 | 11/2003 | Moriya |
| 2003/0210260 A1 | 11/2003 | Palmer et al. |
| 2003/0210286 A1 | 11/2003 | Gerpheide et al. |
| 2003/0214534 A1 | 11/2003 | Uemura et al. |
| 2003/0222977 A1 | 12/2003 | Yoshino |
| 2003/0234768 A1 | 12/2003 | Rekimoto et al. |
| 2003/0237043 A1 | 12/2003 | Novak et al. |
| 2004/0001048 A1 | 1/2004 | Kraus et al. |
| 2004/0009788 A1 | 1/2004 | Mantyjarvi et al. |
| 2004/0017499 A1 | 1/2004 | Ambiru |
| 2004/0019505 A1 | 1/2004 | Bowman et al. |
| 2004/0021643 A1 | 2/2004 | Hoshino et al. |
| 2004/0021644 A1 | 2/2004 | Enomoto |
| 2004/0021696 A1 | 2/2004 | Molgaard |
| 2004/0036622 A1 | 2/2004 | Dukach et al. |
| 2004/0046887 A1 | 3/2004 | Ikehata et al. |
| 2004/0053661 A1 | 3/2004 | Jones et al. |
| 2004/0056837 A1 | 3/2004 | Koga et al. |
| 2004/0056839 A1 | 3/2004 | Yoshihara |
| 2004/0056849 A1 | 3/2004 | Lohbihler et al. |
| 2004/0064473 A1 | 4/2004 | Thomas et al. |
| 2004/0080529 A1 | 4/2004 | Wojcik |
| 2004/0100479 A1 | 5/2004 | Nakano et al. |
| 2004/0119750 A1 | 6/2004 | Harrison |
| 2004/0125081 A1 | 7/2004 | Hayakawa |
| 2004/0134238 A1 | 7/2004 | Buckroyd et al. |
| 2004/0135774 A1 | 7/2004 | La Monica |
| 2004/0135818 A1 | 7/2004 | Thomson et al. |
| 2004/0136564 A1 | 7/2004 | Roeber et al. |
| 2004/0140956 A1 | 7/2004 | Kushler et al. |
| 2004/0141157 A1 | 7/2004 | Ramachandran et al. |
| 2004/0145601 A1 | 7/2004 | Brielmann et al. |
| 2004/0146688 A1 | 7/2004 | Treat |
| 2004/0150668 A1 | 8/2004 | Myers et al. |
| 2004/0150669 A1 | 8/2004 | Sabiers et al. |
| 2004/0155888 A1 | 8/2004 | Padgitt et al. |
| 2004/0160419 A1 | 8/2004 | Padgitt |
| 2004/0165924 A1 | 8/2004 | Griffin |
| 2004/0178994 A1 | 9/2004 | Kairls, Jr. |
| 2004/0181749 A1 | 9/2004 | Chellapilla et al. |
| 2004/0183833 A1 | 9/2004 | Chua |
| 2004/0189720 A1 | 9/2004 | Wilson et al. |
| 2004/0198463 A1 | 10/2004 | Knoedgen |
| 2004/0218963 A1 | 11/2004 | Van Diepen et al. |
| 2004/0227739 A1 | 11/2004 | Tani et al. |
| 2004/0227830 A1 | 11/2004 | Kobayashi et al. |
| 2004/0230912 A1 | 11/2004 | Clow et al. |
| 2004/0237052 A1 | 11/2004 | Allport |
| 2004/0245352 A1 | 12/2004 | Smith |

(56) References Cited

U.S. PATENT DOCUMENTS

| | | |
|---|---|---|
| 2004/0262387 A1 | 12/2004 | Hart |
| 2004/0263484 A1 | 12/2004 | Mantysalo et al. |
| 2005/0005241 A1 | 1/2005 | Hunleth et al. |
| 2005/0012723 A1 | 1/2005 | Pallakoff |
| 2005/0015731 A1 | 1/2005 | Mak et al. |
| 2005/0016366 A1 | 1/2005 | Ito et al. |
| 2005/0024341 A1 | 2/2005 | Gillespie et al. |
| 2005/0052425 A1 | 3/2005 | Zadesky et al. |
| 2005/0052427 A1 | 3/2005 | Wu et al. |
| 2005/0057524 A1 | 3/2005 | Hill et al. |
| 2005/0064936 A1 | 3/2005 | Pryor |
| 2005/0066270 A1 | 3/2005 | Ali et al. |
| 2005/0071771 A1 | 3/2005 | Nagasawa et al. |
| 2005/0078087 A1 | 4/2005 | Gates et al. |
| 2005/0091577 A1 | 4/2005 | Torres et al. |
| 2005/0104867 A1 | 5/2005 | Westerman et al. |
| 2005/0110768 A1 | 5/2005 | Marriott et al. |
| 2005/0116941 A1 | 6/2005 | Wallington |
| 2005/0120312 A1 | 6/2005 | Nguyen |
| 2005/0132072 A1 | 6/2005 | Pennell et al. |
| 2005/0134578 A1 | 6/2005 | Chambers et al. |
| 2005/0162402 A1 | 7/2005 | Watanachote |
| 2005/0169527 A1 | 8/2005 | Longe et al. |
| 2005/0171783 A1 | 8/2005 | Suominen |
| 2005/0174975 A1 | 8/2005 | Mgrdechian et al. |
| 2005/0190970 A1 | 9/2005 | Griffin |
| 2005/0204008 A1 | 9/2005 | Shinbrood |
| 2005/0204889 A1 | 9/2005 | Swingle et al. |
| 2005/0211766 A1 | 9/2005 | Robertson et al. |
| 2005/0223308 A1 | 10/2005 | Gunn et al. |
| 2005/0253816 A1 | 11/2005 | Himberg et al. |
| 2005/0253818 A1 | 11/2005 | Nettamo |
| 2005/0259087 A1 | 11/2005 | Hoshino et al. |
| 2006/0001650 A1 | 1/2006 | Robbins et al. |
| 2006/0007174 A1 | 1/2006 | Shen |
| 2006/0010374 A1 | 1/2006 | Corrington et al. |
| 2006/0010400 A1 | 1/2006 | Dehlin et al. |
| 2006/0012577 A1 | 1/2006 | Kyrola |
| 2006/0022955 A1 | 2/2006 | Kennedy |
| 2006/0022956 A1 | 2/2006 | Lengeling et al. |
| 2006/0026335 A1 | 2/2006 | Hodgson et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031752 A1 | 2/2006 | Surloff et al. |
| 2006/0032680 A1 | 2/2006 | Elias et al. |
| 2006/0033724 A1 | 2/2006 | Chaudhri et al. |
| 2006/0035681 A1 | 2/2006 | Oh |
| 2006/0044259 A1 | 3/2006 | Hotelling et al. |
| 2006/0052885 A1 | 3/2006 | Kong |
| 2006/0053387 A1 | 3/2006 | Ording |
| 2006/0066582 A1 | 3/2006 | Lyon et al. |
| 2006/0066590 A1 | 3/2006 | Ozawa et al. |
| 2006/0071915 A1 | 4/2006 | Rehm |
| 2006/0085757 A1 | 4/2006 | Andre et al. |
| 2006/0085767 A1 | 4/2006 | Hinckley et al. |
| 2006/0125803 A1 | 6/2006 | Westerman et al. |
| 2006/0150120 A1 | 7/2006 | Dresti et al. |
| 2006/0161846 A1 | 7/2006 | Van Leeuwen |
| 2006/0161870 A1 | 7/2006 | Hotelling et al. |
| 2006/0161871 A1 | 7/2006 | Hotelling et al. |
| 2006/0167993 A1 | 7/2006 | Aaron et al. |
| 2006/0181517 A1 | 8/2006 | Zadesky et al. |
| 2006/0181519 A1 | 8/2006 | Vernier et al. |
| 2006/0197750 A1 | 9/2006 | Hotelling et al. |
| 2006/0197753 A1 | 9/2006 | Hotelling |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0242587 A1 | 10/2006 | Eagle et al. |
| 2006/0242607 A1 | 10/2006 | Hudson |
| 2006/0244735 A1 | 11/2006 | Wilson |
| 2006/0253793 A1 | 11/2006 | Zhai et al. |
| 2006/0265668 A1 | 11/2006 | Rainisto |
| 2006/0274051 A1 | 12/2006 | Longe et al. |
| 2006/0290921 A1 | 12/2006 | Hotelling et al. |
| 2007/0011603 A1 | 1/2007 | Makela |
| 2007/0033269 A1 | 2/2007 | Atkinson et al. |
| 2007/0061754 A1 | 3/2007 | Ardhanari et al. |
| 2007/0070050 A1 | 3/2007 | Westerman et al. |
| 2007/0070051 A1 | 3/2007 | Westerman et al. |
| 2007/0070052 A1 | 3/2007 | Westerman et al. |
| 2007/0078919 A1 | 4/2007 | Westerman et al. |
| 2007/0081726 A1 | 4/2007 | Westerman et al. |
| 2007/0083823 A1 | 4/2007 | Jaeger |
| 2007/0087766 A1 | 4/2007 | Hardy et al. |
| 2007/0088787 A1 | 4/2007 | Hardy et al. |
| 2007/0139395 A1 | 6/2007 | Westerman et al. |
| 2007/0150830 A1* | 6/2007 | Ording ................ G06F 3/0481 715/784 |
| 2007/0159453 A1 | 7/2007 | Inoue |
| 2007/0171210 A1 | 7/2007 | Chaudhri et al. |
| 2007/0176906 A1* | 8/2007 | Warren .......................... 345/173 |
| 2007/0177803 A1 | 8/2007 | Elias et al. |
| 2007/0177804 A1 | 8/2007 | Elias et al. |
| 2007/0180360 A1 | 8/2007 | Neil |
| 2007/0222768 A1 | 9/2007 | Geurts et al. |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2007/0268273 A1 | 11/2007 | Westerman et al. |
| 2007/0268274 A1 | 11/2007 | Westerman et al. |
| 2007/0268275 A1 | 11/2007 | Westerman et al. |
| 2007/0276875 A1 | 11/2007 | Brunswig et al. |
| 2008/0016468 A1 | 1/2008 | Chambers et al. |
| 2008/0024463 A1 | 1/2008 | Pryor |
| 2008/0036743 A1 | 2/2008 | Westerman et al. |
| 2008/0040692 A1* | 2/2008 | Sunday ................ G06F 3/04883 715/863 |
| 2008/0041639 A1 | 2/2008 | Westerman et al. |
| 2008/0042986 A1 | 2/2008 | Westerman et al. |
| 2008/0042987 A1 | 2/2008 | Westerman et al. |
| 2008/0042988 A1 | 2/2008 | Westerman et al. |
| 2008/0042989 A1 | 2/2008 | Westerman et al. |
| 2008/0088587 A1 | 4/2008 | Pryor |
| 2008/0128182 A1 | 6/2008 | Westerman et al. |
| 2008/0129707 A1 | 6/2008 | Pryor |
| 2008/0139297 A1 | 6/2008 | Beaulieu et al. |
| 2008/0174553 A1 | 7/2008 | Trust |
| 2008/0189622 A1 | 8/2008 | Sanchez et al. |
| 2008/0211775 A1 | 9/2008 | Hotelling et al. |
| 2008/0211779 A1 | 9/2008 | Pryor |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0229236 A1 | 9/2008 | Carrer et al. |
| 2008/0231610 A1 | 9/2008 | Hotelling et al. |
| 2008/0297476 A1 | 12/2008 | Hotelling et al. |
| 2008/0309626 A1* | 12/2008 | Westerman ........... G06F 3/0485 345/173 |
| 2008/0316183 A1 | 12/2008 | Westerman et al. |
| 2009/0021489 A1 | 1/2009 | Westerman et al. |
| 2009/0064006 A1 | 3/2009 | Naick et al. |
| 2009/0160816 A1 | 6/2009 | Westerman et al. |
| 2009/0244031 A1 | 10/2009 | Westerman et al. |
| 2009/0244032 A1 | 10/2009 | Westerman et al. |
| 2009/0244033 A1 | 10/2009 | Westerman et al. |
| 2009/0249236 A1 | 10/2009 | Westerman et al. |
| 2009/0251435 A1 | 10/2009 | Westerman et al. |
| 2009/0251438 A1 | 10/2009 | Westerman et al. |
| 2009/0251439 A1 | 10/2009 | Westerman et al. |
| 2009/0267921 A1 | 10/2009 | Pryor |
| 2009/0273563 A1 | 11/2009 | Pryor |
| 2009/0273574 A1 | 11/2009 | Pryor |
| 2009/0273575 A1 | 11/2009 | Pryor |
| 2009/0300531 A1 | 12/2009 | Pryor |
| 2009/0322499 A1 | 12/2009 | Pryor |
| 2010/0149092 A1 | 6/2010 | Westerman et al. |
| 2010/0149134 A1 | 6/2010 | Westerman et al. |

(56) References Cited

U.S. PATENT DOCUMENTS

| | | | |
|---|---|---|---|
| 2010/0231506 A1 | 9/2010 | Pryor | |
| 2011/0037725 A1 | 2/2011 | Pryor | |
| 2012/0223894 A1* | 9/2012 | Zhao | G06F 3/0488 345/173 |
| 2012/0293440 A1 | 11/2012 | Hotelling et al. | |
| 2012/0293442 A1 | 11/2012 | Westerman et al. | |
| 2013/0009900 A1 | 1/2013 | Pryor | |
| 2013/0147761 A1 | 6/2013 | Westerman et al. | |
| 2013/0154982 A1 | 6/2013 | Hotelling et al. | |
| 2013/0241823 A1 | 9/2013 | Pryor | |
| 2013/0265263 A1 | 10/2013 | Westerman et al. | |
| 2014/0074426 A1 | 3/2014 | Hotelling | |
| 2014/0160068 A1 | 6/2014 | Westerman et al. | |
| 2014/0176499 A1 | 6/2014 | Westerman et al. | |
| 2015/0029152 A1 | 1/2015 | Westerman et al. | |

FOREIGN PATENT DOCUMENTS

| | | |
|---|---|---|
| DE | 100 42 300 A1 | 3/2002 |
| DE | 100 59 906 A1 | 6/2002 |
| DE | 101 40 874 A1 | 3/2003 |
| DE | 102 51 296 A1 | 5/2004 |
| EP | 0 394 614 A2 | 10/1990 |
| EP | 0 422 577 A2 | 4/1991 |
| EP | 0 422 577 A3 | 4/1991 |
| EP | 0 462 759 A2 | 12/1991 |
| EP | 0 462 759 B1 | 12/1991 |
| EP | 0 464 908 | 1/1992 |
| EP | 0 288 692 | 7/1993 |
| EP | 0 588 210 A1 | 3/1994 |
| EP | 0 588 210 B1 | 3/1994 |
| EP | 0 622 722 A2 | 11/1994 |
| EP | 0 622 722 A3 | 11/1994 |
| EP | 0 622 722 B1 | 11/1994 |
| EP | 0 664 504 | 7/1995 |
| EP | 0 817 000 A1 | 1/1998 |
| EP | 0 817 000 B1 | 1/1998 |
| EP | 0 880 090 A2 | 11/1998 |
| EP | 0 880 090 A3 | 11/1998 |
| EP | 0 926 588 A2 | 6/1999 |
| EP | 1 014 295 | 1/2002 |
| EP | 1 233 330 A2 | 8/2002 |
| EP | 1 271 295 A2 | 1/2003 |
| EP | 1 271 295 A3 | 1/2003 |
| EP | 1 517 228 A2 | 3/2005 |
| EP | 1 569 079 A1 | 8/2005 |
| EP | 1 505 484 A1 | 9/2005 |
| EP | 1 674 976 A2 | 6/2006 |
| EP | 1 674 976 A3 | 6/2006 |
| EP | 2 390 774 A2 | 11/2011 |
| GB | 2330670 A | 4/1999 |
| GB | 2 332 293 A | 6/1999 |
| GB | 2 337 349 A1 | 11/1999 |
| GB | 2344894 A | 6/2000 |
| GB | 2 351 639 A | 1/2001 |
| GB | 2 380 583 A | 4/2003 |
| JP | 60-198586 A | 10/1985 |
| JP | 63-167923 A | 7/1988 |
| JP | 04-048318 A | 2/1992 |
| JP | 04-054523 A | 2/1992 |
| JP | 04-198795 A | 7/1992 |
| JP | 05-297979 A | 11/1993 |
| JP | 6-19663 A | 1/1994 |
| JP | 06-161661 A | 6/1994 |
| JP | 7-129312 A | 5/1995 |
| JP | 7-230352 A | 8/1995 |
| JP | 09-033278 A | 2/1997 |
| JP | 9-330175 A | 12/1997 |
| JP | 10-039748 A | 2/1998 |
| JP | 10-171600 A | 6/1998 |
| JP | 11-053093 A | 2/1999 |
| JP | 11-073271 A | 3/1999 |
| JP | 11-085380 A | 3/1999 |
| JP | 11-119911 A | 4/1999 |
| JP | 11-133816 A | 5/1999 |
| JP | 11-175258 A | 7/1999 |
| JP | 11-194863 A | 7/1999 |
| JP | 2000-010705 A | 1/2000 |
| JP | 2000-163031 A | 6/2000 |
| JP | 2000-163193 A | 6/2000 |
| JP | 2000-163444 A | 6/2000 |
| JP | 2000-231670 A | 8/2000 |
| JP | 2001-134382 A | 5/2001 |
| JP | 2001-147918 A | 5/2001 |
| JP | 2001-230992 A | 8/2001 |
| JP | 2001-356870 A | 12/2001 |
| JP | 2002-034023 A | 1/2002 |
| JP | 2002-501271 A | 1/2002 |
| JP | 2002-342033 A | 11/2002 |
| JP | 2003-173237 A | 6/2003 |
| JP | 2004-110388 A | 4/2004 |
| KR | 10-2001-0040410 A | 5/2001 |
| KR | 4057131 A | 7/2004 |
| WF | WO-02/39245 A3 | 5/2002 |
| WO | WO-92/02000 A | 2/1992 |
| WO | WO-94/29788 A1 | 12/1994 |
| WO | WO-97/18547 | 5/1997 |
| WO | WO-97/23738 | 7/1997 |
| WO | WO-97/36225 A1 | 10/1997 |
| WO | WO-97/40744 A1 | 11/1997 |
| WO | WO-98/14863 | 4/1998 |
| WO | WO-98/33111 A1 | 7/1998 |
| WO | WO-99/28813 A1 | 6/1999 |
| WO | WO-99/38149 A1 | 7/1999 |
| WO | WO-99/54807 A1 | 10/1999 |
| WO | WO-00/38042 A1 | 6/2000 |
| WO | WO-01/02949 A1 | 1/2001 |
| WO | WO-02/01482 A1 | 1/2002 |
| WO | WO-02/39245 A2 | 5/2002 |
| WO | WO-02/39245 C2 | 5/2002 |
| WO | WO-03/027822 A2 | 4/2003 |
| WO | WO-03/027822 A3 | 4/2003 |
| WO | WO-03/036457 A | 5/2003 |
| WO | WO-03/036457 A3 | 5/2003 |
| WO | WO-03/062978 A | 7/2003 |
| WO | WO-03/062978 A3 | 7/2003 |
| WO | WO-03/088176 | 10/2003 |
| WO | WO-03/098417 A2 | 11/2003 |
| WO | WO-03/098417 A3 | 11/2003 |
| WO | WO-03/098421 A1 | 11/2003 |
| WO | WO-2004/029789 A2 | 4/2004 |
| WO | WO-2004/029789 A3 | 4/2004 |
| WO | WO-2004/047069 A1 | 6/2004 |
| WO | WO-2004/051392 A2 | 6/2004 |
| WO | WO-2004/051392 A3 | 6/2004 |
| WO | WO-2004/091956 A2 | 10/2004 |
| WO | WO-2004/091956 A3 | 10/2004 |
| WO | WO-2005/064442 A1 | 7/2005 |
| WO | WO-2005/114369 A2 | 12/2005 |
| WO | WO-2006/003590 A2 | 1/2006 |
| WO | WO-2006/003590 A3 | 1/2006 |
| WO | WO-2006/020304 A2 | 2/2006 |
| WO | WO-2006/020304 A3 | 2/2006 |
| WO | WO-2006/020305 A2 | 2/2006 |
| WO | WO-2006/020305 A3 | 2/2006 |
| WO | WO-2006/023569 | 3/2006 |
| WO | WO-2006/026012 A2 | 3/2006 |
| WO | WO-2007/037808 A1 | 4/2007 |
| WO | WO-2007/037809 A1 | 4/2007 |
| WO | WO-2007/089766 A2 | 8/2007 |
| WO | WO-2007/089766 A3 | 8/2007 |
| WO | WO-2008/094791 A2 | 7/2008 |
| WO | WO-2008/094791 A3 | 7/2008 |
| WO | WO-2010/135478 A2 | 11/2010 |
| WO | WO-2014/043275 A1 | 3/2014 |

OTHER PUBLICATIONS

Notice of Allowance mailed Jan. 2, 2014, for U.S. Appl. No. 11/830,766, filed Jul. 30, 2007, 10 pages.

Notice of Allowance mailed Jan. 6, 2014, for U.S. Appl. No. 11/830,788, filed Jul. 30, 2007, 13 pages.

(56) References Cited

OTHER PUBLICATIONS

Notice of Allowance mailed Jan. 6, 2014, for U.S. Appl. No. 11/830,793, filed Jul. 30, 2007, 12 pages.
Final Office Action mailed Dec. 12, 2012, for U.S. Appl. No. 12/500,984, filed Jul. 10, 2009, 10 pages.
Final Office Action mailed Jan. 4, 2013, for U.S. Appl. No. 12/118,659, filed May 9, 2008, six pages.
Non-Final Office Action mailed Oct. 26, 2012, for U.S. Appl. No. 12/468,401, filed May 19, 2009, 22 pages.
Non-Final Office Action mailed Dec. 18, 2012, for U.S. Appl. No. 11/878,024, filed Jul. 20, 2007, eight pages.
Non-Final Office Action mailed Dec. 19, 2012, for U.S. Appl. No. 11/048,264, filed Jan. 31, 2005, nine pages.
Non-Final Office Action mailed Jan. 4, 2013, for U.S. Appl. No. 12/139,411, filed Jun. 13, 2008, six pages.
Notice of Allowance mailed Dec. 6, 2012, for U.S. Appl. No. 10/903,964, filed Jul. 30, 2004, six pages.
Notice of Allowance mailed Jan. 15, 2013, for U.S. Appl. No. 12/479,617, filed Jun. 5, 2009, 10 pages.
Final Office Action mailed Feb. 21, 2014, for U.S. Appl. No. 12/422,197, filed Apr. 10, 2009, 14 pages.
Non-Final Office Action mailed Feb. 13, 2014, for U.S. Appl. No. 12/139,411, filed Jun. 13, 2008, seven pages.
Non-Final Office Action mailed Apr. 10, 2014, for U.S. Appl. No. 12/422,205, filed Apr. 10, 2009, 21 pages.
Notice of Allowance mailed Jun. 9, 2014, for U.S. Appl. No. 14/163,929, filed Jan. 24, 2014, seven pages.
Non-Final Office Action mailed Jun. 12, 2014, for U.S. Appl. No. 14/089,240, filed Nov. 25, 2013, 11 pages.
Notice of Allowance mailed Aug. 4, 2014, for U.S. Appl. No. 12/422,197, filed Apr. 10, 2009, 10 pages.
Non-Final Office Action mailed Aug. 16, 2013, for U.S. Appl. No. 11/830,793, filed Jul. 30, 2007, 16 pages.
Notice of Allowance mailed Aug. 21, 2013, for U.S. Appl. No. 13/757,726, filed Feb. 1, 2013, six pages.
Notice of Allowance mailed Aug. 27, 2013, for U.S. Appl. No. 13/766,570, filed Feb. 13, 2013, nine pages.
Non-Final Office Action mailed Sep. 4, 2012, for U.S. Appl. No. 11/830,788, filed Jul. 30, 2007, 13 pages.
Non-Final Office Action mailed Sep. 6, 2012, for U.S. Appl. No. 11/830,793, filed Jul. 30, 2007, 14 pages.
Non-Final Office Action mailed Sep. 13, 2012, for U.S. Appl. No. 12/422,205, filed Apr. 10, 2009, 16 pages.
Final Office Action mailed Sep. 19, 2014, for U.S. Appl. No. 12/139,411, filed Jun. 13, 2008, eight pages.
Final Office Action mailed Sep. 24, 2014, for U.S. Appl. No. 12/422,205, filed Apr. 10, 2009, 17 pages.
Non-Final Office Action mailed Sep. 2, 2014, for U.S. Appl. No. 11/048,264, filed Jan. 31, 2005, 9 pages.
Notice of Allowance mailed Jan. 10, 2014, for U.S. Appl. No. 13/569,065, filed Aug. 7, 2012, eight pages.
Final Office Action mailed Jul. 9, 2013, for U.S. Appl. No. 11/048,264, filed Jan. 31, 2005, 10 pages.
Final Office Action mailed Jul. 11, 2013, for U.S. Appl. No. 13/757,726, filed Feb. 1, 2013, nine pages.
Non-Final Office Action mailed Jun. 21, 2013, for U.S. Appl. No. 11/830,774, filed Jul. 30, 2007, 18 pages.
Non-Final Office Action mailed Jul. 18, 2013, for U.S. Appl. No. 11/830,766, filed Jul. 30, 2007, 15 pages.
Notice of Allowance mailed May 31, 2013, for U.S. Appl. No. 11/878,024, filed Jul. 20, 2007, nine pages.
Notice of Allowance mailed Jul. 8, 2013, for U.S. Appl. No. 12/500,984, filed Jul. 10, 2009, 6 pages.
Annex to Form PCT/ISA/206 Communication Relating to the Results of the Partial International Search Received in Corresponding PCT Application No. PCT/US2005/025641 dated Feb. 19, 2007.
Anonymous. "Touch Technologies Overview" 2001, 3M Touch Systems, Massachusetts.
Anonymous. (2005). "Gesture Recognition," located at <http://www.fingerworks.com/gesture_recognition.html>, last visited Aug. 30, 2005.
Anonymous. (2005). "iGesture Products for Everyone (Learn in Minutes)," *FingerWorks*, downloaded Aug. 30, 2005.
Anonymous. (2005). "Touch Technologies: Touch is Everywhere," located at http://www.3m.com/3MTouchSystems/downloads/PDFs/TouchTechOV.pdf., last visited Aug. 30, 2005.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html generated Aug. 5, 2005.
Anonymous. "A Brief Overview of Gesture Recognition" obtained from http://www. Dai. Ed. Ac.uk/Cvonline/LOCAL_COPIES/COHEN/gesture_overview. Html, generated Apr. 20, 2004.
Anonymous. "Ai Squared Products—XoomText Magnifier," http://www/aisquared.com/Products/zoomtexturemag/index.cfm, downloaded Oct. 26, 2005.
Anonymous. "Ai Squared Products," http://www.aisquared.com/Products/index.cfm, downloaded Oct. 25, 2005.
Anonymous. "Capacitive Position Sensing" obtained from http://www.synaptics.com/technology/cps.cfin generated Aug. 5, 2005.
Anonymous. "Capacitive Touchscreens" obtained from http://www.touchscreens.com/intro-touchtypes-capacitive.html generated Aug. 5, 2005.
Anonymous. "Comparing Touch Technologies" obtained from http://www.touchscreens.com/intro-touchtypes.html generated Oct. 10, 2004.
Anonymous. "FingerWorks—Gesture Guide—Application Switching," obtained from http://www.fingerworks.com/gesture_guide_apps.html, generated on Aug. 27, 2004, 1-pg.
Anonymous. "FingerWorks—Gesture Guide—Editing," obtained from http://www.fingerworks.com/gesure_guide_editing.html, generated on Aug. 27, 2004, 1-pg.
Anonymous. "FingerWorks—Gesture Guide—File Operations," obtained from http://www.fingerworks.com/gesture_guide_files.html, generated on Aug. 27, 2004, 1-pg.
Anonymous. "FingerWorks—Gesture Guide—Text Manipulation," obtained from http://www.fingerworks.com/gesture_guide_text_manip. html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2-pgs.
Anonymous. "FingerWorks—Gesture Guide—Web," obtained from http://www.fingerworks.com/gesture_guide_web.html, generated on Aug. 27, 2004, 1-pg.
Anonymous. "FingerWorks—Guide to Hand Gestures for USB Touchpads," obtained from http://www.fingerworks.com/igesture_userguide.html, generated Aug. 27, 2004, 1-pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint®" obtained from http://www.cirque.com/technology/technology_gp.html generated Aug. 5, 2005.
Anonymous. "Gesture Recognition" http://www.fingerworks.com/gesture_recognition.html>, Jul. 2, 2006.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—The Multi Finger USB Touch Pad with Whole-Hand Gestures," obtained from http://www.fingerworks.com/igesture.html, generated Aug. 27, 2004, 2-pgs.

(56) References Cited

OTHER PUBLICATIONS

Anonymous. "iGesture Products for Everyone (learn in minutes) Product Overview" FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Lunar Screen Magnifier and Lunar Plus Enhanced Screen Magnifier," www.dolphincomputeraccess.com/products/lunar.htm, downloaded Oct. 25, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Tips for Typing" FingerWorks http://www.fingerworks.com/mini_typing.html generated Aug. 30, 2005.
Anonymous. "Touchscreen Technology Choices," http://www.elotouch.com/products/detech2.asp, downloaded Aug. 5, 2005.
Anonymous. "Visual Disabilities," http://depts.stcc.edu/ods/ACCESS/bpvisual.htm, downloaded Oct. 25, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Anonymous. (2011). "Jog Dial" located at http://www.ask.com/wiki/Jog_dial, last visited Feb. 27, 2011, two pages.
Anonymous. (Apr. 1, 1994). "Jog Shuttle Graphical," *IBM Technical Disclosure Bulletin*, 37(4A):47-48.
Anonymous. (2011). "(graphical or virtual) (jog dial) or (jog wheel) or (scroll wheel)," Ask Search located at http://www.ask.com/web?q=%28graphical+or+virtual%29++%28jog+job+dial%29+or+%28jo . . . , last visited Feb. 27, 2011, two pages.
Anonymous. (2011). "What Is a Jog Wheel?" Ask Search located at http://www.ask.com/web?q=what+is+a+jog+wheel&search= &qsrc=0&o=0&l=dirlast visited on Feb. 27, 2011, two pages.
Anonymous. (2012). "Emulating Mouse Scroll Wheel?" Ask Search located at http://www.ask.com/web?q=emulate+scroll+wheel &qsrc=1&o=0&l=dir&qid=A23E49EA, last visited Mar. 23, 2012, one page.
Anonymous. (2012). "Virtual Scroll Wheel," Ask Search located at http://www.ask.com/web?q=virtual+scroll+wheel&qsrc=0&o=0 &l=dir&oo=0, last visited Mar. 23, 2012, two pages.
Bales, J. W. et al. (Apr. 1981). "Marking Parts to Aid Robot Vision," NASA Technical Paper 1819, 37 pages.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Buxton, W. et al. (Jul. 22, 1985). "Issues and Techniques in Touch-Sensitive Tablet Input," *Proceedings ACM Siggraph*, pp. 215-224.
Chang, C-C. et al. (Aug. 1, 1993). "A Hashing-Oriented Nearest Neighbor Searching Scheme," *Pattern Recognition Letters*, 14(8):625-630.
Chen et al. "Flowfield and Beyond: Applying Pressure-Sensitive Multi-Point Touchpad Interaction," *Multimedia and Expo, 2003, ICME '03, Proceedings*, Jul. 9, 2003, pp. 1-49, 152.
Crowley, J.L. (Mar. 1, 1997). "Vision for Man-Machine Interaction," *Robotics and Autonomous Systems*, 19(3-4):347-358.
Davis, J. et al. (May 2, 1994). "Recognizing Hand Gestures," *European Conference on Computer Vision*, Berlin, DE, 1:331-340.
Davis, J. et al. (Oct. 31, 1994). "Determining 3-D Hand Motion," *Signals, Systems and Computers, 1994 Conference Record of the 28th Asilomar Conference on Pacific Grove*, CA, Oct. 31-Nov. 2, 1994, Los Alamitos, CA, pp. 1262-1266.
Douglas et al., *The Ergonomics of Computer Pointing Devices* (1997).
European examination report for European Patent Application No. 06016830.9, mailed Aug. 6, 2008.
European examination report for European Patent Application No. 06016856.4, mailed Sep. 16, 2008.
European examination report for European patent Application No. 99904228.6, mailed Apr. 20, 2006.
European examination report for European Patent Application No. 99904228.6, mailed Mar. 23, 2007.
European search report for European Patent Application No. 06016830.9, mailed Dec. 3, 2007.
European Search Report mailed Dec. 12, 2008, for EP Application No. 06016855.6 filed Jan. 25, 1999, six pages.
European Search Report mailed Dec. 13, 2007, for EP Application No. 05772892.5, filed Jul. 19, 2005, three pages.
European Search Report mailed Dec. 15, 2008, for EP Application No. 08016449.4, filed Jul. 19, 2005, six pages.
European Search Report mailed Dec. 15, 2008, for EP Application No. 08016450.2, filed Jul. 19, 2005, six pages.
European Search Report mailed Dec. 23, 2008, for EP Application No. 06016831.7 filed Jan. 25, 1999, seven pages.
European Search Report mailed Jan. 9, 2009, for EP Application No. 06016832.5 filed Jan. 25, 1999, four pages.
European Search Report mailed Jun. 8, 2012, for EP Application No. 12166818.0, filed Jan. 30, 2007, seven pages.
European Search Report mailed Jun. 14, 2012, for EP Application No. 12166820.6, filed Jan. 30, 2007, six pages.
European Search Report received in EP 1 621 989 (@ *Beyer Weaver & Thomas, LLP*) dated Mar. 27, 2006.
European supplementary search report for European Patent Application No. 99904228.6, mailed Feb. 16, 2005.
EVB Elektronik "TSOP6238 IR Receiver Modules for Infrared Remote Control Systems" dated Jan. 2004 1-pg.
Extended European search report for European Patent Application No. 06016858.0, mailed Dec. 21, 2007.
Extended European search report for European Patent Application No. 06016856.4, mailed Mar. 14, 2008.
Final Office Action mailed Dec. 20, 2007, for U.S. Appl. No. 10/927,925, filed Aug. 26, 2004, 25 pages.
Final Office Action mailed May 21, 2008, for U.S. Appl. No. 11/048,264, filed Jan. 31, 2005, 11 pages.
Final Office Action mailed Oct. 16, 2008, for U.S. Appl. No. 11/038,590, filed Jan. 18, 2005, 35 pages.
Final Office Action mailed Nov. 10, 2008, for U.S. Appl. No. 10/927,925, filed Aug. 26, 2004, 22 pages.
Final Office Action mailed Dec. 23, 2008, for U.S. Appl. No. 10/903,964, filed Jul. 30, 2004, 12 pages.
Final Office Action mailed Dec. 24, 2008, for U.S. Appl. No. 11/240,788, filed Sep. 30, 2005, 12 pages.
Final Office Action mailed Mar. 5, 2009, for U.S. Appl. No. 11/228,758, filed Sep. 16, 2005, 15 pages.
Final Office Action mailed Mar. 17, 2009, for U.S. Appl. No. 11/241,839, filed Sep. 30, 2005, 16 pages.
Final Office Action mailed Mar. 19, 2009, for U.S. Appl. No. 11/428,506, filed Jul. 3, 2006, seven pages.
Final Office Action mailed Jul. 7, 2009, for U.S. Appl. No. 11/048,264, filed Jan. 31, 2005, 14 pages.
Final Office Action mailed Nov. 12, 2009, for U.S. Appl. No. 11/349,350, filed Feb. 8, 2006, nine pages.
Final Office Action mailed Nov. 19, 2009, for U.S. Appl. No. 11/428,515, filed Jul. 3, 2006, 14 pages.

(56) References Cited

OTHER PUBLICATIONS

Final Office Action mailed Dec. 31, 2009, for U.S. Appl. No. 11/038,590, filed Jan. 18, 2005, 36 pages.
Final Office Action mailed Apr. 14, 2010, for U.S. Appl. No. 11/559,736, filed Nov. 14, 2006, 11 pages.
Final Office Action mailed May 12, 2010, for U.S. Appl. No. 11/428,503, filed Jul. 3, 2006, 12 pages.
Final Office Action mailed Jun. 4, 2010, for U.S. Appl. No. 10/903,964, filed Jul. 30, 2004, 22 pages.
Final Office Action mailed Jun. 11, 2010, for U.S. Appl. No. 11/559,833, filed Nov. 14, 2006, eight pages.
Final Office Action mailed Jul. 6, 2010, for U.S. Appl. No. 11/048,264, filed Jan. 31, 2005, 12 pages.
Final Office Action mailed Jul. 19, 2010, for U.S. Appl. No. 11/428,522, filed Jul. 3, 2006, six pages.
Final Office Action mailed Jul. 20, 2010, for U.S. Appl. No. 11/228,758, filed Sep. 16, 2005, 19 pages.
Final Office Action mailed Aug. 17, 2010, for U.S. Appl. No. 11/240,788, filed Sep. 30, 2005, nine pages.
Final Office Action mailed Sep. 2, 2010, for U.S. Appl. No. 11/272,868, filed Nov. 15, 2005, nine pages.
Final Office Action mailed Oct. 19, 2010, for U.S. Appl. No. 11/559,799, filed Nov. 14, 2006, eight pages.
Final Office Action mailed Oct. 29, 2010, for U.S. Appl. No. 11/559,763, filed Nov. 14, 2006, 15 pages.
Final Office Action mailed Nov. 23, 2010, for U.S. Appl. No. 11/696,693, filed Apr. 4, 2007, 24 pages.
Final Office Action mailed Nov. 23, 2010, for U.S. Appl. No. 11/830,801, filed Jul. 30, 2007, 13 pages.
Final Office Action mailed Nov. 26, 2010, for U.S. Appl. No. 11/830,793, filed Jul. 30, 2007, nine pages.
Final Office Action mailed Dec. 2, 2010, for U.S. Appl. No. 11/830,815, filed Jul. 30, 2007, nine pages.
Final Office Action mailed Dec. 3, 2010, for U.S. Appl. No. 11/830,788, filed Jul. 30, 2007, 15 pages.
Final Office Action mailed Jan. 19, 2011, for U.S. Appl. No. 11/980,721, filed Oct. 31, 2007, nine pages.
Final Office Action mailed Mar. 9, 2011, for U.S. Appl. No. 11/980,722, filed Oct. 31, 2007, 11 pages.
Final Office Action mailed Mar. 21, 2011, for U.S. Appl. No. 11/832,134, filed Aug. 1, 2007, 33 pages.
Final Office Action mailed Apr. 21, 2011, for U.S. Appl. No. 11/830,808, filed Jul. 30, 2007, 10 pages.
Final Office Action mailed May 11, 2011, for U.S. Appl. No. 11/048,264, filed Jan. 31, 2005, 12 pages.
Final Office Action mailed May 27, 2011, for U.S. Appl. No. 11/700,636, filed Jan. 30, 2007, nine pages.
Final Office Action mailed Aug. 10, 2011, for U.S. Appl. No. 11/240,788, filed Sep. 30, 2005, seven pages.
Final Office Action mailed Sep. 27, 2011, for U.S. Appl. No. 11/830,774, filed Jul. 30, 2007, 15 pages.
Final Office Action mailed Sep. 28, 2011, for U.S. Appl. No. 12/479,678, filed Jun. 5, 2009, 13 pages.
Final Office Action mailed Oct. 14, 2011, for U.S. Appl. No. 11/830,801, filed Jul. 30, 2007, 16 pages.
Final Office Action mailed Oct. 19, 2011, for U.S. Appl. No. 12/479,573, filed Jun. 5, 2009, 13 pages.
Final Office Action mailed Nov. 10, 2011, for U.S. Appl. No. 11/272,868, filed Nov. 15, 2005, nine pages.
Final Office Action mailed Nov. 17, 2011, for U.S. Appl. No. 11/830,781, filed Jul. 30, 2007, 16 pages.
Final Office Action mailed Nov. 17, 2011, for U.S. Appl. No. 12/479,617, filed Jun. 5, 2009, 18 pages.
Final Office Action mailed Nov. 18, 2011, for U.S. Appl. No. 11/878,024, filed Jul. 20, 2007, 18 pages.
Final Office Action mailed Nov. 28, 2011, for U.S. Appl. No. 11/038,590, filed Jan. 18, 2005, 43 pages.
Final Office Action mailed Dec. 16, 2011, for U.S. Appl. No. 12/422,212, filed Apr. 10, 2009, 20 pages.
Final Office Action mailed Feb. 3, 2012, for U.S. Appl. No. 12/422,205, filed Apr. 10, 2009, 16 pages.
Final Office Action mailed Feb. 17, 2012, for U.S. Appl. No. 11/830,801, filed Jul. 30, 2007, 14 pages.
Final Office Action mailed Mar. 1, 2012, for U.S. Appl. No. 11/048,264, filed Jan. 31, 2005, 13 pages.
Final Office Action mailed Mar. 1, 2012, for U.S. Appl. No. 11/830,793, filed Jul. 30, 2007, 14 pages.
Final Office Action mailed Mar. 9, 2012, for U.S. Appl. No. 11/700,636, filed Jan. 30, 2007, nine pages.
Final Office Action mailed on Mar. 22, 2012, for U.S. Appl. No. 10/903,964, filed Jul. 30, 2004, 17 pages.
Final Office Action mailed Mar. 26, 2012, for U.S. Appl. No. 12/118,639, filed May 9, 2008, seven pages.
Final Office Action mailed Apr. 13, 2012, for U.S. Appl. No. 12/468,401, filed May 19, 2009, 21 pages.
Final Office Action mailed Apr. 16, 2012, for U.S. Appl. No. 12/422,222, filed Apr. 10, 2009, 14 pages.
Final Office Action mailed Apr. 25, 2012, for U.S. Appl. No. 12/422,197, filed Apr. 10, 2009, 12 pages.
Final Office Action mailed Apr. 27, 2012, for U.S. Appl. No. 11/830,788, filed Jul. 30, 2007, 13 pages.
Final Office Action mailed May 1, 2012, for U.S. Appl. No. 12/434,439, filed May 1, 2009, 14 pages.
Final Office Action mailed May 8, 2012, for U.S. Appl. No. 12/139,411, filed Jun. 13, 2008, seven pages.
Final Office Action mailed May 9, 2012, for U.S. Appl. No. 11/980,722, filed Oct. 31, 2007, 14 pages.
Final Office Action mailed May 24, 2012, for U.S. Appl. No. 11/830,757, filed Jul. 30, 2007, 19 pages.
Final Office Action mailed May 29, 2012, for U.S. Appl. No. 12/500,978, filed Jul. 10, 2009, 10 pages.
Final Office Action mailed Jun. 7, 2012, for U.S. Appl. No. 11/228,758, filed Sep. 16, 2005, 16 pages.
Final Office Action mailed Jun. 8, 2012, for U.S. Appl. No. 12/422,225, filed Apr. 10, 2009, 12 pages.
Final Office Action mailed Jul. 6, 2012, for U.S. Appl. No. 11/830,815, filed Jul. 30, 2007, 15 pages.
Final Office Action mailed Jul. 6, 2012, for U.S. Appl. No. 11/696,693, filed Apr. 4, 2007, 24 pages.
Final Office Action mailed Aug. 3, 2012, for U.S. Appl. No. 11/830,808, filed Jul. 30, 2007, seven pages.
Fisher et al., "Repetitive Motion Disorders: The Design of Optimal Rate-Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "ActiveClick: Tactile Feedback for Touch Panels," In CHI 2001 Summary, pp. 121-122, 2001.
Hardy, "Fingerworks" Mar. 7, 2002; BBC World On Line.
Hardy, I. (Mar. 7, 2002). "Fingerworks."
Heap, T. et al. (Oct. 14, 1996). "Towards 3D Hand Tracking Using a Deformable Model," *Proceedings of the 2$^{nd}$ International Conference*, Killington, VT, USA, Oct. 14-16, 1996, *Automatic Face and Gesture Recognition, IEEE Comput. Soc.*, pp. 140-145.
Hillier and Gerald J. Lieberman, *Introduction to Operations Research* (1986).
International Search Report dated Mar. 3, 2006 (PCT/US 05/03325).
International search report for PCT/US99/01454, mailed May 14, 1999.
International Search Report received in corresponding PCT application No. PCT/US2006/008349 dated Oct. 6, 2006.
International Search Report mailed Apr. 24, 2007, for PCT Application No. PCT/US2005/025641 filed Jul. 19, 2005, five pages.
International Search Report mailed Aug. 28, 2007, for PCT Application No. PCT/US2004/009701, filed Mar. 31, 2004, one page.
International Search Report mailed Aug. 11, 2008, for PCT Application No. PCT/US2007/002512 filed Jan. 30, 2007, three pages.
International Search Report mailed Oct. 8, 2008, for PCT Application No. PCT/US2008/051727, filed Jan. 22, 2008, six pages.
Jacob et al., "Integrality and Separability of Input Devices," *ACM Transactions on Computer-Human Interaction*, 1:3-26 (Mar. 1994).
Japanese Office Action mailed Oct. 27, 2008, for JP Patent Application No. 2007-523644, one page.

(56) References Cited

OTHER PUBLICATIONS

Jones, R. (2001). "MTC Express Multi-Touch Controller," *Computer Music Journal* 25(1):97-99.
Kahney, L. (Mar. 8, 2004). "Pocket PCs Masquerade as IPods," available at: http://www.wired.com/gadgets/mac/news/2004/03/62543, last visited on Apr. 28, 2008, two pages.
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.
Korean Office Action mailed May 17, 2008, for KR Application No. 10-2007-7005010, with English Translation, 15 pages.
Lee, "A Fast Multiple-Touch-Sensitive Input Device," Master's Thesis, University of Toronto (1984).
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Lee, S.K. et al., "A Multi-Touch Three Dimensional Touch-Sensitive Tablet," in CHI '85 Proceedings, pp. 121-128, 2000 [(Apr. 1985). Conference Proceedings: Human Factors in Computing Systems, pp. 21-25.].
Malik, S. et al. (2004). "Visual Touchpad: A Two-Handed Gestural Input Device," *Proceedings of the 6$^{th}$ International Conference on Multimodal Interfaces*, State College, PA, Oct. 13-15, 2004, *ICMI '04, ACM* pp. 289-296.
Matsushita et al., "HoloWall: Designing a Finger, Hand, Body and Object Sensitive Wall," in Proceedings of UIST '97, Oct. 1997.
Mohri, K. (Nov. 25, 2000). "Wearable Human Interface Based on Hand/Finger Gesture Recognition," *Human Interface Association Magazine* 2(4):9-18. (Only Abstract in English.).
Nirei, K. et al. (Aug. 5, 1996). "Human Hand Tracking from Binocular Image Sequences," *Proceedings of the 1996 IEEE IECON 22$^{nd}$ International Conference*, Taipei, Taiwan, Aug. 5-10, 1996, *Industrial Electronics, Control, and Instrumentation* 1(5):297-302.
Non-Final Office Action mailed Jul. 24, 2007, for U.S. Appl. No. 10/927,925, filed Aug. 26, 2004, 20 pages.
Non-Final Office Action mailed Sep. 21, 2007, for U.S. Appl. No. 11/428,515, filed Jul. 3, 2006, seven pages.
Non-Final Office Action mailed Sep. 24, 2007, for U.S. Appl. No. 11/428,506, filed Jul. 3, 2006, six pages.
Non-Final Office Action mailed Sep. 24, 2007, for U.S. Appl. No. 11/428,521, filed Jul. 3, 2006, six pages.
Non-Final Office Action mailed Sep. 28, 2007, for U.S. Appl. No. 11/048,264, filed Jan. 31, 2005, 11 pages.
Non-Final Office Action mailed Nov. 1, 2007, for U.S. Appl. No. 11/240,788, filed Sep. 30, 2005, 20 pages.
Non-Final Office Action mailed Dec. 31, 2007, for U.S. Appl. No. 11/038,590, filed Jan. 18, 2005, 32 pages.
Non-Final Office Action mailed Jan. 28, 2008, for U.S. Appl. No. 11/428,522, filed Jul. 3, 2006, seven pages.
Non-Final Office Action mailed Feb. 4, 2008, for U.S. Appl. No. 11/428,515, filed Jul. 3, 2006, six pages.
Non-Final Office Action mailed Mar. 17, 2008, for U.S. Appl. No. 10/903,964, filed Jul. 30, 2004, 34 pages.
Non-Final Office Action mailed Apr. 30, 2008, for U.S. Appl. No. 11/240,788, filed Sep. 30, 2005, 12 pages.
Non-Final Office Action mailed May 5, 2008, for U.S. Appl. No. 10/927,925, filed Aug. 26, 2004, 22 pages.
Non-Final Office Action mailed Jul. 9, 2008, for U.S. Appl. No. 11/428,521, filed Jul. 3, 2006, 11 pages.
Non-Final Office Action mailed Sep. 2, 2008, for U.S. Appl. No. 11/428,522, filed Jul. 3, 2006, six pages.
Non-Final Office Action mailed Sep. 15, 2008, for U.S. Appl. No. 11/428,506, filed Jul. 3, 2006, eight pages.
Non-Final Office Action mailed Sep. 17, 2008, for U.S. Appl. No. 11/214,839, filed Sep. 30, 2005, 18 pages.
Non-Final Office Action mailed Oct. 3, 2008, for U.S. Appl. No. 11/228,758, filed Sep. 16, 2005, 16 pages.
Non-Final Office Action mailed Oct. 31, 2008, for U.S. Appl. No. 11/428,515, filed Jul. 3, 2006, seven pages.
Non-Final Office Action mailed Dec. 11, 2008, for U.S. Appl. No. 11/048,264, filed Jan. 31, 2005, 11 pages.
Non-Final Office Action mailed Jan. 6, 2009, for U.S. Appl. No. 11/349,350, filed Feb. 8, 2006, 10 pages.
Non-Final Office Action mailed Feb. 17, 2009, for U.S. Appl. No. 11/428,522, filed Jul. 3, 2006, six pages.
Non-Final Office Action mailed Mar. 5, 2009, for U.S. Appl. No. 11/272,868, filed Nov. 15, 2005, 15 pages.
Non-Final Office Action mailed Mar. 18, 2009, for U.S. Appl. No. 11/428,515, filed Jul. 3, 2006, 12 pages.
Non-Final Office Action mailed Apr. 2, 2009, for U.S. Appl. No. 11/428,501, filed Jul. 3, 2006, 11 pages.
Non-Final Office Action mailed Apr. 2, 2009, for U.S. Appl. No. 11/428,503, filed Jul. 3, 2006, 12 pages.
Non-Final Office Action mailed Apr. 2, 2009, for U.S. Appl. No. 11/038,590, filed Jan. 18, 2005, 41 pages.
Non-Final Office Action mailed Jun. 10, 2009, for U.S. Appl. No. 10/903,964, filed Jul. 30, 2004, 15 pages.
Non-Final Office Action mailed Jun. 10, 2009, for U.S. Appl. No. 11/240,788, filed Sep. 30, 2005, 13 pages.
Non-Final Office Action mailed Aug. 18, 2009, for U.S. Appl. No. 11/228,758, filed Sep. 16, 2005, 15 pages.
Non-Final Office Action mailed Aug. 25, 2009, for U.S. Appl. No. 11/428,522, filed Jul. 3, 2006, six pages.
Non-Final Office Action mailed Sep. 2, 2009, for U.S. Appl. No. 11/559,736, filed Nov. 14, 2006, 12 pages.
Non-Final Office Action mailed Oct. 5, 2009, for U.S. Appl. No. 11/559,799, filed Nov. 14, 2006, 14 pages.
Non-Final Office Action mailed Oct. 6, 2009, for U.S. Appl. No. 11/559,763, filed Nov. 14, 2006, 24 pages.
Non-Final Office Action mailed Oct. 14, 2009, for U.S. Appl. No. 11/428,501, filed Jul. 3, 2006, six pages.
Non-Final Office Action mailed Oct. 29, 2009, for U.S. Appl. No. 11/559,822, filed Nov. 14, 2006, 11 pages.
Non-Final Office Action mailed Oct. 30, 2009, for U.S. Appl. No. 11/428,503, filed Jul. 3, 2006, nine pages.
Non-Final Office Action mailed Dec. 7, 2009, for U.S. Appl. No. 11/272,868, filed Nov. 15, 2005, seven pages.
Non-Final Office Action mailed Dec. 18, 2009, for U.S. Appl. No. 11/048,264, filed Jan. 31, 2005, 11 pages.
Non-Final Office Action mailed Dec. 22, 2009, for U.S. Appl. No. 11/559,833, filed Nov. 14, 2006, six pages.
Non-Final Office Action mailed Dec. 24, 2009, for U.S. Appl. No. 11/677,958, filed Feb. 22, 2007, six pages.
Non-Final Office Action mailed Jan. 27, 2010, for U.S. Appl. No. 11/428,522, filed Jul. 3, 2006, five pages.
Non-Final Office Action mailed Feb. 3, 2010, for U.S. Appl. No. 11/228,758, filed Sep. 16, 2005, 20 pages.
Non-Final Office Action mailed Mar. 2, 2010, for U.S. Appl. No. 11/240,788, filed Sep. 30, 2005, 13 pages.
Non-Final Office Action mailed May 11, 2010, for U.S. Appl. No. 11/830,788, filed Jul. 30, 2007, eight pages.
Non-Final Office Action mailed Jun. 8, 2010, for U.S. Appl. No. 11/696,693, filed Apr. 4, 2007, 27 pages.
Non-Final Office Action mailed Jun. 8, 2010, for U.S. Appl. No. 11/830,808, filed Jul. 30, 2007, 13 pages.
Non-Final Office Action mailed Jun. 9, 2010, for U.S. Appl. No. 11/830,793, filed Jul. 30, 2007, eight pages.
Non-Final Office Action mailed Jun. 10, 2010, for U.S. Appl. No. 11/830,801, filed Jul. 30, 2007, 10 pages.
Non-Final Office Action mailed Jun. 22, 2010, for U.S. Appl. No. 11/830,815, filed Jul. 30, 2007, 12 pages.
Non-Final Office Action mailed Jul. 29, 2010, for U.S. Appl. No. 11/980,721, filed Oct. 31, 2007, nine pages.
Non-Final Office Action mailed Aug. 2, 2010, for U.S. Appl. No. 11/980,722, filed Oct. 31, 2007, five pages.
Non-Final Office Action mailed Sep. 17, 2010, for U.S. Appl. No. 11/832,134, filed Aug. 1, 2007, 26 pages.
Non-Final Office Action mailed Oct. 29, 2010, for U.S. Appl. No. 11/048,264, filed Jan. 31, 2005, 12 pages.
Non-Final Office Action mailed Nov. 18, 2010, for U.S. Appl. No. 11/700,636, filed Jan. 30, 2007, eight pages.

(56) References Cited

OTHER PUBLICATIONS

Non-Final Office Action mailed Nov. 23, 2010, for U.S. Appl. No. 11/830,808, filed Jul. 30, 2007, 11 pages.
Non-Final Office Action mailed Jan. 20, 2011, for U.S. Appl. No. 11/830,757, filed Jul. 30, 2007, 21 pages.
Non-Final Office Action mailed Feb. 9, 2011, for U.S. Appl. No. 11/240,788, filed Sep. 30, 2005, nine pages.
Non-Final Office Action mailed Feb. 17, 2011, for U.S. Appl. No. 11/852,690, filed Sep. 10, 2007, 10 pages.
Non-Final Office Action mailed Feb. 17, 2011, for U.S. Appl. No. 11/830,766, filed Jul. 30, 2007, 20 pages.
Non-Final Office Action mailed Mar. 18, 2011, for U.S. Appl. No. 11/830,774, filed Jul. 30, 2007, 18 pages.
Non-Final Office Action mailed Mar. 21, 2011, for U.S. Appl. No. 11/830,801, filed Jul. 30, 2007, 11 pages.
Non-Final Office Action mailed Mar. 31, 2011, for U.S. Appl. No. 12/479,573, filed Jun. 5, 2009, 17 pages.
Non-Final Office Action mailed Mar. 31, 2011, for U.S. Appl. No. 12/479,617, filed Jun. 5, 2009, 20 pages.
Non-Final Office Action mailed Mar. 31, 2011, for U.S. Appl. No. 12/479,678, filed Jun. 5, 2009, 18 pages.
Non-Final Office Action mailed Apr. 4, 2011, for U.S. Appl. No. 11/272,868, filed Nov. 15, 2005, nine pages.
Non-Final Office Action mailed Apr. 21, 2011, for U.S. Appl. No. 11/559,763, filed Nov. 14, 2006, seven pages.
Non-Final Office Action mailed Apr. 28, 2011, for U.S. Appl. No. 11/830,781, filed Jul. 30, 2007, 16 pages.
Non-Final Office Action mailed Apr. 29, 2011, for U.S. Appl. No. 11/980,721, filed Oct. 31, 2007, 10 pages.
Non-Final Office Action mailed May 4, 2011, for U.S. Appl. No. 11/038,590, filed Jan. 18, 2005, 40 pages.
Non-Final Office Action mailed May 4, 2011, for U.S. Appl. No. 12/118,639, filed May 9, 2008, seven pages.
Non-Final Office Action mailed Jun. 7, 2011, for U.S. Appl. No. 11/878,024, Jul. 20, 2007, 10 pages.
Non-Final Office Action mailed Jun. 28, 2011, for U.S. Appl. No. 12/422,197, filed Apr. 10, 2009, 18 pages.
Non-Final Office Action mailed Jun. 28, 2011, for U.S. Appl. No. 12/422,205, filed Apr. 10, 2009, 13 pages.
Non-Final Office Action mailed Jun. 28, 2011, for U.S. Appl. No. 12/422,212, filed Apr. 10, 2009, 16 pages.
Non-Final Office Action mailed Jun. 29, 2011, for U.S. Appl. No. 12/342,027, filed Dec. 22, 2008, 32 pages.
Non-Final Office Action mailed Jul. 19, 2011, for U.S. Appl. No. 11/980,722, filed Oct. 31, 2007, 12 pages.
Non-Final Office Action mailed Jul. 20, 2011, for U.S. Appl. No. 11/830,788, filed Jul. 30, 2007, 12 pages.
Non-Final Office Action mailed Aug. 4, 2011, for U.S. Appl. No. 11/830,793, filed Jul. 30, 2007, 13 pages.
Non-Final Office Action mailed Aug. 5, 2011, for U.S. Appl. No. 12/422,222, filed Apr. 10, 2009, 15 pages.
Non-Final Office Action mailed Aug. 5, 2011, for U.S. Appl. No. 12/422,225, filed Apr. 10, 2009, 17 pages.
Non-Final Office Action mailed Sep. 1, 2011, for U.S. Appl. No. 11/830,766, filed Jul. 30, 2007, 29 pages.
Non-Final Office Action mailed Sep. 16, 2011, for U.S. Appl. No. 11/830,757, filed Jul. 30, 2007, 26 pages.
Non-Final Office Action mailed Sep. 23, 2011, for U.S. Appl. No. 12/500,973, filed Jul. 10, 2009, 5 pages.
Non-Final Office Action mailed Sep. 27, 2011, for U.S. Appl. No. 11/700,636, filed Jan. 30, 2007, eight pages.
Non-Final Office Action mailed Sep. 29, 2011, for U.S. Appl. No. 10/903,964, filed Jul. 30, 2004, 17 pages.
Non-Final Office Action mailed Sep. 29, 2011, for U.S. Appl. No. 11/048,264, filed Jan. 31, 2005, 11 pages.
Non-Final Office Action mailed Sep. 30, 2011, for U.S. Appl. No. 12/468,401, filed May 19, 2009, 19 pages.
Non-Final Office Action mailed Oct. 14, 2011, for U.S. Appl. No. 12/434,439, filed May 1, 2009, nine pages.
Non-Final Office Action mailed Oct. 27, 2011, for U.S. Appl. No. 12/139,411, filed Jun. 13, 2008, six pages.
Non-Final Office Action mailed Nov. 8, 2011, for U.S. Appl. No. 12/118,639, filed May 9, 2008, five pages.
Non-Final Office Action mailed Nov. 10, 2011, for U.S. Appl. No. 11/830,815, filed Jul. 30, 2007, 15 pages.
Non-Final Office Action mailed Nov. 23, 2011, for U.S. Appl. No. 11/428,515, filed Jul. 3, 2006, eight pages.
Non-Final Office Action mailed Dec. 8, 2011, for U.S. Appl. No. 11/228,758, filed Sep. 16, 2005, 16 pages.
Non-Final Office Action mailed Dec. 8, 2011, for U.S. Appl. No. 12/500,925, filed Jul. 10, 2009, nine pages.
Non-Final Office Action mailed Dec. 9, 2011, for U.S. Appl. No. 12/500,984, filed Jul. 10, 2009, nine pages.
Non-Final Office Action mailed Dec. 12, 2011, for U.S. Appl. No. 12/500,951, filed Jul. 10, 2009, eight pages.
Non-Final Office Action mailed Dec. 16, 2011, for U.S. Appl. No. 12/500,978, filed Jul. 10, 2009, nine pages.
Non-Final Office Action mailed Dec. 22, 2011, for U.S. Appl. No. 11/696,693, filed Apr. 4, 2007, 29 pages.
Non-Final Office Action mailed Jan. 19, 2012, for U.S. Appl. No. 11/830,808, filed Jul. 30, 2007, eight pages.
Non-Final Office Action mailed Jan. 30, 2012, for U.S. Appl. No. 11/428,503, filed Jul. 3, 2006, 15 pages.
Non-Final Office Action mailed Mar. 2, 2012, for U.S. Appl. No. 11/852,690, filed Sep. 10, 2007, 12 pages.
Non-Final Office Action mailed Apr. 5, 2012, for U.S. Appl. No. 12/479,678, filed Jun. 5, 2009, 13 pages.
Non-Final Office Action mailed Apr. 16, 2012, 2011, for U.S. Appl. No. 12/422,212, filed Apr. 10, 2009, 20 pages.
Non-Final Office Action mailed May 2, 2012, for U.S. Appl. No. 11/832,134, filed Oct. 31, 2007, 25 pages.
Non-Final Office Action mailed May 7, 2012, for U.S. Appl. No. 12/118,645, filed May 9, 2008, five pages.
Non-Final Office Action mailed May 9, 2012, for U.S. Appl. No. 12/118,641, filed May 9, 2008, four pages.
Non-Final Office Action mailed May 17, 2012, for U.S. Appl. No. 12/118,648, filed May 9, 2008, four pages.
Non-Final Office Action mailed May 23, 2012, for U.S. Appl. No. 11/428,515, filed Jul. 3, 2006, 15 pages.
Non-Final Office Action mailed Jun. 7, 2012, for U.S. Appl. No. 11/830,766, filed Jul. 30, 2007, 14 pages.
Non-Final Office Action mailed Jun. 13, 2012, for U.S. Appl. No. 12/500,984, filed Jul. 10, 2009, eight pages.
Non-Final Office Action mailed Jun. 22, 2012, for U.S. Appl. No. 11/830,774, filed Jul. 30, 2007, 17 pages.
Non-Final Office Action mailed Jun. 25, 2012, for U.S. Appl. No. 11/830,781, filed Jul. 30, 2007, 19 pages.
Non-Final Office Action mailed Jun. 25, 2012, for U.S. Appl. No. 12/479,573, filed Jun. 5, 2009, 11 pages.
Non-Final Office Action mailed Jul. 27, 2012, for U.S. Appl. No. 12/118,659, filed May 9, 2008, five pages.
Non-Final Office Action mailed Jul. 31, 2012, for U.S. Appl. No. 11/228,758, filed Sep. 16, 2005, 14 pages.
Non-Final Office Action mailed Aug. 21, 2012, for U.S. Appl. No. 12/434,439, filed May 1, 2009, 12 pages.
Non-Final Office Action mailed Aug. 30, 2012, for U.S. Appl. No. 11/830,801, filed Jul. 30, 2007, 15 pages.
Notice of Allowability mailed Feb. 11, 2009, for U.S. Appl. No. 11/428,521, filed Jul. 3, 2006, five pages.
Notice of Allowability mailed Jul. 10, 2009, for U.S. Appl. No. 11/428,521, filed Jul. 3, 2006, five pages.
Notice of Allowability mailed Sep. 2, 2009, for U.S. Appl. No. 11/428,506, filed Jul. 3, 2006, five pages.
Notice of Allowability mailed Sep. 3, 2009, for U.S. Appl. No. 11/241,839, filed Sep. 30, 2005, 10 pages.
Notice of Allowability (Supplemental) mailed May 12, 2010, for U.S. Appl. No. 11/559,822, filed Nov. 14, 2006, two pages.
Notice of Allowance mailed Mar. 23, 2010, for U.S. Appl. No. 11/428,501, filed Jul. 3, 2006, eight pages.
Notice of Allowance mailed Apr. 26, 2010, for U.S. Appl. No. 11/559,822, filed Nov. 14, 2006, nine pages.

(56) References Cited

OTHER PUBLICATIONS

Notice of Allowance mailed Jun. 21, 2010, for U.S. Appl. No. 11/677,958, filed Feb. 22, 2007, eight pages.
Notice of Allowance mailed Aug. 16, 2011, for U.S. Appl. No. 11/559,763, filed Nov. 14, 2006, nine pages.
Notice of Allowance mailed Oct. 26, 2011, for U.S. Appl. No. 11/559,763, filed Nov. 14, 2006, nine pages.
Notice of Allowance mailed Mar. 9, 2012, for U.S. Appl. No. 11/240,788, filed Sep. 30, 2005, five pages.
Notice of Allowance mailed Mar. 26, 2012, for U.S. Appl. No. 12/500,973, filed Jul. 10, 2009, 12 pages.
Notice of Allowance mailed Apr. 2, 2012, for U.S. Appl. No. 11/038,590, filed Jan. 18, 2005, 11 pages.
Notice of Allowance mailed Apr. 13, 2012, for U.S. Appl. No. 12/342,027, filed Dec. 22, 2008, 10 pages.
Notice of Allowance mailed Jun. 27, 2012, for U.S. Appl. No. 11/559,736, filed Nov. 14, 2006, 11 pages.
Notice of Allowance mailed Jul. 26, 2012, for U.S. Appl. No. 11/428,503, filed Jul. 3, 2006, nine pages.
Notice of Allowance mailed Aug. 22, 2012, for U.S. Appl. No. 11/559,763, filed Nov. 14, 2006, 10 pages.
Notification of Reason(s) for Refusal mailed Apr. 25, 2011, for JP Patent Application No. 2008-531106, with English Translation, five pages.
Pavlovic, V.I. et al. (Jul. 1997). "Visual Interpretation of Hand Gestures for Human-Computer Interaction: A Review," *IEEE Transactions on Pattern Analysis and Machine Intelligence* 19(7):677-695.
PCT International Search Report received in Corresponding PCT Application No. PCT/US2006/031526 dated Feb. 14, 2007.
PCT International Search Report received in Corresponding PCT Application No. PCT/US2005/025657 dated Feb. 26, 2007.
PCT International Search Report received in Corresponding PCT Application No. PCT/US2006/031523 dated Feb. 27, 2007.
PCT International Search Report received in Corresponding PCT Application No. PCT/US2006/031527 dated Feb. 27, 2007.
Quantum Research Group "QT510 / Qwheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," In Proc. Of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.].
Rubine et al., "Programmable Finger-Tracking Instrument Controllers," *Computer Music Journal*, vol. 14, No. 1 (Spring 1990).
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages. (core citation).
Rubine, D. (May 1992). "Combining Gestures and Direct Manipulation," CHI '92, pp. 659-660. (core citation).
Rutledge et al., "Force-To-Motion Functions for Pointing," Human-Computer Interaction—Interact (1990).
Schiphorst, T. et al. "Using a Gestural Interface Toolkit for Tactile Input to a Dynamic Virtual Space," *Conference on Human Factors in Computing Systems, Proceedings*, Apr. 25, 2002, pp. 754-755.
Smith, R. et al. (1996). "Relating Distortion to Performance in Distortion-Oriented Displays," *Proceedings of the 6th Australian Conference on Computer-Human Interaction* (OZCHI '96), pp. 6-11.
Subatai Ahmad, "A Usable Real-Time 3D Hand Tracker," Proceedings of the 28th Asilomar Conference on Signals, Systems and Computers—Part 2 (of2), vol. 2 (Oct. 1994).
Sun Microsystems. (1992). "The Star7 PDA Prototype," located at <http://www.youtube.com/watch?v=Ahg8OBYixL0, last visited Jan. 15, 2010, seven pages.
Texas Instruments "TSC2003 / I2C Touch Screen Controller" Data Sheet SBAS 162, dated Oct. 2001, 20-pgs.
The Gadgeteer. (Jun. 6, 2003). "Apple iPod (30GB)," available at http://the-gadgeteer.com/review/apple_ipod_30gb$_{13}$ review, last visited Apr. 28, 2008, 19 pages.
U.S. Appl. No. 10/789,676, filed Feb. 27, 2004 entitled "Shape Detecting Input Device".
U.S. Appl. No. 11/272,868, filed Nov. 15, 2005, by Pryor.
U.S. Appl. No. 11/332,861, filed Jan. 13, 2006 which is a Reissue of U.S. Pat. No. 6,677,932 listed above.
U.S. Appl. No. 11/349,350, filed Feb. 8, 2006, by Pryor.
U.S. Appl. No. 11/878,024, filed Jul. 20, 2007, by Pryor.
U.S. Appl. No. 90/010,571, filed Jun. 10, 2009, by Pryor.
Wellner, "The Digital Desk Calculators: Tangible Manipulation on a Desk Top Display" in ACM UIST '91 Proceedings, pp. 27-34, Nov. 1991.
Westerman, W. (Jan. 1, 1999). "Hand Tracking, Finger Identification, and Chordic Manipulation on a Multi-Touch Surface," Dissertation, University of Delaware, pp. 1-333.
Westerman, Wayne, et al. (2001). "Multi-Touch: A New Tactile 2-D Gesture Interface for Human-Computer Interaction," *Proceedings of the Human Factors and Ergonomics Society* 45th Annual Meeting.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," in CHI '85 Proceedings, pp. 280-287, 1995.
Final Office Action mailed Sep. 10, 2013, for U.S. Appl. No. 12/468,401, filed May 19, 2009, 20 pages.
Final Office Action mailed Sep. 12, 2013, for U.S. Appl. No. 12/139,411, filed Jun. 13, 2008, seven pages.
Holt, J. (Jul. 2003, e-pub. Sep. 4, 2003). "Windows XP: A User Guide," The Robert Gordon University, IT Services Department, retrieved from the internet on Aug. 26, 2013, 27 pages.
Non-Final Office Action mailed Sep. 12, 2013, for U.S. Appl. No. 11/428,522, filed Jul. 3, 2006, six pages.
Non-Final Office Action mailed Sep. 13, 2013, for U.S. Appl. No. 12/422,205, filed Apr. 10, 2009, 17 pages.
Non-Final Office Action mailed Sep. 20, 2013, for U.S. Appl. No. 13/895,221, filed May 15, 2013, 15 pages.
Notice of Allowance mailed Sep. 17, 2013, for U.S. Appl. No. 11/830,757, filed Jul. 30, 2007, 10 pages.
Sears, A. et al. (Jun. 1990). "A New Era for Touchscreen Applications: High Precision, Dragging Icons, and Refined Feedback," University of Maryland, Human-Computer Interaction Laboratory, retrieved from the internet on Aug. 26, 2013, 39 pages.
Anonymous. (Sep. 2003). "P900 User Guide," Second Edition, *Sony Ericsson Mobile Communications AB*: located at http://www.sonyericsson.com/downloads/P900_UG_R1b_EN.pdf, pp. 8, 16, 17, 20, 24-26, 42-45, 137 (98 pages total).
Anonymous. (2004). "Devices," *Technology Loan Catalog*, located at http://www.tsbvi.edu/outreach/techloan/catalog.html last visited Jun. 6, 2008, nine pages.
Anonymous. (2004). "Fastap™ Keypads Redefine Mobile Phones," *DIGITWireless*, located at http://www/digitwireless.com, last visited Nov. 18, 2005, nine pages.
Anonymous. (Jan. 21, 2004). "Compare Keyboards with the Keyboard Compatibility Chart, Learn More About Alternative Keyboards," *Solutions for Humans*, located at http://www.keyalt.com/kkeybrdp.html, last visited Dec. 8, 2005, five pages.
Anonymous. (2005). "Fastap™," *DIGITWireless*, located at http://www.digitwireless.com/about/faq.html, last visited Dec. 6, 2005, five pages.
Anonymous. (2005). "Four-Button Keyboard," *WikiPodLinux* located at http://ipodlinux.org/Four-Button_Keyboard, last visited Dec. 5, 2005, two pages.

(56) References Cited

OTHER PUBLICATIONS

Anonymous. (2005). "Introducing the Ultimate Smartphone Keypad," Delta II™ Keypads, *Chicago Logic, Inc.*, located at http://www.chicagologic.com, last visited Nov. 18, 2005, two pages.
Anonymous. (2005). "T9® Text Input for Keypad Devices," *Tegic Communications*™ located at http://www.tegic.com, last visited Nov. 18, 2005, one page.
Anonymous. (2005). "Text Input (Legacy)," *WikiPodLinux* located at http://ipodlinux.org/Text_Input_%28legacy%29, last visited Dec. 5, 2005, eight pages.
Anonymous. (2005). "Text Input Concepts," *WikiPodLinux* located at http://web.archive.org/web/20051211165254/http://ipodlinux.org/Text_Input_Concepts last visited Dec. 5, 2005, three pages.
Anonymous. (2005). "Text Input Methods," *WikiPodLinux* located at http://ipodlinux.org/Text_Input_Methods, last visited Dec. 5, 2005, five pages.
Anonymous. (2005). "You Heard of Touch Screens Now Check Out Touch Keys," *Phoneyworld*, located at http://www.phoneyworld.com/newspage.aspx?n=1413, last visited Nov. 18, 2005, two pages.
Anonymous. (Apr. 6, 2005). "Microsoft's New-Smart Phone Interface: Your Thumb," textually.org located at http://www.textually.org/textually/archives/2005/04/007819.html last visited Nov. 18, 2005, two pages.
Anonymous. (Jun. 22, 2005). "LG Develops New Touch Pad Cell Phones," textually.org located at http://textually.org/textually/archives/2005/06/009903.html, last visited Nov. 18, 2005, one page.
Anonymous. (Nov. 3, 2005). "Samsung Releases Keyboard Phone in US," textually.org located at http://www.textually.org/textually/archives/2005/11/010482.html last visited Nov. 18, 2005, one page.
Anonymous. (2006). Centroid, located at http://faculty,evansville.edu/ck6/tcenter/class/centroid.html, last visited Apr. 28, 2006, 1 page.
Anonymous. (2006). Centroid, located at http://www.pballew.net/centroid.html, last visited Apr. 28, 2006, three pages.
Casario, M. (Oct. 5, 2005). "Hands on Macromedia World: Touch Screen Keypad for Mobile Phone by DoCoMo," located at http://casario.blogs.com/mmworl/2005/10/touch_screen_ke.html, last visited Nov. 18, 2005, 1 page.
Day, B. (Jan. 6, 2004). "Will Cell Phones Render iPods Obsolete?" Java.net, located at http://weblogs.javanet/pub/wig/883, last visited Dec. 12, 2005, three pages.
Final Office Action mailed May 12, 2009, for U.S. Appl. No. 11/228,700, filed Sep. 16, 2005, 13 pages.
Final Office Action mailed Dec. 8, 2009, for U.S. Appl. No. 11/459,615, filed Jul. 24, 2006, 11 pages.
Final Office Action mailed Nov. 18, 2010, for U.S. Appl. No. 11/961,663, filed Dec. 20, 2007, 14 pages.
Final Office Action mailed Jul. 27, 2012, for U.S. Appl. No. 11/696,701, filed Apr. 4, 2007, 13 pages.
Final Office Action mailed Sep. 18, 2012, for U.S. Appl. No. 11/852,690, filed Sep. 10, 2007, 13 pages.
International Search Report mailed Apr. 11, 2008, for PCT Application No. PCT/US2007/060119, nine pages.
International Search Report mailed Sep. 15, 2008, for PCT Application No. PCT/US2007/088904, nine pages.
Non-Final Office Action mailed Sep. 17, 2008, for U.S. Appl. No. 11/228,700, filed Sep. 16, 2005, 18 pages.
Non-Final Office Action mailed May 22, 2009, for U.S. Appl. No. 11/459,615, filed Jul. 24, 2006, nine pages.
Non-Final Office Action mailed May 28, 2009, for U.S. Appl. No. 11/459,606, filed Jul. 24, 2006, 17 pages.
Non-Final Office Action mailed Apr. 13, 2010, for U.S. Appl. No. 11/459,615, filed Jul. 24, 2006, nine pages.
Non-Final Office Action mailed Sep. 25, 2012, for U.S. Appl. No. 11/428,515, filed Jul. 3, 2006, 15 pages.
O'Neal, W. (2005). "Smart Phones with Hidden Keyboards," located at http://msn.com.com/4250-6452__16-6229969-1.html, last visited Nov. 18, 2005, three pages.
Sears, A. et al. (2005). "Data Entry for Mobile Devices using Soft Keyboards: Understanding the Effects of Keyboard Size and User Tasks," Abstract, *Int'l Journal of Human-Computer Interaction*, vol. 16, No. 2, one page.
Final Office Action mailed Oct. 12, 2012, for U.S. Appl. No. 12/118,648, filed May 9, 2008, eight pages.
Final Office Action mailed Oct. 25, 2012, for U.S. Appl. No. 11/832,134, filed Aug. 1, 2007, 27 pages.
Non-Final Office Action mailed Oct. 12, 2012, for U.S. Appl. No. 12/422,212, filed Apr. 10, 2009, five pages.
Final Office Action mailed Oct. 11, 2013, for U.S. Appl. No. 12/422,222, filed Apr. 10, 2009, 16 pages.
Non-Final Office Action mailed Oct. 11, 2013, for U.S. Appl. No. 12/422,197, filed Apr. 10, 2009, 12 pages.
Notice of Allowance mailed Oct. 8, 2013, for U.S. Appl. No. 11/830,774, filed Jul. 30, 2007, 11 pages.
Notice of Allowance mailed Oct. 17, 2013, for U.S. Appl. No. 11/559,833, filed Nov. 14, 2006, 12 pages.
Notice of Allowance mailed Nov. 1, 2013, for U.S. Appl. No. 13/895,221, filed May 15, 2013, 12 pages.
Non-Final Office Action mailed Nov. 8, 2012, for U.S. Appl. No. 12/479,678, filed Jun. 5, 2009, five pages.
Non-Final Office Action mailed Nov. 16, 2012, for U.S. Appl. No. 13/569,065, filed Aug. 7, 2012, eight pages.
Non-Final Office Action mailed Nov. 29, 2012, for U.S. Appl. No. 11/559,833, filed Nov. 14, 2006, 10 pages.
European Search Report mailed Feb. 25, 2013, for EP Application No. 13150499.5, five pages.
Final Office Action mailed Mar. 21, 2013, for U.S. Appl. No. 11/830,788, filed Jul. 30, 2007, 12 pages.
Final Office Action mailed Apr. 12, 2013, for U.S. Appl. No. 11/830,793, filed Jul. 30, 2007, 15 pages.
Final Office Action mailed Apr. 30, 2013, for U.S. Appl. No. 11/559,833, filed Nov. 14, 2006, 10 pages.
Final Office Action mailed May 9, 2013, for U.S. Appl. No. 11/832,134, filed Aug. 1, 2007, 29 pages.
Final Office Action mailed May 9, 2013, for U.S. Appl. No. 13/569,065, filed Aug. 7, 2012, nine pages.
Non-Final Office Action mailed Mar. 18, 2013, for U.S. Appl. No. 12/422,222, filed Apr. 10, 2009, 15 pages.
Non-Final Office Action mailed Mar. 19, 2013, for U.S. Appl. No. 12/468,401, filed May 19, 2009, 21 pages.
Non-Final Office Action mailed Mar. 26, 2013, for U.S. Appl. No. 13/757,726, filed Feb. 1, 2013, eight pages.
Non-Final Office Action mailed May 9, 2013, for U.S. Appl. No. 11/980,721, filed Oct. 31, 2007, 14 pages.
Non-Final Office Action mailed May 15, 2013, for U.S. Appl. No. 11/980,722, filed Oct. 31, 2007, 11 pages.
Notice of Allowance mailed Apr. 2, 2013, for U.S. Appl. No. 12/479,678, filed Jun. 5, 2009, 11 pages.
Final Office Action mailed Mar. 21, 2014, for U.S. Appl. No. 11/428,522, filed Jul. 3, 2006, eight pages.
Notice of Allowance mailed Mar. 14, 2014, for U.S. Appl. No. 12/422,222, filed Apr. 10, 2009, nine pages.
Final Office Action mailed Dec. 3, 2014, for U.S. Appl. No. 14/089,240, filed Nov. 25, 2013, 12 pages.
Non-Final Office Action mailed Dec. 4, 2014, for U.S. Appl. No. 12/422,205, filed Apr. 10, 2009, 16 pages.
Final Office Action mailed Jan. 29, 2013, for U.S. Appl. No. 11/830,766, filed Jul. 30, 2007, 16 pages.
Final Office Action mailed Jan. 29, 2013, for U.S. Appl. No. 11/830,774, filed Jul. 30, 2007, 19 pages.
Final Office Action mailed Feb. 15, 2013, for U.S. Appl. No. 12/422,205, filed Apr. 10, 2009, 16 pages.
Non-Final Office Action mailed Feb. 14, 2013, for U.S. Appl. No. 11/228,758, filed Sep. 16, 2005, 14 pages.
Non-Final Office Action mailed Feb. 21, 2013, for U.S. Appl. No. 12/422,197, filed Apr. 10, 2009, 12 pages.
Notice of Allowance mailed Dec. 24, 2012, for U.S. Appl. No. 13/556,019, filed Jul. 23, 2012, five pages.
Notice of Allowance mailed Feb. 8, 2013, for U.S. Appl. No. 11/830,801, filed Jul. 30, 2007, seven pages.

(56) References Cited

OTHER PUBLICATIONS

Notice of Allowance mailed Feb. 15, 2013, for U.S. Appl. No. 11/559,799, filed Nov. 14, 2006, 13 pages.
Notice of Allowance mailed Feb. 19, 2013, for U.S. Appl. No. 12/422,212, filed Apr. 10, 2009, nine pages.
Notice of Allowance mailed Feb. 21, 2013, for U.S. Appl. No. 12/342,027, filed Dec. 22, 2008, 10 pages.
Notice of Allowance mailed Feb. 22, 2013, for U.S. Appl. No. 12/500,978, filed Jul. 10, 2009, five pages.
Notice of Allowance mailed Mar. 5, 2013, for U.S. Appl. No. 12/434,439, filed May 1, 2009, nine pages.
Notice of Allowance mailed Mar. 6, 2013, for U.S. Appl. No. 10/903,964, filed Jul. 30, 2004, seven pages.
Non-Final Office Action mailed Jun. 2, 2015, for U.S. Appl. No. 11/428,522, filed Jul. 3, 2006, six pages.
Final Office Action mailed Mar. 24, 2015, for U.S. Appl. No. 12/422,205, filed Apr. 10, 2009, 16 pages.
Non-Final Office Action mailed Feb. 24, 2015, for U.S. Appl. No. 13/620,299, filed Sep. 14, 2012, six pages.
Non-Final Office Action mailed Apr. 3, 2015, for U.S. Appl. No. 14/476,545, filed Sep. 3, 2014, 11 pages.
Non-Final Office Action mailed Apr. 24, 2015, for U.S. Appl. No. 11/048,264, filed Jan. 31, 2005, nine pages.
Notice of Allowance mailed Mar. 27, 2015, for U.S. Appl. No. 14/089,240, filed Nov. 25, 2013, eight pages.
Chinese Search Report mailed Sep. 21, 2015, for Chinese Patent Application No. 2013101786229, filed Jul. 19, 2005, two pages.
Westerman, W. (1999). "Hand Tracking, Finger Identification, and Chordic Manipulation on a Multi-Touch Surface," Excerpts, *ProQuest Dissertations and Theses Global*, 22 pages.
Non-Final Office Action mailed Dec. 2, 2015, for U.S. Appl. No. 12/118,639, filed May 9, 2008, six pages.

* cited by examiner

| FINGER COMBO | GESTURE | SPACE | SPEED | RELIABILITY | COMFORT | EASE | OVERALL |
|---|---|---|---|---|---|---|---|
| 1 FINGER | SLIDE | * | 5 | 5 | 5 | 5 | 5 |
| 1 FINGER | TAP | * | 5 | 2 | 5 | 5 | 4.25 |
| 1 FINGER | TAP + 1/2 | * | 3 | 3 | 2 | 2 | 2.5 |
| 2 FINGER | 2 FING. DOWN | ** | 4 | 3 | 4 | 4 | 3.75 |
| 2 FINGER | SLIDE | ** | 5 | 5 | 5 | 4 | 4.75 |
| 2 FINGER | TAP | * | 5 | 5 | 5 | 4 | 4.75 |
| 2 FINGER | SPREAD | *** | 3 | 3 | 2 | 3 | 2.75 |
| 3 FINGER | - | *** | 5 | 4 | 4 | 4 | 4.25 |
| 4 FINGER | - | **** | 4 | 3 | 4 | 4 | 3.75 |
| 5 FINGER | - | ****** | 5 | 5 | 5 | 4 | 4.75 |
| THUMB + 1 FINGER | - | **** | 4 | 3 | 3 | 3 | 3.25 |
| THUMB + 2 FINGER | - | **** | 3 | 3 | 3 | 2 | 2.5 |
| THUMB + 3 FINGER | - | ***** | 3 | 3 | 3 | 2 | 2.5 |

FIG. 37

| COMMAND/OPERATION | FREQUENCY |
|---|---|
| POINT | 5 |
| CLICK | 4.5 |
| DRAG | 4 |
| SCROLL | 3.5 |
| BACK | 3 |
| FORWARD | 2.5 |
| CONTEXT MENU | 2.5 |
| ZOOM | 2.5 |
| CUT | 2 |
| COPY | 2 |
| PASTE | 2 |
| SAVE | 2 |
| EXPOSE | 2 |
| DASHBOARD | 1.5 |
| SPOTLIGHT | 1 |
| OPEN | 1 |
| CLOSE | 1 |
| NEW | 1 |
| SAVE | 0.5 |
| PRINT | 0.5 |
| EXIT | 0.5 |
| FIND/REPLACE | 0.5 |
| UNDO/REDO | 0.5 |
| TAB | 0.5 |
| ENTER | 0.5 |

FIG. 38

| Hand | # of fingers | gesture event | behavior |
|---|---|---|---|
| primary | 1 | tap | click |
| | | Position/motion | point |
| primary | 2 adj. | tap | click |
| | | Position/motion | drag |
| primary | 2 non adj. | tap | click |
| | | Position/motion | Secondary drag |
| primary | 3 | Motion | Scroll/pan |
| primary | 3 | Slide right | forward |
| | | Slide left | back |
| | | Slide up | stop |
| | | Slide down | reload |
| primary | Thumb +1 | Slide right | tab |
| | | Slide left | bktab |
| | | Slide up | undo |
| | | Slide down | redo |
| | | Rotate CCW | cancel |
| | | Rotate CW | Select all |
| | | spread | paste |
| | | contract | cut |
| | | tap | copy |
| primary | Thumb +2 | Rotate CCW | open |
| | | Rotate CW | close |
| | | spread | new |
| | | contact | save |
| primary | Thumb +3 | motion | Move window |
| primary | Thumb +4 | motion | point |

FIG. 42

| Hand | # of fingers | gesture event | behavior |
|---|---|---|---|
| primary | 1 | tap<br>Position/motion | click<br>point |
| primary | 2 | tap<br>Position/motion | click<br>drag |
| primary | 3 | motion | Move window |
| primary | 4 | motion | Scroll/pan |
| primary | 5 | motion | point |
| primary | Thumb +1 | Slide up<br>Slide down<br>spread<br>contract<br>tap | undo<br>redo<br>paste<br>cut<br>copy |
| primary | Thumb +2 | Slide left<br>Slide right<br>Slide up<br>Slide down<br>spread<br>contract | Expose 1<br>Expose 2<br>Expose 3<br>dashboard<br>replace<br>find |
| primary | Thumb +3 | Slide left<br>Slide right<br>Rotate CCW<br>Rotate CW<br>spread<br>contact | back<br>forward<br>open<br>close<br>new<br>save |

| Hand | # of fingers | gesture event | behavior |
|---|---|---|---|
| secondary | 1 | Slide up<br>Slide down<br>Slide right<br>Slide left<br>pause | Arrow up (text cursor)<br>Arrow down<br>Arrow right<br>Arrow left<br>Apply alt/option to other hand |
| secondary | 2 | Slide up<br>Slide down<br>Slide right<br>Slide left | Select up (e.g., <shift> arrow)<br>Select down<br>Select right<br>Select left |
| secondary | 3 | motion | Move/resize window in<br>Conjunction with opposite hand |
| secondary | 4 | Slide up<br>Slide down<br>Slide right<br>Slide left<br>pause | Page up<br>Page down<br>begin<br>endline<br>Apply shift to opposite hand |
| secondary | 5 | spread<br>contact<br>Rotate CCW<br>Rotate CW | Zoom out screen<br>Zoom in screen<br>Rotate CCW<br>Rotate CW |

FIG. 43

| Hand | # of fingers | gesture event | behavior |
|---|---|---|---|
| primary | 1 | tap<br>Position/motion | click<br>point |
| primary | 2 | tap<br>spread<br>contract<br>slide<br>rotate | Secondary click (right click)<br>Enlarge object<br>shrink object<br>pan<br>Rotate object |
| primary | 3 | motion | Primary drag |
| primary | 4 | motion<br>tap | Scroll pan<br>Secondary click (right click) |
| primary | 5 | motion | point |
| primary | Thumb +<br>Middle +<br>ring | motion | Secondary drag |
| primary | Thumb +<br>index +<br>pinky | tap<br>motion<br>Slide up | expose<br>Window drag, resize<br>Expose 3 |
| primary | L3 + R3 | tap<br>motion | Maximize/restore<br>Opposite corner frame drag/resize |

FIG. 44

GESTURING WITH A MULTIPOINT SENSING DEVICE

CROSS-REFERENCE TO RELATED APPLICATIONS

This application is a Continuation-in-Part of U.S. application Ser. No. 11/700,636, filed on Jan. 30, 2007, entitled "GESTURING WITH A MULTIPOINT SENSING DEVICE", which claims priority benefit of U.S. Provisional Patent Application No. 60/763,605, filed Jan. 30, 2006, and entitled "GESTURING WITH A MULTIPOINT SENSING DEVICE," all of which are herein incorporated by reference.

This application is a Continuation-in-Part of U.S. patent application Ser. No. 10/903,964, filed on Jul. 30, 2004, entitled "GESTURES FOR TOUCH SENSITIVE INPUT DEVICES," and which is herein incorporated by reference.

This application is a Continuation-in-Part of U.S. patent application Ser. No. 11/015,434, filed on Dec. 17, 2004, entitled "METHOD AND APPARATUS FOR INTEGRATING MANUAL INPUT," which has been issued as U.S. Pat. No. 7,339,580, which is a continuation of U.S. application Ser. No. 09/236,513, which has been issued as U.S. Pat. No. 6,323,846, which claims priority to U.S. Provisional Patent Application No. 60/072,509 filed Jan. 26, 1998, all of which are herein incorporated by reference.

This application is also related to the following patent applications, each of which is herein incorporated by reference:

U.S. patent application Ser. No. 10/654,108, filed Sep. 2, 2003, entitled "AMBIDEXTROUS MOUSE;"

U.S. patent application Ser. No. 10/789,676, filed Feb. 27, 2004, entitled "SHAPE DETECTING INPUT DEVICE;"

U.S. patent application Ser. No. 10/840,862, filed May 6, 2004, entitled "MULTIPOINT TOUCHSCREEN;"

U.S. patent application Ser. No. 11/115,539, filed Apr. 26, 2005, entitled "HAND HELD ELECTRONIC DEVICE WITH MULTIPLE TOUCH SENSING DEVICES;"

U.S. patent application Ser. No. 11/241,839, filed Jul. 30, 2004, entitled "PROXIMITY DETECTOR IN HANDHELD DEVICE;"

U.S. Provisional Patent Application No. 60/658,777, filed Mar. 4, 2005, entitled "MULTI-FUNCTIONAL HANDHELD DEVICE;"

U.S. patent application Ser. No. 10/903,964, filed Jul. 30, 2004, entitled "GESTURES FOR TOUCH SENSITIVE INPUT DEVICES;"

U.S. patent application Ser. No. 11/038,590, filed Jan. 18, 2005, entitled "MODE-BASED GRAPHICAL USER INTERFACES FOR TOUCH SENSITIVE INPUT DEVICES;"

U.S. patent application Ser. No. 11/048,264, filed Jan. 31, 2005, entitled "GESTURES FOR TOUCH SENSITIVE INPUT DEVICES;"

U.S. patent application Ser. No. 11/228,737, filed Sep. 16, 2005, entitled "ACTIVATING VIRTUAL KEYS OF A TOUCH-SCREEN VIRTUAL KEYBOARD;"

U.S. patent application Ser. No. 11/228,758, filed Sep. 16, 2005, entitled "VIRTUAL INPUT DEVICE PLACEMENT ON A TOUCH SCREEN USER INTERFACE;"

U.S. patent application Ser. No. 11/228,700, filed Sep. 16, 2005, entitled "OPERATION OF A COMPUTER WITH TOUCH SCREEN INTERFACE;"

U.S. patent application Ser. No. 10/927,925, filed Aug. 26, 2004, entitled "VISUAL EXPANDER;"

U.S. patent application Ser. No. 10/927,575, filed Aug. 25, 2004, entitled "WIDE TOUCHPAD ON A PORTABLE COMPUTER;"

U.S. patent application Ser. No. 11/619,553, filed Jan. 3, 2007, entitled "MULTI-TOUCH GESTURE DICTIONARY;" and U.S. patent application Ser. No. 11/619,571, filed Jan. 3, 2007, entitled "MULTI-TOUCH GESTURE DICTIONARY."

BACKGROUND OF THE INVENTION

1. Field of the Invention

The present invention relates generally to gesturing associated with multipoint sensing devices.

2. Description of the Related Art

There exist today many styles of input devices for performing operations in a computer system. The operations generally correspond to moving a cursor and making selections on a display screen. The operations may also include paging, scrolling, panning, zooming, etc. By way of example, the input devices may include buttons, switches, keyboards, mice, trackballs, touch pads, joy sticks, touch screens and the like. Each of these devices has advantages and disadvantages that are taken into account when designing the computer system.

With touch pads, the movement of the input pointer corresponds to the relative movements of the user's finger (or stylus) as the finger is moved along a surface of the touch pad. Touch screens, on the other hand, are a type of display screen that has a touch-sensitive transparent panel covering the screen. When using a touch screen, a user makes a selection on the display screen by pointing directly to GUI objects on the screen (usually with a stylus or finger). In general, the touch device recognizes the touch and position of the touch and the computer system interprets the touch and thereafter performs an action based on the touch event.

In order to provide additionally functionality, gestures have been implemented with some of these input devices. By way of example, in touch pads, selections may be made when one or more taps are detected on the surface of the touch pad. In some cases, any portion of the touch pad may be tapped, and in other cases a dedicated portion of the touch pad may be tapped. In addition to selections, scrolling may be initiated by using finger motion at the edge of the touch pad.

Unfortunately, gesturing is severely limited by the fact that most touch technologies are only capable of reporting a single point even when multiple objects are placed on the sensing surface. That is, they lack the ability to track multiple points of contact simultaneously. In resistive and capacitive technologies, an average of all simultaneously occurring touch points are determined and a single point which falls somewhere between the touch points is reported. In surface wave and infrared technologies, it is impossible to discern the exact position of multiple touch points that fall on the same horizontal or vertical lines due to masking. In either case, faulty results are generated.

Based on the above, there is a need for multipoint sensing devices and methods of implementing gestures with multipoint sensing devices.

SUMMARY OF THE INVENTION

The invention relates, in one embodiment, to an electronic system. The electronic system includes a multipoint sensing device that provides a multipoint sensing area for receiving inputs from one or more objects. The electronic system also includes a gesture module configured to determine a gesture set for a given input arrangement received by the multipoint sensing area of the multipoint sensing device, to monitor the given input arrangement for one or more gesture events included in the gesture set, and to initiate input actions associated with a gesture event when the gesture event is performed with the input arrangement. The input arrangement may for example be an arrangement of fingers and/or other parts of the hand.

The invention relates, in another embodiment, to a gestural control method. The method includes detecting multiple points within a sensing area at the same time. The method also includes determining a chord when one or more points are detected within the sensing area. The chord is a specific arrangement of points within the sensing area. The method further includes determining a gesture set associating commands to one or more gesture events. The method additionally includes monitoring points for gesture events. Moreover, the method includes performing command associated with gesture event if a gesture event is recognized.

The invention relates, in another embodiment, to a control operation. The control operations includes detecting a touch or near touch. The operations also includes determining a gesture set for the touch. The gesture set includes one or more gesture events for provoking or initiating a command. The operation further includes monitoring the touch for a gesture event. The operation additionally includes initiating a command when a gesture event associated with the gesture set is performed.

The invention relates, in another embodiment, to a gesture operation. The operation includes monitoring a touch motion. The operation also includes differentiating the touch motion between first and second states. The operation further includes performing a first action if the touch motion is associated with first state. The operation additionally includes performing a second action if motion is associated with second state.

The invention relates, in another embodiment, to a control operation. The control operation includes providing a first input device and a second input device that is different than the first input device. The first input device includes an object sensing device such as a touch sensing device for providing input events. The operation also includes monitoring the first input device for input events. The operation further includes simultaneously monitoring the second input device for input events. The operation additionally includes performing input operations in accordance with input events associated with first input device. Moreover, the method includes simultaneously performing input operations in accordance with input events associated with second input device.

The invention relates, in another embodiment, to a control operation. The control operation provides a list of input functions. The input function have commands and gesture events that are linked to the commands. The commands are related to the input function. The operation also includes assigning input functions to chords. The operation additionally includes linking an input function to a chord when the chord is recognized.

The invention relates, in another embodiment, to a control panel. The control panel includes displaying a menu of input functions. The control panel also includes displaying a gesture set that shows commands associated with a selected input function, and gesture events assigned to the commands. The control operation further includes displaying a list of chords. In order to set up a gesture map, a user selects desired input function from list of input functions and selects a desired chord from the list of chords.

The invention relates, in another embodiment, to a gesture design process. The design process includes providing a list of chords and ranking the chords from easiest to hardest. The design process also includes ranking the frequency of operations from most frequent to least frequent. The design process further includes matching the easiest chords with the most frequent operations, and matching the hardest chords with the least frequent operations. The design process may additionally include fine tuning chord/operation grouping.

The invention relates, in another embodiment, to a gesture operation. The gesture operations includes detecting a first finger. The gesture operation also includes determining the state of the finger. The state of the finger may for example be moving or stationary. The gesture operation further includes detecting one or more additional fingers. For example, a second finger may be detected. The gesture operation additionally includes determining the state of the additional fingers. The state of the additional fingers may for example be that they are present or not. Moreover, the method includes implementing different input modes based on timing of states of first and additional fingers relative to one another. The different modes may for example be pointing modes, dragging modes and the like.

BRIEF DESCRIPTION OF THE DRAWINGS

The invention will be readily understood by the following detailed description in conjunction with the accompanying drawings, wherein like reference numerals designate like structural elements, and in which:

FIG. 37 shows an illustrative matrix for rating chords, in accordance with one embodiment of the present invention.

FIG. 38 shows an illustrative matrix for ranking frequency of operations for a few operations, in accordance with one embodiment of the present invention.

FIG. 42 shows an illustrative diagram of a gesture map, in accordance with one embodiment of the present invention.

FIG. 43 is a diagram of a gesture map, in accordance with one embodiment of the present invention.

FIG. 44 is a diagram of a gesture map, in accordance with one embodiment of the present invention.

DETAILED DESCRIPTION OF THE INVENTION

Figure 1:
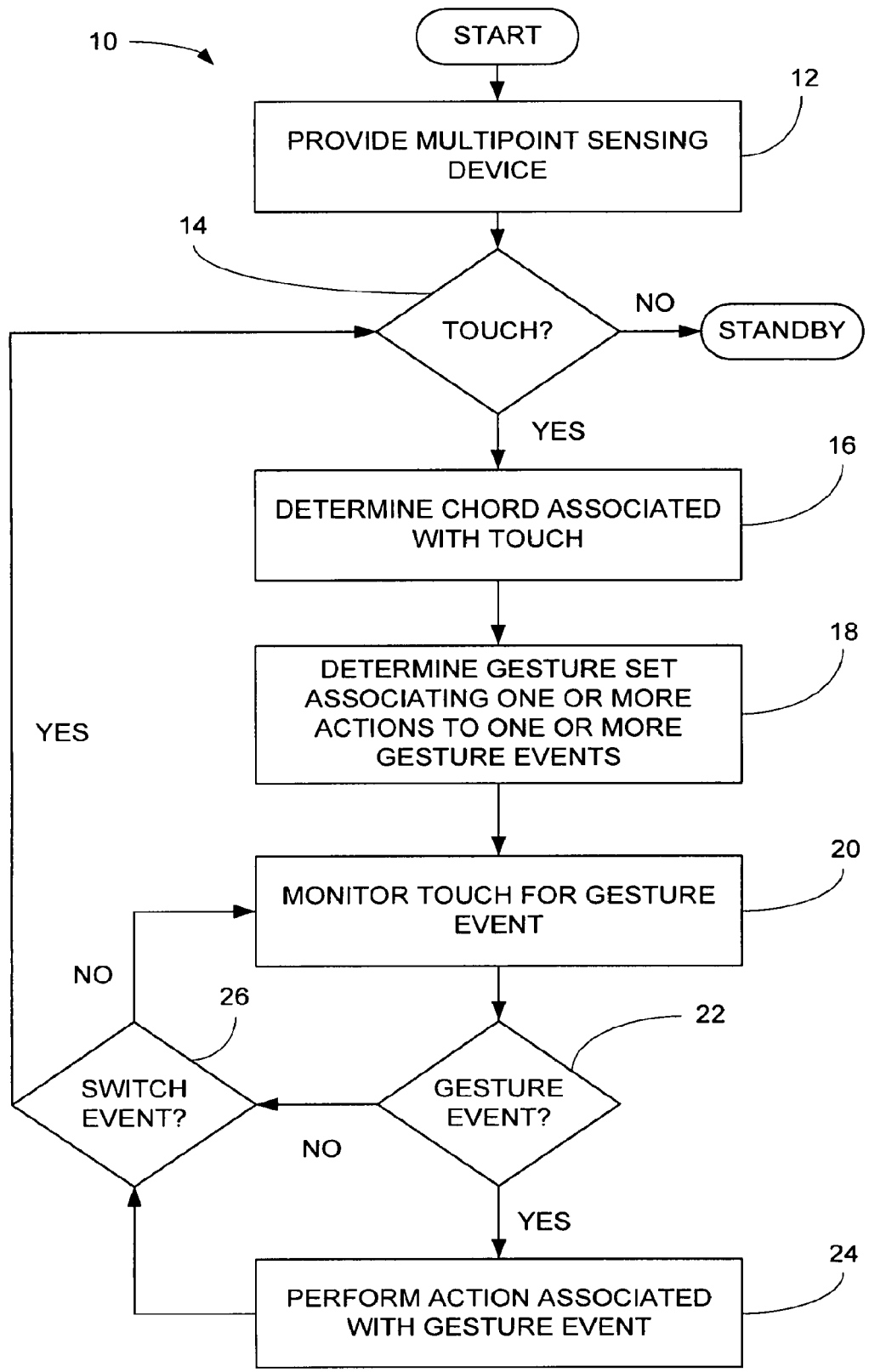
FIG. 1 shows an illustrative gesture control operation, in accordance with one embodiment of the present invention.

Gestures and methods of implementing gestures with sensing devices are disclosed. More particularly, gestures and methods of implementing gestures with multipoint sensing devices are disclosed. Multipoint sensing devices have a number of advantages over conventional single point devices in that they can distinguish more than one object (finger) simultaneously or near simultaneously. In most cases, multipoint sensing devices and systems that utilize such devices monitor a surface for a touch or near touch event. When such an event occurs, it can determine the distinct area(s) of contact and identify the nature of the events via their geometric features and geometric arrangement. Once identified, the touch or near touch events are monitored to determine if they correspond to various gestures events.

A gesture event may be defined as a stylized interaction with the sensing surface mapped to one or more specific computing operations. Gesture events may be made through various hand, and more particularly digit, motions, taps, pressures, dwells, and/or the like. Because the surface is based on multipoint technology, complex gesturing may be performed with any number of digits or other contact portions of the hand. In fact, because of this, a large gesture language analogous to sign language may be developed. Gesture language (or map) may include for example a set of instructions that recognize an arrangement of contacts (e.g., chords), recognizes the occurrence of gesture events (e.g., motions), and informs one or more software agents of the gesture events and/or what action(s) to take in response to the gesture events. Examples of multipoint gesturing may for example be found in U.S. patent application Ser. Nos. 10/903,964, 111038,590, and 111015,434, which are all herein incorporated by reference.

A wide range of different gestures can be utilized with multipoint sensing devices. For example, a gesture may be a single point or a multipoint gesture; a static or dynamic gesture; a continuous or segmented gesture; and/or the like. Single point gestures are those gestures that are performed with a single contact point, e.g., the gesture is performed with a single touch as for example from a single finger, a palm or a stylus. Multipoint gestures are those gestures that can be performed with multiple points, e.g., the gesture is performed with multiple touches as for example from multiple fingers, fingers and palms, a finger and a stylus, multiple styli and/or any combination thereof. Static gestures may be those gestures that do not substantially include gesture events (e.g., chords), and dynamic gestures may be those gestures that do include significant gesture events (e.g., motions, taps, etc.). Continuous gestures may be those gestures that are performed in a single stroke, and segmented gestures may be those gestures that are performed in a sequence of distinct steps or strokes. Although several examples are given herein, it should be appreciated that this is by way of example and not by way of limitation.

Multipoint sensing devices can be embodied in various forms including but not limit to standard sized touch pads, large extended palm pads, touch screens, touch sensitive housings, etc. Furthermore, multipoint sensing devices can be positioned on many form factors including but not limited to tablet computers, laptop computers, desktop computers as well as handheld computing devices such as media players, PDAs, cell phones, and the like. The multipoint sensing devices may also be found on dedicated input devices such as touch screen monitors, keyboards, navigation pads, tablets, mice, and the like. Examples of multipoint sensing devices may be found in U.S. patent application Ser. Nos. 10/840,862, 10/927,575, which are all herein incorporated by reference Several embodiments will now be discussed below with reference to FIGS. 1-54. However, those skilled in the art will readily appreciate that the detailed description given herein with respect to these figures is for explanatory purposes as the invention extends beyond these limited embodiments.

FIG. 1 shows illustrative gesture control operation 10, in accordance with one embodiment of the present invention. The operation 10 may begin at block 12 where a multi-point sensing device is provided. The multi-point sensing device is capable of detecting multiple points of contact or near contact at the same time. The multi-point sensing device may for example include a multi-touch sensing surface capable of simultaneously sensing multi objects on the its touch surface. Alternatively or additionally, the multipoint sensing device may include capabilities for sensing objects in close proximity to a surface but not touching the surface (e.g., proximity sensing). The multi-point sensing device may be embodied as a touch screen, touch pad, a touch sensing palm rest, touch sensitive housing and/or the like.

Following block 12, the operation can proceed to block 14 where a determination is made as to whether or not a touch or near touch is detected by the multi-point sensing device. If a touch is not detected, the operation can wait. If a touch is detected, the operation can proceed to block 16 where a chord associated with the touch is determined. A chord may be a specific arrangement of contacts or near contacts that can be assigned to some input functionality. Generally speaking, when objects are placed near or on a touch sensing surface, contact patches are created and these contact patches form a pattern that can be identified. The pattern can be made with any assortment of objects including for example mechanical features such as styli and signets and/or portions of one or more hands such as finger, thumb, palm, knuckles, etc.

The chord can be widely varied and may depend on many factors including the size of the touch surface, whether the touch surface is a touch screen or touch pad, etc. Furthermore, the chords may be based on the number of unknown contacts or a specific arrangement of known contacts. The chords may be further based on whether the contacts are close together, in a neutral position or spread apart. The chords may be further based on whether the contacts are adjacent or offset one another. The chords may be further based on the whether they are from left and/or right hand.

Determining the chord may include analyzing the touch (image created by objects touching or near touching the touch surface) and recognizing a specific arrangement of contacts. More particularly, the determination may include classifying or identifying the contacts via the geometric features of each contact as well as the geometric arrangement of contacts, and then referring to a database of expected chords (e.g., gesture map). If the arrangement of contacts matches an expected chord then the arrangement of contacts may be presumed to be the expected chord. These steps may also include filtering. For example, some contacts may not actually be part of a chord. For example, in the case of a touch palm pad, contacts formed by the palm may be ignored since they serve as a support base for the digits of the hand (e.g., very awkward to hold palms above touch surface for extended periods of time). In the case of a tablet PC with a touch screen, contacts formed by the thumb of at least one hand may be ignored since they are primarily used to hold the tablet PC.

Examples of one hand chords are shown below in Table 1. It should be appreciated that Table 1 is not an exhaustive list and that it is shown by way of example and not by way of limitation. For example, the palm may be counted as a contact and added to any of the combinations shown in Table 1 to create more chords. It should be further noted that many more chord combinations can be created by combining the list of Table 1 with the same list from the opposite hand. It should also be noted that although there are many combinations some chords may not be feasible for various reasons including ease of use, ergonomics, intuitiveness, etc.

Once the chord has been determined, the operation can proceed to block 18 where a gesture set associating actions to one or more gesture events is determined. A gesture set may be a map that links actions to gesture events. The gesture set may depend on the determined chord, but may also depend on other factors including location of the chord, open application, state or mode of the application, other touch characteristics, etc. In essence, the chord selects an input channel with each channel having a different gesture set associated therewith. In some cases, for organizational purposes and ease of use, the channels are associated with a particular input functionality such as navigating operations, file operations, edit operations, viewing operations, formatting operations, tool operations, web browsing operations, etc. Each of these input functionalities can have an associated set of commands that are tied to gesture events.

The actions may be state commands or manipulative commands. A state command is a single implemented command. Examples of state commands include new, open, close, delete, rename, select all, cut, copy, paste, undo, redo, group/ungroup, italic, bold, underline, previous/next, play/pause, mute, etc. Other examples of state commands include launching a particular program, launching a particular mode of a program, launching a website, opening a tool bar, opening a menu, arrowing, backspace, space, enter, tab, caps lock, functions, zooming, enlarging/reducing, paging, volume, etc. A manipulative command is a command that continuously manipulates the selected object. Examples of manipulative commands include pointing, tracking, dragging, scrolling, panning, zooming, sizing, stretching, paging, volume, etc. It should be appreciated that these examples are not a limitation and that other commands may be used.

As noted above, a gesture event can be any stylized physical action that can be performed on or above the touch surface. Examples of gesture events may include for example motions, taps, pressure changes, dwells, etc. In some cases, the gesture events may be performed by the chord. In other case, the gesture events may be performed by a subset of the chord. In other cases, the gesture events may be performed by new contacts in addition to or separate from the initial chord. Gesture events will be described in greater detail below.

In block 20, the touch can be monitored for gesture events, and in block 22 a determination can be made as to whether or not gesture events are recognized. Recognizing the gesture events may include analyzing the touch characteristics of contacts (contacts associated with the chord and/or new contacts), identifying a specific pattern and referring to the gesture set and its list of expected gesture events. If the pattern matches an expected gesture event then the pattern may be presumed to be the expected gesture event. The touch characteristics may for example include first order consideration such as motion, tapping, change in pressure, dwell, and second order considerations such as speed (absolute or relative), direction (absolute or relative), orientation (absolute or relative), size (absolute or relative), duration (absolute or relative), shape (absolute or relative), length (absolute or relative), and/or the like.

In one embodiment, gesture events can be designed or selected to be distinguishable from other gesture events to prevent cross talk or mistakes in recognizing the gesture event (e.g., typically want gesture events to be easily differentiated from other gesture events).

Again, gesture events may be classified as motion, tapping, pressure, dwell, etc. If motion, the gesture events may exemplified as follows: sliding in any direction, a slow linear swipe to the right, left, up and down; a quick linear flick to the right, left, up and down; a slow rotation clockwise or counter clockwise; a quick rotation clockwise or counter clockwise; contract or expansion of two of more contacts (e.g., spreading and closing separation between contacts). If tap, the gesture events may further be exemplified as follows: '/z tap, full tape, multiple tap, quick tap, slow tap, etc. If pressure, the gesture events may be further exemplified as light press or hard press. If dwell, the gesture events may be further exemplified as long stationary pause or short stationary pause. It should be appreciated that this list is not a limitation and that gesture events may be classified in other ways and orientations. For example, linear motion gestures are not limited to right, left, up and down, and may further include up-right, up-left, down-right, down-left.

The gesture events may be basic or advanced. Basic gestures may be those gestures with one action as for example swipe linear right. Advanced gestures may be those gestures with multiple actions such as swipe linear right followed by a tap or swipe linear right; long pause, swipe linear left; or rotate CCW with increased or decreased pressure. Advanced gestures may include any number of actions. Basic gestures may be used for ease of use and processing complexity reasons.

If a gesture event is recognized, the operation can proceed to block 24 where the action(s) associated with the gesture events are performed. Block 24 may include referring to the gesture set and locating the action(s) associated with the recognized gesture events. Once located, the action(s) can be initiated. If the action is a state command, the command can be initiated each and every time the gesture event is performed (e.g., the gesture event operates like a button). In some cases, the gesture event can be designed to create repetitive state commands. For example, if the user extends or continues the gesture event multiple state commands can be initiated. This may be helpful in a game mode for rapid firing or in an editing mode when undoing work or in a browse mode when flipping through pages. By way of example, if a single undo command is initiated by a quick linear swipe to the right, a repetitive undo command may be initiated by a quick linear swipe followed by a slow linear swipe in one continuous motion (during touch). In this example, the undo command can be repeatedly initiated in accordance with the slow linear swipe (e.g., the undo command is fired every 100 ms during the slow linear swipe). If the action is a manipulative command, the command can be continuously generated during the gesture event (e.g., one to one correspondence between command and gesture event). For example, if the command is scrolling, scrolling can be performed as long as the gesture event is performed and in accordance with the gesture event properties (e.g., speed, direction, etc.).

Following block 24, the operation can proceed to block 26 where a determination is made as to whether or not a switching event has been performed. A switching event can refer to an event that resets the operation or initiates a chord change. The switching event may be implemented in a variety of ways. For example, it may be implemented by removing all contacts for a predetermined amount of time (e.g., lifting hand off of touch surface). It may also be implemented by changing the base chord during the touch (e.g., adding/removing contacts). It may also be implemented by adding/removing contacts from the opposite hand (e.g., placing one or more fingers down with the opposite hand while the other hand is still touching). It may also be implemented by pausing (e.g., if the contacts stay stationary for a preset amount of time). It may also be implemented by a key entry or button click from a standard keyboard or mouse. It may also be implemented via a gesture event. If a switching event has occurred, the operation proceeds back to block 12. If a switching event has not occurred, then the operation proceeds back to block 20.

TABLE 1 one Hand Chord Examples

Unknown contacts - standard arrangement (no palm or palm ignored)

Any one finger
Any two fingers
Any three fingers
Any four fingers
Thumb + any finger
Thumb + any two fingers
Thumb + any three fingers
Thumb + four fingers Unknown Contacts - varied arrangement (no palm or palm ignored)

Two adjacent fingers
Two non adjacent fingers
Two adjacent fingers + one non adjacent finger
Thumb + two adjacent fingers
Thumb + two non adjacent fingers
Thumb + two adjacent fingers + one non adjacent finger
Any two adjacent fingers closed
Any two adjacent fingers spread
Any three adjacent fingers closed
Any three adjacent fingers spread
Four adjacent fingers closed
Four adjacent fingers spread
Thumb + two adjacent fingers closed
Thumb + two adjacent fingers spread
Thumb + three adjacent fingers closed
Thumb + three adjacent fingers spread
Thumb + four adjacent fingers closed
Thumb + four adjacent fingers spread Known Contacts (no palm or palm ignored)

Index
Middle
Ring
Pinky
Index + Middle
Index + Ring
Index + Pinky
Middle + Ring
Middle + Pinky
Ring + Pinky
Thumb + Index
Thumb + Middle
Thumb + Ring
Thumb + Pinky
Thumb + Index + Middle
Thumb + Index + Ring

TABLE 1-continued one Hand Chord Examples

Thumb + Index +Pinky
Thumb + Middle + Ring
Thumb + Middle + Pinky
Thumb + Ring + Pinky
Index + Middle + Ring
Index + Middle + Pinky
Index + Ring + Pinky
Middle + Ring + Pinky
Thumb + Index + Middle + Ring
Thumb + Index + Middle + Pinky
Thumb + Index + Ring + Pinky
Thumb + Middle + Ring + Pinky
Index + Middle + Ring + Pinky
Thumb + Index + Middle + Ring + Pinky
Other (palm face down)

Figure 2:
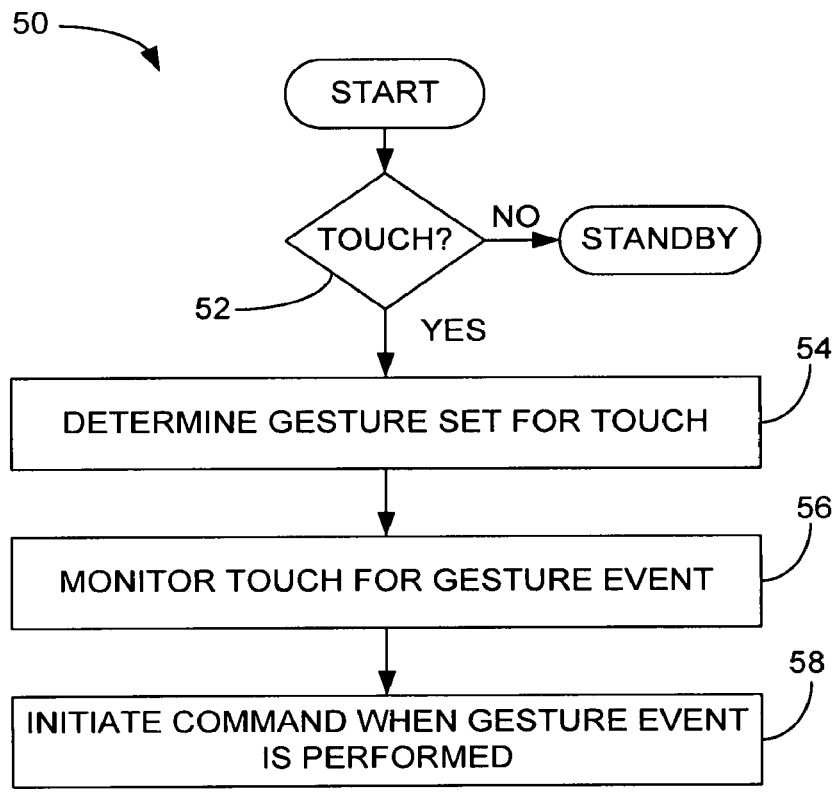
FIG. 2 shows an illustrative control operation, in accordance with one embodiment of the present invention.

Fingers closed fist or wrapped to palm
Index + remaining fingers closed fist or wrapped to palm
Index + Middle + remaining fingers closed fist or wrapped to palm
Index + Middle + Ring + Pinky closed fist or wrapped to palm
Thumb + remaining fingers closed fist or wrapped to palm
Thumb + Index + remaining fingers closed fist or wrapped to palm
Thumb + Index + Middle + remaining fingers closed fist or wrapped to palm
Thumb + Index + Middle + Ring + Pinky closed fist or wrapped to palm
Thumb + Index + remaining fingers closed fist or wrapped to palm
Thumb + Index + Middle + remaining fingers closed fist or wrapped to palm
Thumb + Index + Middle + Ring + Pinky closed fist or wrapped to palm
Other Right side of Hand Left Side of Hand
Backside of hand
Front side of hand (all)
Other (knuckles face down - punch)
Fingers closed fist or wrapped to palm
Index open + remaining fingers closed fist or wrapped to palm
Index open + Middle open + remaining fingers closed fist or wrapped to palm
Index open + Middle open + Ring open + Pinky closed fist or wrapped to palm
Thumb + Fingers closed fist or wrapped to palm
Thumb + Index open + remaining fingers closed fist or wrapped to palm
Thumb + Index open + Middle open + remaining fingers closed fist or wrapped to palm
Thumb + Index open + Middle open + Ring open + Pinky closed fist or wrapped to palm FIG. 2 shows illustrative control operation 50, in accordance with one embodiment of the present invention. The operation may begin at block 52 where a touch or near touch is detected.

Following block 52, the operation can proceed to block 54, where a gesture set is determined for the touch. The gesture set may depend on many factors including touch characteristics, touch location, open application, mode of application, and the like. In most cases, the gesture set is based at least in part on the arrangement of contacts at touchdown.

Following block 54, the operation can proceed to block 56 where the touch is monitored for gesture events associated with the gesture set. The gesture set may include one or more gesture events for provoking or initiating a command (e.g., commands can be tied or linked to specific gesture events).

Following block 56, the operation can proceed to block 58 where one or more commands are initiated when gesture events are performed. For example, a user may slide a specific arrangement of fingers to provoke or initiate a scrolling event.

Figure 3:
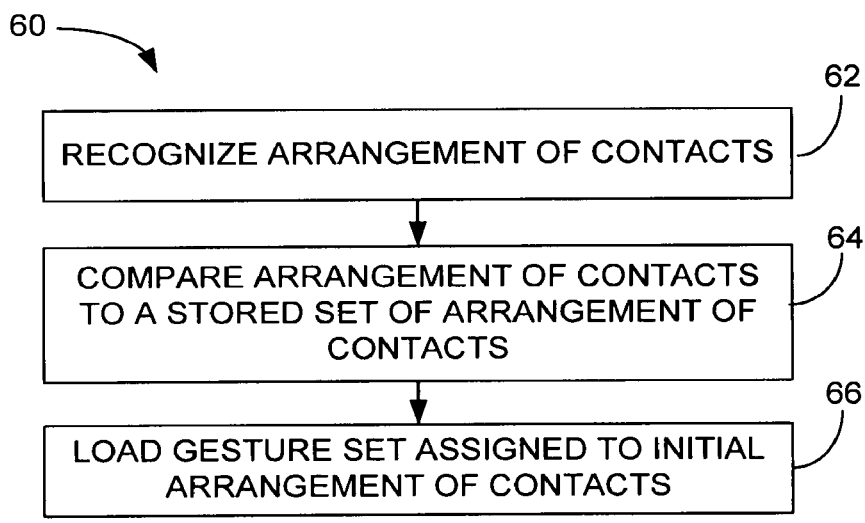
FIG. 3 shows an illustrative control operation, in accordance with one embodiment of the present invention.

FIG. 3 shows illustrative control operation 60, in accordance with one embodiment of the present invention. The control operation 60 may for example correspond to block 54 in FIG. 2. The control operation 60 may begin at block 62 where the initial arrangement of contacts are recognized. Thereafter, in block 64, the initial arrangement of contacts can be compared to a stored set of arrangement of contacts. For example, the system may refer to a gesture map that includes a list of initial arrangement of contacts and gesture sets assigned thereto. If there is a match, the operation can proceed to block 66 where the gesture set assigned to the recognized initial arrangement of contacts is loaded.

Figure 4:
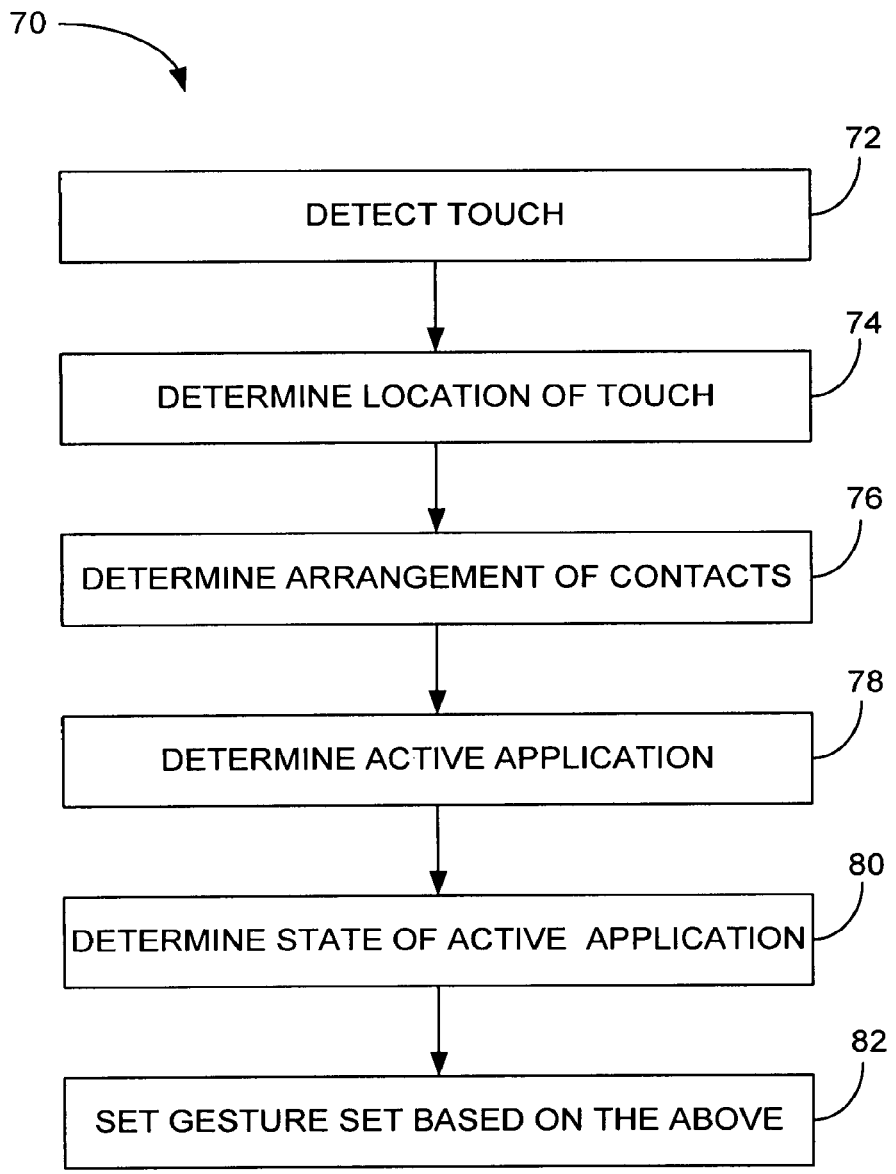
FIG. 4 shows an illustrative control operation, in accordance with one embodiment of the present invention.

FIG. 4 shows illustrative control operation 70, in accordance with one embodiment of the present invention. The control operation 70 may begin at block 72 where a touch is detected. Thereafter, in block 74, the location of the touch can be determined. Thereafter, in block 76, the arrangement of contacts associated with the touch can be determined (e.g., touch pattern). Thereafter, in block 78, the active application can be determined. Thereafter, in block 80, the current state of the application can be determined (e.g., current mode). Thereafter, in block 82, an appropriate gesture set can be set or selected based on one or more of the determined attributes mention above (blocks 74-80). For example, using the determined attributes, a system may refer to a stored gesture map that links each of the above mentioned attributes to a particular gesture set. The stored gesture map may be created by default or it may customizable by the user. For example, the user may use a control panel to change settings associated with the gesture map or use a training sequence to program the gesture map.

Figure 5:
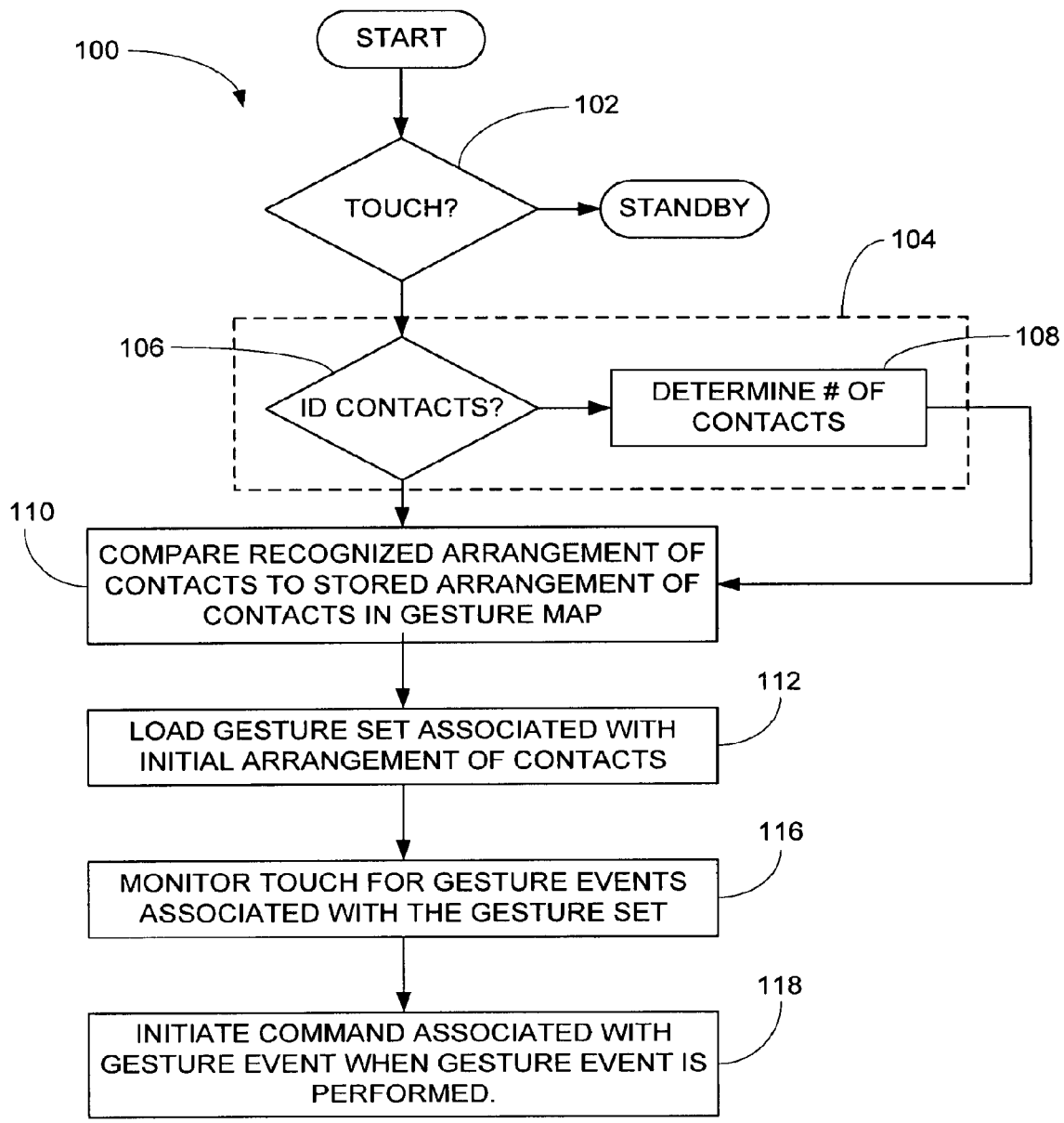
FIG. 5 shows an illustrative control operation, in accordance with one embodiment of the present invention.

FIG. 5 shows illustrative control operation 100, in accordance with one embodiment of the present invention. The control operation may begin at block 102 where a determination is made as to whether or not a touch is detected. If a touch is detected, the operation can proceed to block 104 where the arrangement of contacts are recognized. Block 104 may include sub blocks 106 and 108. In block 106 a determination is made as to whether the contact patches can be precisely identified. For example, whether a contact patch may be an index finger or thumb or palm. If they cannot be precisely identified, then the operation can proceed to block 108 where the number of contact patches are determined. For example, whether there are two contact patches, three contact patches, etc. Following block 104, the operation can proceed to block 110 where the recognized arrangement of contacts are compared to stored arrangement of contacts in a gesture map. If there is no match, then the operation can proceed back to block 102. If there is a match, then the operation can proceed to block 112 where after referring to the gesture map, the gesture set associated with the initial arrangement of contacts are loaded. Thereafter, in block 116, the touch can be monitored for gesture events associated with the gesture set. If a gesture event is performed, the operation can proceed to block 118 where the command associated with the gesture event is performed.

Figure 6:
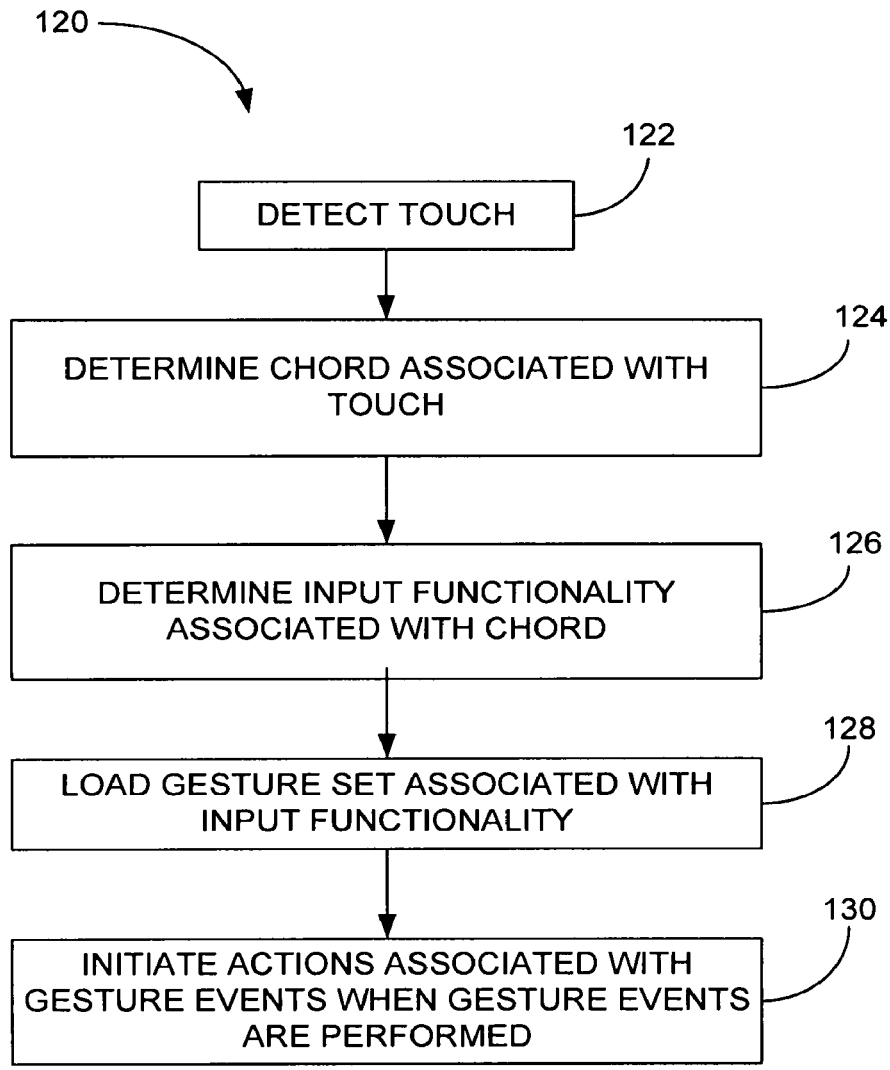
FIG. 6 shows an illustrative control operation, in accordance with one embodiment of the present invention.

FIG. 6 shows illustrative control operation 120, in accordance with one embodiment of the present invention. The control operation 120 may begin at block 122 where a touch or near touch is detected. Thereafter in block 124 a chord can be determined for the touch. Thereafter, in block 126, the input functionality associated with chord can be determined. The input functionality may describe an operation or group of operations. Examples of operations include navigating operations, file operations, edit operations, viewing operations, insert operations, formatting operations, tool operations, web operations, etc. The input functionality may be further based on environmental conditions including location of chord on touch surface, applications, modes, etc. Thereafter, in block 128 the gesture set associated with the input functionality can be activated or loaded. A gesture set may be a group of gesture events, each of which is assigned to a different action related to the input functionality. The gesture event may be performed solely by the initial chord either as a group, a subset of the group or relative to one another. Alternatively, they may be performed by objects not associated with the chord (e.g., contact patches added after the base chord is set). The gesture event may include first order parameters such as motion, tapping, dwell, pressure and/or the like. The gesture event may also include second order parameters that define the first order parameters such as speed, direction, shape, timing/duration, length, and/or the like. Thereafter, in block 130, actions associated with gesture events can be implemented when gesture events are performed.

Figure 7:
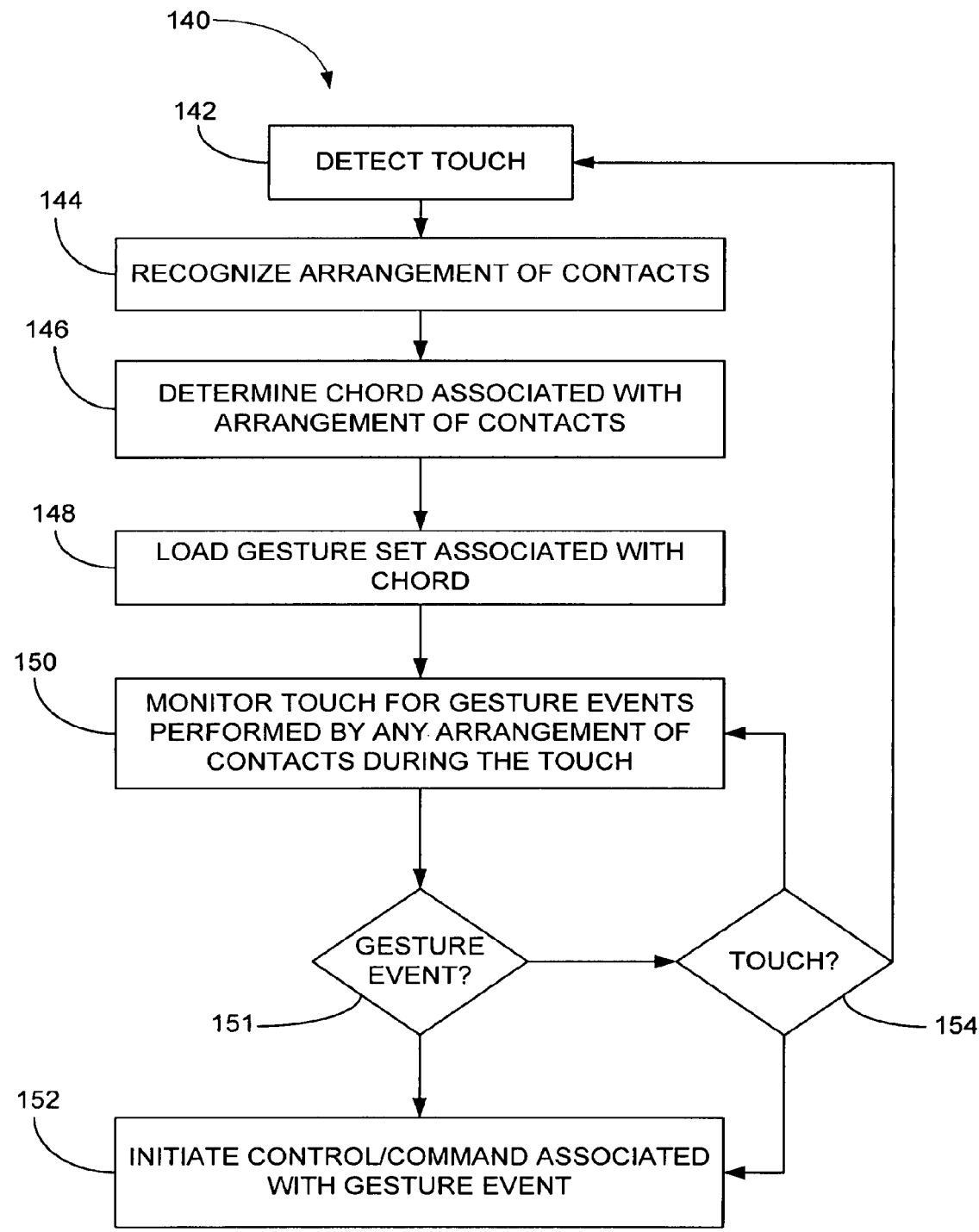
FIG. 7 shows an illustrative gesture operation, in accordance with one embodiment of the present invention.

FIG. 7 shows illustrative gesture operation 140, in accordance with one embodiment of the present invention. The operation 140 may begin at block 142 where a touch is detected. Following block 144, the operation can proceed to block 144 where an arrangement of contacts are recognized. Thereafter, in block 146, the chord associated with the recognized arrangement of contacts can be determined. Following block 146, the operation can proceed to block 148 where the gesture set associated with the chord is loaded. The gesture set contains gesture events that can be performed with any arrangement of contacts during the touch. Thereafter, in block 150, the touch can be monitored for a gesture event performed by any arrangement of contacts. If a gesture event has been performed by any arrangement of contacts, the operation can proceed to block 152 where the control/command associated with the gesture event is initiated. If a gesture event has not been performed, the operation can proceed to block 154 where a determination is made as to whether or not a touch is still detected, If a touch is still detected, the operation can proceed back to block 150. If a touch is not detected, the operation can proceed back to block 142. That is, a lift followed by a touch resets the chord and thus the gesture set.

The initial chord selection model described above in FIG. 7 advantageously allows user to pick up or drop additional fingers without affecting the gesture set. This is more ergonomic in that a user starting in a base chord of two fingers can drop the remaining three fingers so that all five fingers are supporting the hand. As a result, gesturing can be performed for longer periods of time. In essence changes to the base chord are ignored. Furthermore, it allows users to extend pointing/dragging, scrolling etc. in limited space touch surfaces by lifting all but one finger and walking and sliding other fingers toward the target.

Figure 8:
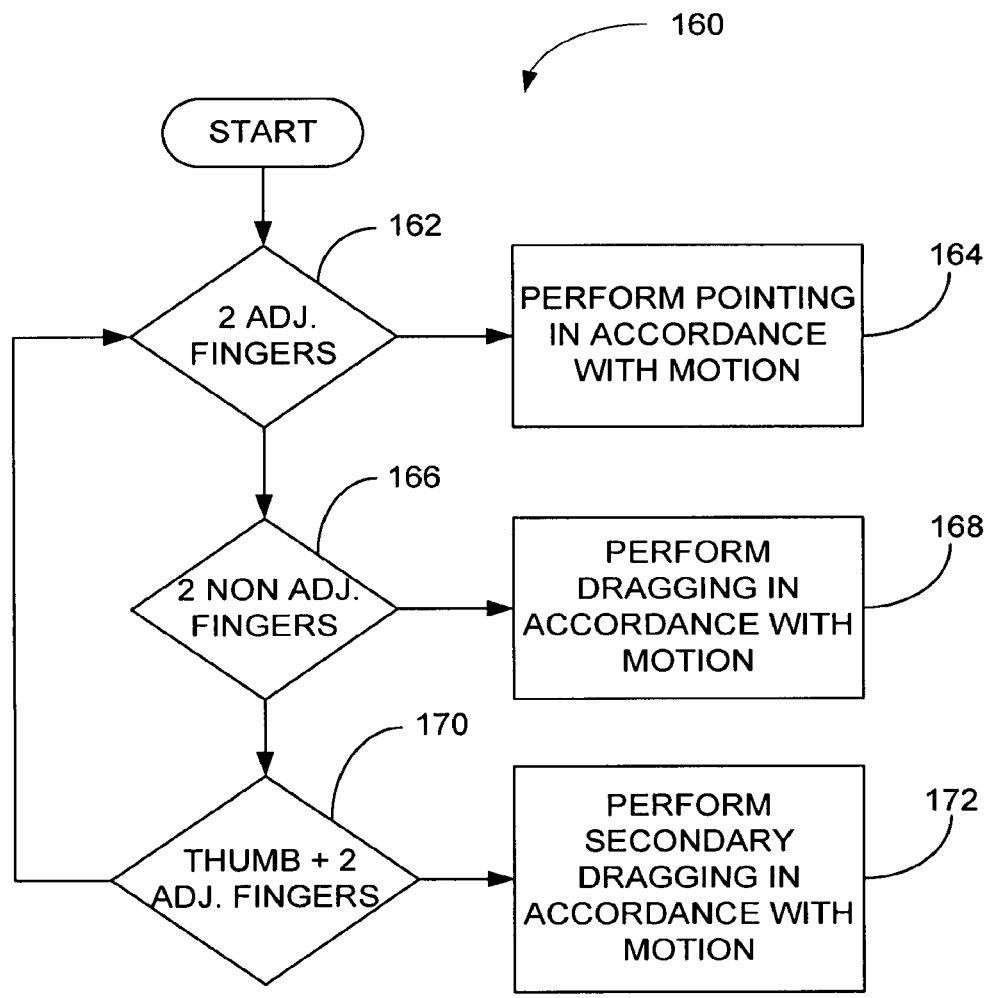
FIG. 8 shows an illustrative gesture operation, in accordance with one embodiment of the present invention.

FIG. 8 shows illustrative gesture operation 160, in accordance with one embodiment of the present invention. The operation 160 may begin at block 162 where a determination is made as to whether or not 2 adjacent fingers are detected. If so, the operation can proceed to block 164 where pointing operations are performed in accordance with motion. If not, the operation can proceed to block 166 where a determination is made as to whether or not 3 adjacent fingers are detected. If so, the operation can proceed to block 168 where dragging operations are performed in accordance with motion. If not, the operation can proceed to block 170 where a determination is made as to whether or not a thumb and two adjacent fingers are detected. If so, the operation can proceed to block 172 where secondary dragging operations are performed. If not, the operation can proceed to back to block 162. This process can be reset each and every time all the fingers are lifted off of the touch surface (e.g., touch is no longer detected).

Figure 9:
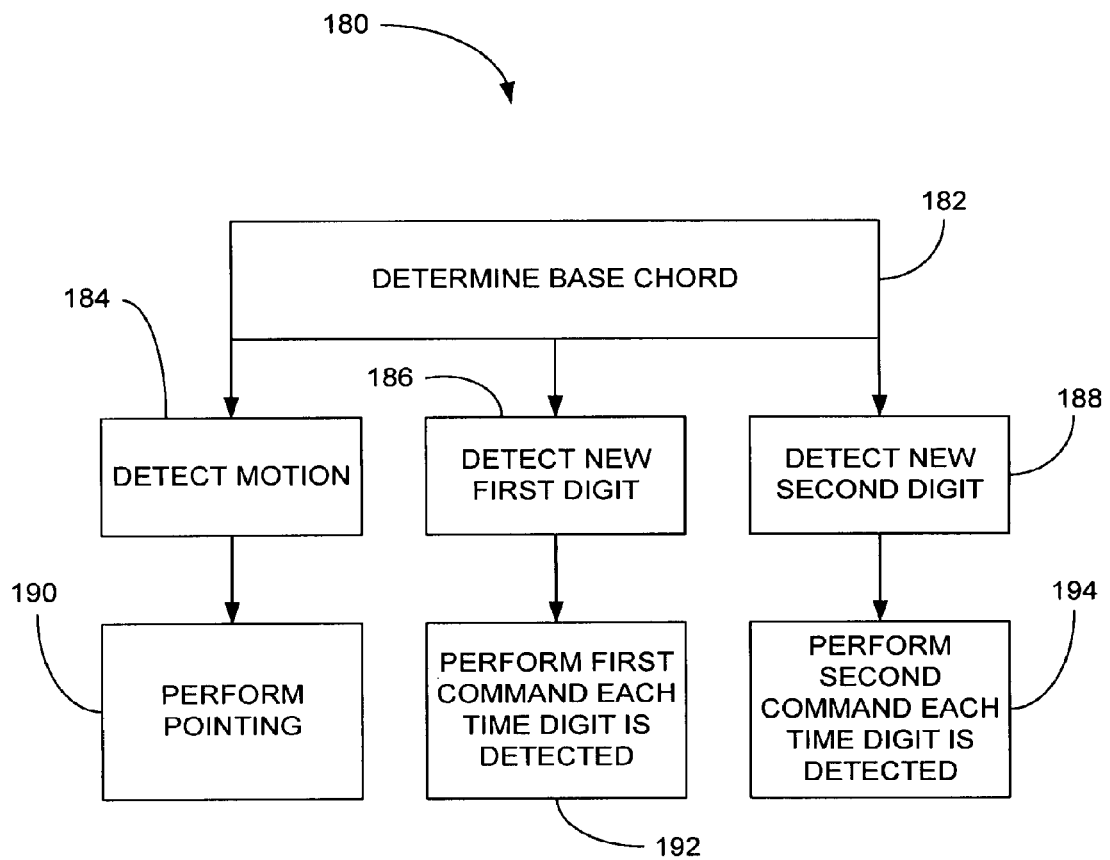
FIG. 9 shows an illustrative gesture operation, in accordance with one embodiment of the present invention.

FIG. 9 shows illustrative gesture operation 180, in accordance with one embodiment of the present invention. The operation 180 may begin at block 182 where a base chord is determined. Thereafter, the operation can perform three different processes either separately or simultaneously (parallel blocks 184-188). In block 184, motion can be detected with the base chord. Thereafter, in block 190 pointing operations can be performed in accordance with the motion. In block 186, a new first digit can be detected. That is, a new first digit not associated with the base chord can be detected (in addition to the base chord). Thereafter, in block 192, a first command can be initiated each time the new first digit is detected. In some cases, a user can perform repetitive commands by continuously tapping the new first digit. In block 188, a new second digit can be detected (in addition to the base chord). That is, a new second digit not associated with the base chord can be detected. Thereafter, in block 194, a second command can be initiated each time the new second digit is detected. In some cases, a user can perform repetitive commands by continuously tapping the new second digit or simply holding the digit down. The operation described in FIG. 9 is sometimes referred to as current chord selection model.

In one example of FIG. 9, the base chord can be 3 fingers (either index-middle-ring or thumb-middle-ring). Thus three fingers can be used for pointing operations. Furthermore, the new first digit may be the thumb or index if thumb is already part of base. Thus, the thumb or index can initiate the first command. Moreover, the new second digit may be the pinky. Thus, the pinky can initiate the second command.

The above example may be useful in game modes. The base chord can be used for pointing, first new digit can be used for triggering, and the second new digit can be used for a weapon change. Alternatively, in standard modes, the base chord can be used for pointing, first new digit can be used for primary click and drag, and the second new digit can be used for a secondary click and drag. The three finger support provides sufficient support in both gaming and standard modes.

Figure 10:
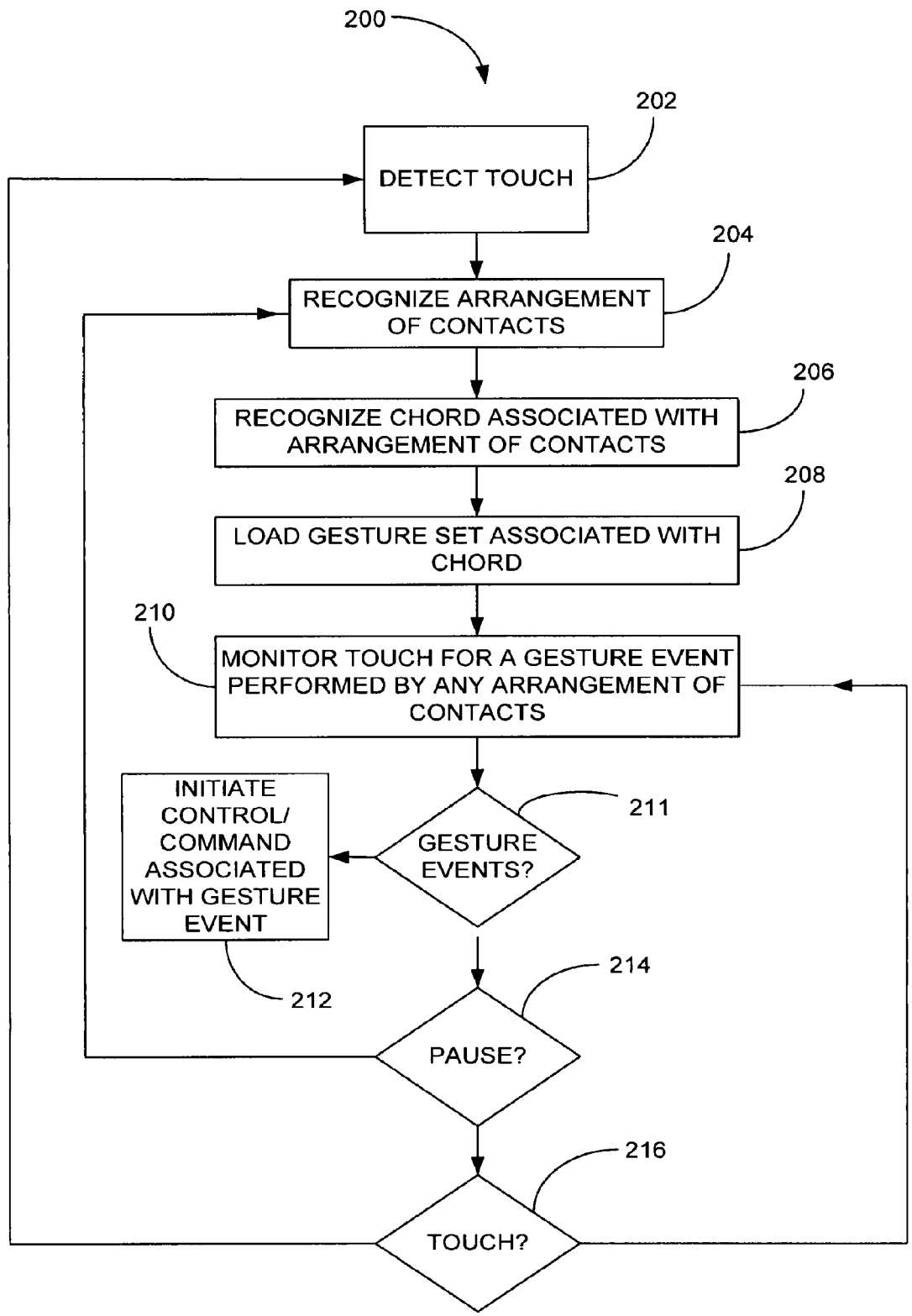
FIG. 10 shows an illustrative gesture operation, in accordance with one embodiment of the present invention.

FIG. 10 shows illustrative gesture operation 200, in accordance with one embodiment of the present invention. The operation 200 may begin at block 202 where a touch is detected. Following block 204, the operation can proceed to block 204 where an arrangement of contacts are recognized. Thereafter, in block 206, the chord associated with the recognized arrangement of contacts can be determined. Following block 206, the operation can proceed to block 208 where the gesture set associated with the chord is loaded. The gesture set may contain gesture events that can be performed with any arrangement of contacts during the touch. Thereafter, in block 210, the touch can be monitored for a gesture event performed by any arrangement of contacts. If a gesture event has been performed by any arrangement of contacts, the operation can proceed to block 212 where the control/command associated with the gesture event is initiated. If a gesture event has not been performed, the operation can proceed to block 214 where a determination is made as to whether the base chord or current arrangement of contacts has paused during the touch. If so, the pause can be presumed to be a chord switching event and the operation can proceed back to block 204. If not, the operation can proceed to block 216 where a determination is made as to whether or not a touch is still detected. If a touch is still detected, the operation can proceed back to block 210. If a touch is not detected, the operation can proceed back to block 202.

In the pause selection model described in FIG. 10, switches may only occur if the original fingers are paused or moving pretty slowly. Thus, users can relax from 1 finger into five finger pointing so long as the finger drop is in the middle of a pointing stroke.

Figure 11:
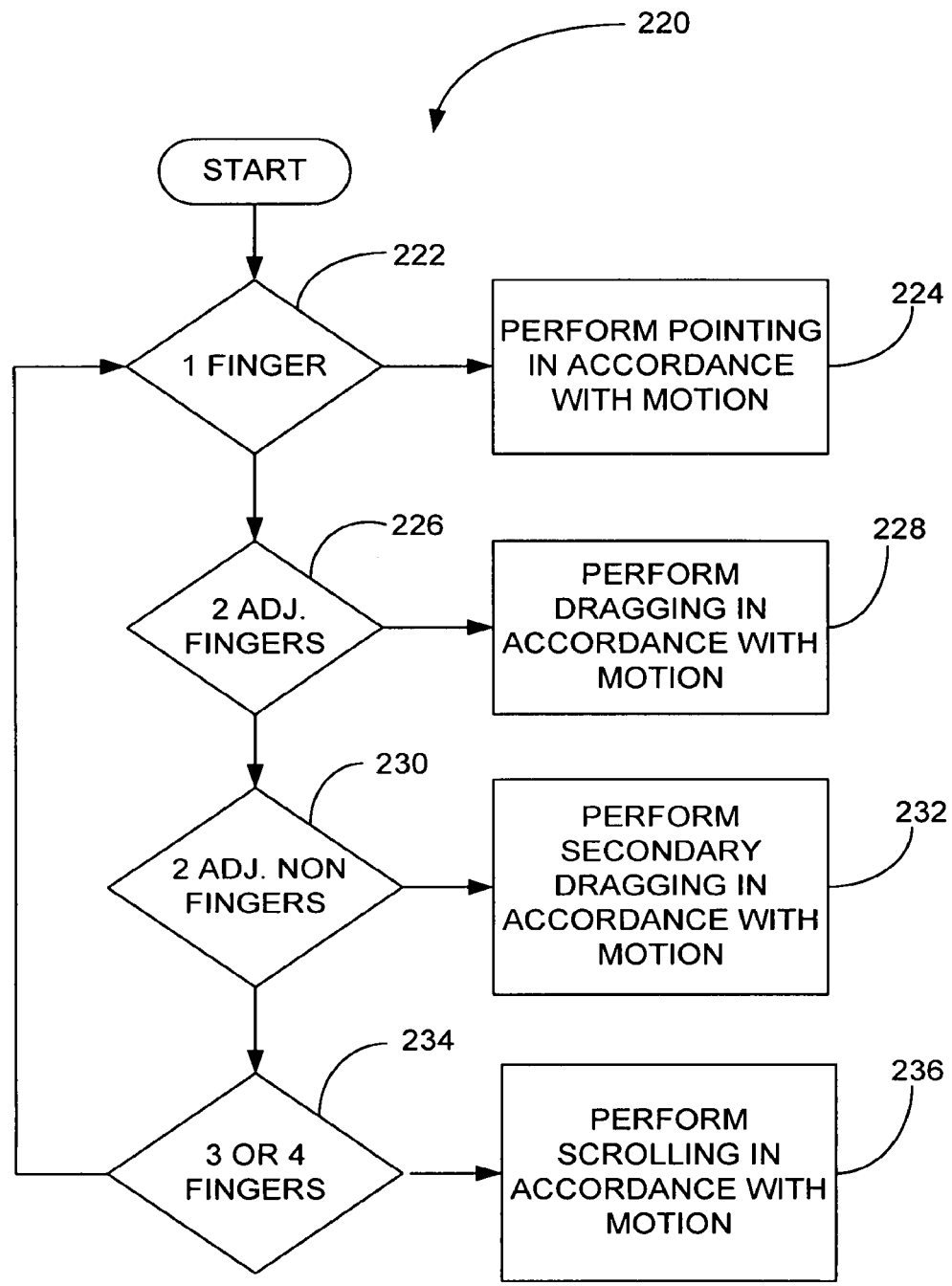
FIG. 11 shows an illustrative gesture operation, in accordance with one embodiment of the present invention.

FIG. 11 shows illustrative gesture operation 220, in accordance with one embodiment of the present invention. The operation 220 may begin at block 222 where a determination is made as to whether or not 1 finger is detected. If so, the operation can proceed to block 224 where pointing operations are performed in accordance with motion. If not, the operation can proceed to block 226 where a determination is made as to whether or not 2 adjacent fingers are detected. If so, the operation can proceed to block 228 where dragging operations are performed in accordance with motion. In some cases, drag lock/extend may be initiated by clicking and in other cases it is initiated by dropping the thumb (two adjacent fingers+thumb). If not, the operation can proceed to block 230 where a determination is made as to whether or two non adjacent fingers are detected. If so, the operation can proceed to block 232 where secondary dragging operations are performed. In some cases, drag lock/extend may be initiated by clicking and in other cases it is initiated by dropping the thumb (two non adjacent fingers+thumb). If not, the operation can proceed to block 234 where a determination is made as to whether of not 3 or four fingers are detected. If so, scrolling can be initiated in accordance with motion (block 236). If not the operation can proceed back to block 222. This process can be reset each and every time all the fingers are lifted off of the touch surface (e.g., touch is no longer detected) or if the chord is paused for a moment.

Figure 12:
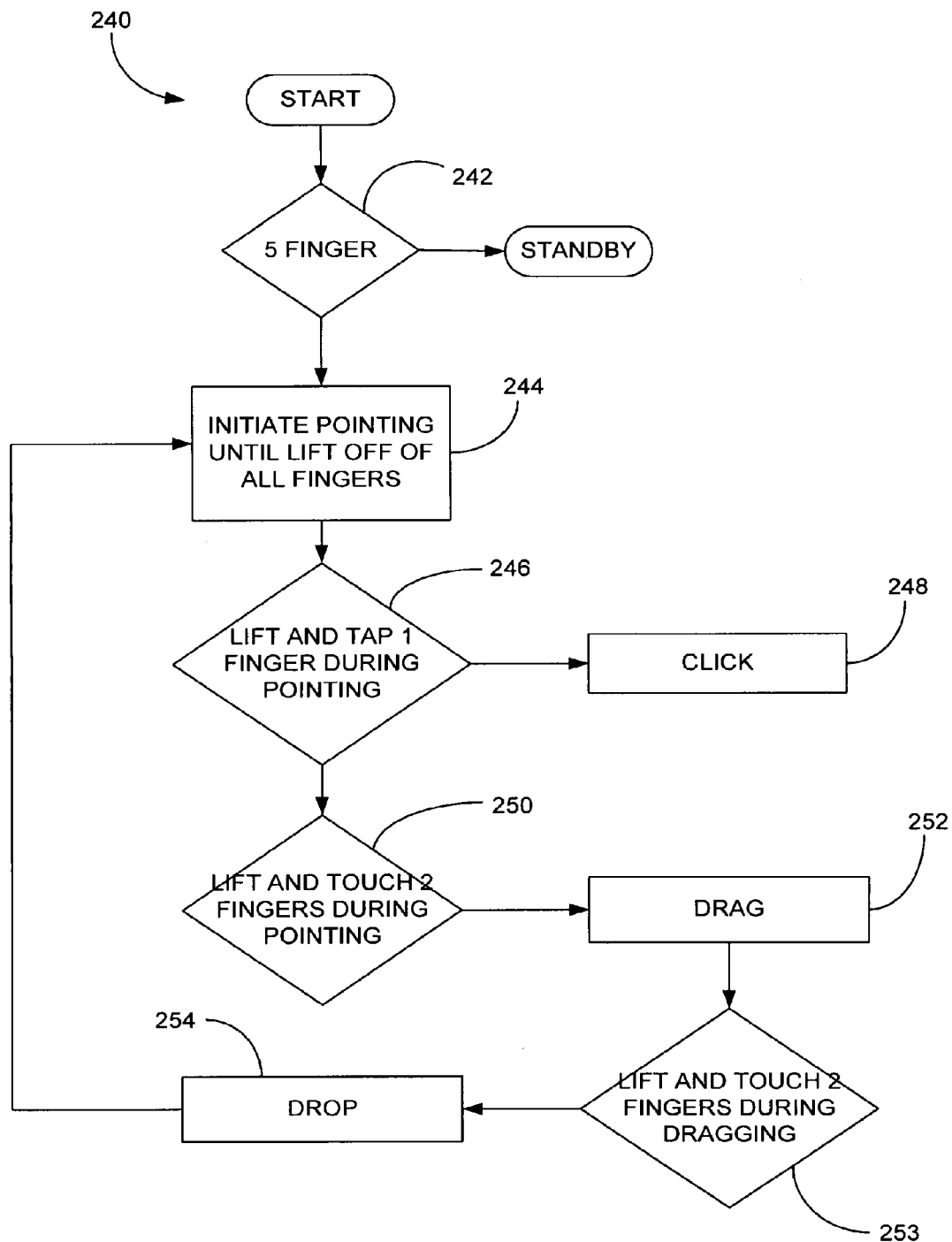
FIG. 12 shows an illustrative gesture operation, in accordance with one embodiment of the present invention.

FIG. 12 shows illustrative gesture operation 240, in accordance with one embodiment of the present invention. The operation 240 may begin at block 242 where a determination is made as to whether or not 5 fingers are detected. If so, the operation can proceed to block 244 where pointing is initiated until all fingers are lifted off the touch surface. In block 246, a determination is made as to whether or not 1 of the 5 fingers does a lift and tap during pointing. If so, a click can be performed (block 248). In block 250, determination is made as to whether or not 2 of the 5 fingers does a lift and tap during pointing. If so, a drag can be performed (block 252). Thereafter, in block 253, a determination is made as to whether or not 1 or 2 of the 5 fingers does a lift and tap during dragging. If so, a drop can be performed (block 254). If not, dragging can continue. After blocks 250 and 254, the operation can proceed back to block 244. This process can be reset each and every time all the fingers are lifted off of the touch surface (e.g., touch is no longer detected) or if the chord is paused for a moment.

In an alternative embodiment of FIG. 12, lifting and tapping a left oriented finger of the five finger base chord may initiate a left button click, and lifting and tapping a right oriented finger of the base chord may initiate a right button click.

Figure 13:
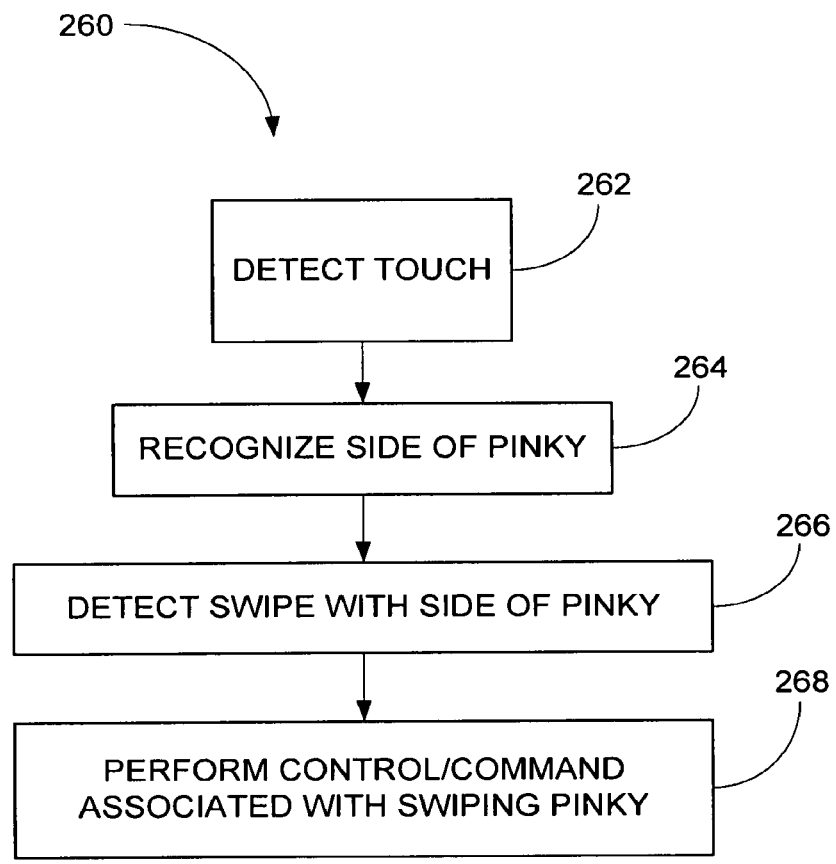
FIG. 13 shows an illustrative gesture operation, in accordance with one embodiment of the present invention.

FIG. 13 shows illustrative gesture operation 260, in accordance with one embodiment of the present invention. The operation 260 may begin at block 262 where a touch is detected. Thereafter, in block 264, the side of the pinky can be recognized. The side of the pinky produces a long (highly eccentric) horizontal contact patch distinct from all other contacts (except possibly a flattened thumb). As such, the gesture system may be capable of consistently classifying horizontally eccentric yet thin contacts as a pinky (or possibly a thumb). Thereafter, in block 266, a swipe can be detected with the side of the pinky. Thereafter, in block 268, a control or command associated with the swiping pinky can be performed.

Side pinky swipe may be useful for simple control gestures like volume up/down, sleep, screen saver, etc. The side pinky swipe has the simplicity of single finger touch while being recognizably distinct from normal 1 fingertip pointing/clicking. It is also very ergonomic because while touching with side of pinky, the thumb is pointing straight up into the air. This is the most neutral comfortable of all wrist positions.

Figure 14:
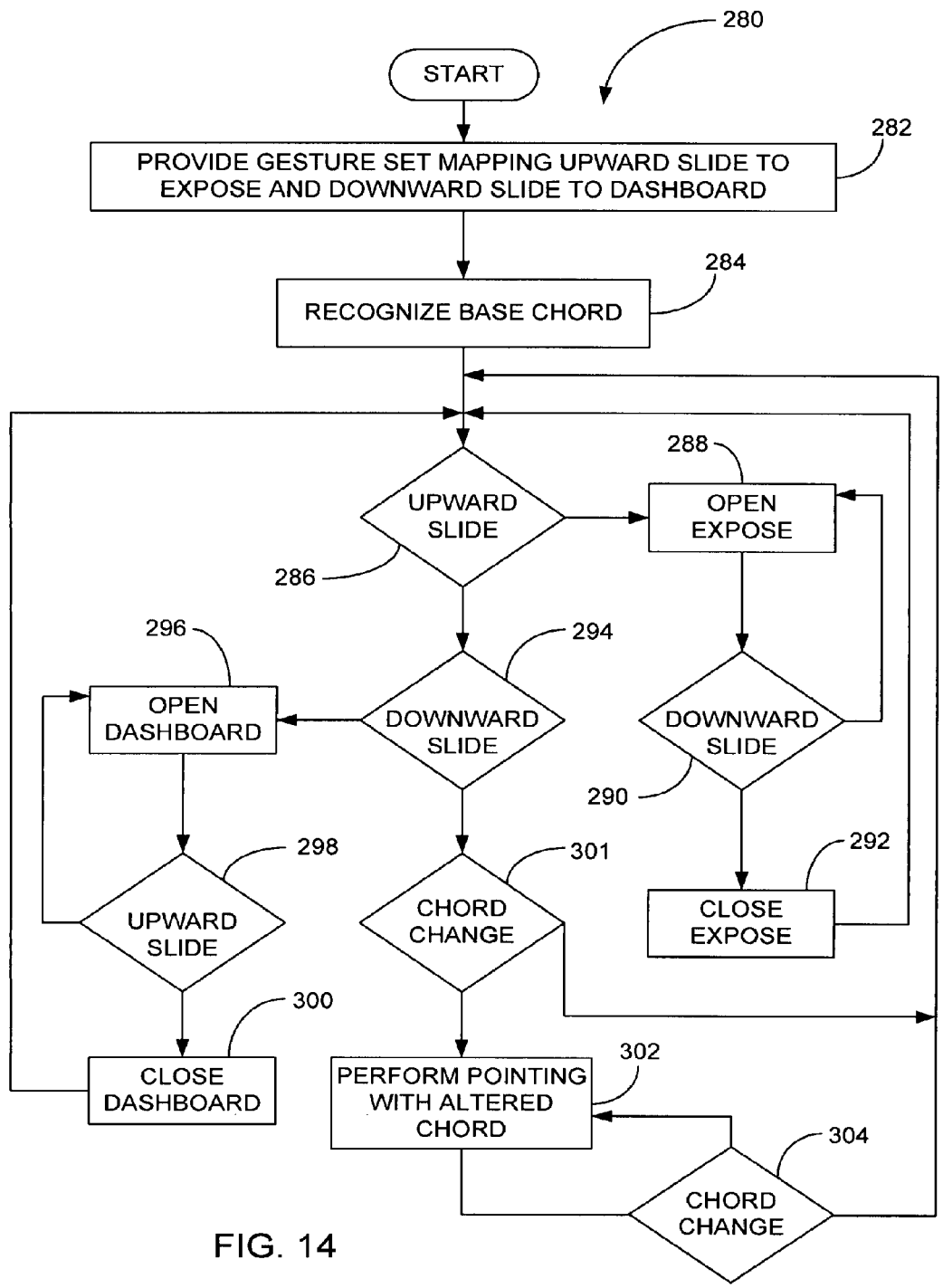
FIG. 14 shows an illustrative gesture operation, in accordance with one embodiment of the present invention.

FIG. 14 shows illustrative gesture operation 280, in accordance with one embodiment of the present invention. The operation 280 may begin at block 282 where a gesture set mapping upward slide to Expose and downward slide to Dashboard is provided.

Dashboard is a control panel that includes customizable widgets (mini applications) that bring information to the user instantly—weather forecasts, stock quotes, yellow pages, airline flights, sport scores, etc. In most cases, when activated, the Dashboard is brought into view, and when deactivated, the Dashboard is removed from view. The user is able to receive up to date and timely info from the Internet with a click of a button, and then have it disappear instantly when button is released.

Expose is a window management program. Window management programs are configured to help navigate through or mitigate window clutter (the state where its is difficult to find documents or see the desktop because there are so many open windows and/or applications). Expose may have or be selected from three different modes of operation, which can be controlled by gesturing. The first mode is All Windows or Tile, Scale and Show all. When operating in this mode, all open windows are tiled and scaled so that all the open windows can be seen simultaneously inside the display screen. That is, performing the specified gesture instantly tiles all of the open windows-scales them down and neatly arranges them so that the user can view the contents in each window. The amount of scaling or the rate of scaling may be tied to some characteristic of the gesture as for example pressure or speed. The second mode is Application Windows or Highlight Current Application. This mode works similarly to the first mode except that it only works on a particular application. For example, performing the specified gesture may instantly tile the open windows of a particular application while causing all of the other open application to fade to a shade of grey. The third mode is Desktop or Hide All. In this mode, all of the open windows are moved to the screen edges thereby opening up the desktop. That is, performing the specified gesture may hide all of the open windows giving the user instant access to their desktop.

Thereafter, in block 284, the operations can include recognizing a base chord (e.g., two or more fingers). Thereafter, in block 286, a determination can made as to whether or not an upward slide is detected with the base chord. If so, the operation can proceed to block 288 where Expose all is opened. Thereafter, in block 290, a determination can be made as to whether or not a downward slide is detected with the base chord. If so, the operation can proceed to block 292 where Expose all is closed. Thereafter, the operation can proceed back to block 286. Referring back to block 286, if an upward slide is not detected by the base chord, then the operation can proceed to block 294 where a determination can be made as to whether or not a downward slide is detected with the base chord. If so, the operation can proceed to block 296 where dashboard is opened. Thereafter, in block 298, a determination can be made as to whether or not an upward slide is detected. If so, the operation can proceed to block 300 where Dashboard is closed. Thereafter, the operation can proceed back to block 286. Referring back to block 294, if a downward slide is not detected, the operation can proceed to block 301 where a determination is made as to whether the chord has changed. For example, lifting one finger away. If the chord has been changed, the operation can proceed to block 302 where pointing is performed with the altered chord. Thereafter, in block 304, a determination can be made as to whether or not the chord has been changed back to the base chord. If so, the operation can proceed back to block 286. Gesture operation 280 is sometimes referred to as canceling in opposite direction.

In additional embodiments, the operation shown in FIG. 14 can be modified to include right and left swipes, each of which is associated with a different functionality of Expose.

A static command gesture is a gesture that is performed by simply placing a specific arrangement of contacts on a touch surface. A command is initiated when the specific arrangement of contacts is identified at touch down. There are no gesture events that follow the initial placement. The command is simply generated when the touch is detected. The static command gesture may be analogous to sign language where specific hand arrangements mean different things. In the context of the static command gesture, each hand arrangement (or different arrangement of contacts) initiates a different command.

Figure 15:
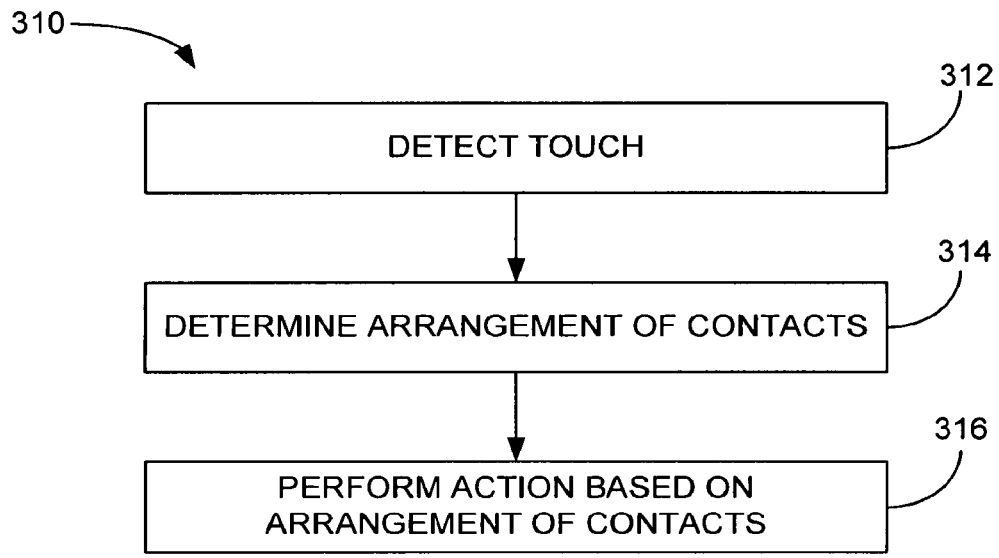
FIG. 15 shows an illustrative gesture operation, in accordance with one embodiment of the present invention

FIG. 15 shows illustrative gesture operation 310, in accordance with one embodiment of the present invention. The gesture operation 310 may begin at block 312 where a touch or near touch is detected on a touch surface. Following block 312, the operation can proceed to block 314 where an arrangement of contact patches associated with the touch is identified. The arrangement of contact patches may be made through one or two hands or alternatively or additionally through elements such as stylus or signets. When the contact patches are created by the hand, they may be made by any portion of the hand including digits, palms, etc, and further by any orientation of the hand, by any position of the digits relative to one another, and by any orientation of digits. As should be appreciated, different hand orientations and different digit positions/orientations will create a different arrangement of contact patches. Examples of different orientations include open hand-face down, open hand face up, open hand side down (thumb up), closed hand-palm down, closed hand-back of hand, closed hand-knuckles, closed hand-side down. Examples of different digit positions include spread, neutral, grouped, etc. Any arrangement of contacts can be envisioned (sign language).

Following block 314, the operation can proceed to block 316 where a command tied to a specific arrangement of contacts is initiated when the specific arrangement of contacts is identified. The commands may be widely varied.

Figure 16:
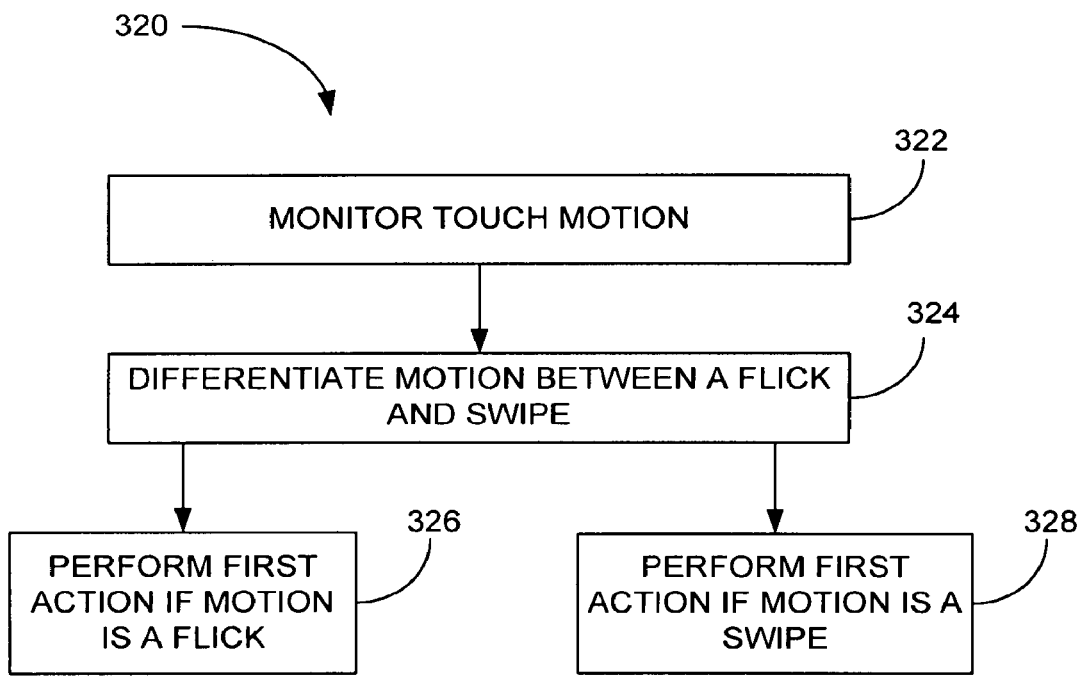
FIG. 16 shows an illustrative gesture operation, in accordance with one embodiment of the present invention.

FIG. 16 shows illustrative gesture operation 320, in accordance with one embodiment of the present invention. The gesture operation 320 may begin at block 322 where a touch is monitored for motion. The touch may for example be embodied as a specific arrangement of contacts. If there is motion, the gesture operation can proceed to block 324 where the motion is differentiated between a flick and a swipe. A flick may be a quick short motion. A swipe may be a longer slower motion. If the motion is a flick, then a first action can be performed when the flick is detected (block 326). If the motion is swipe, then a second action can be performed when the swipe is detected (block 328).

Figure 17:
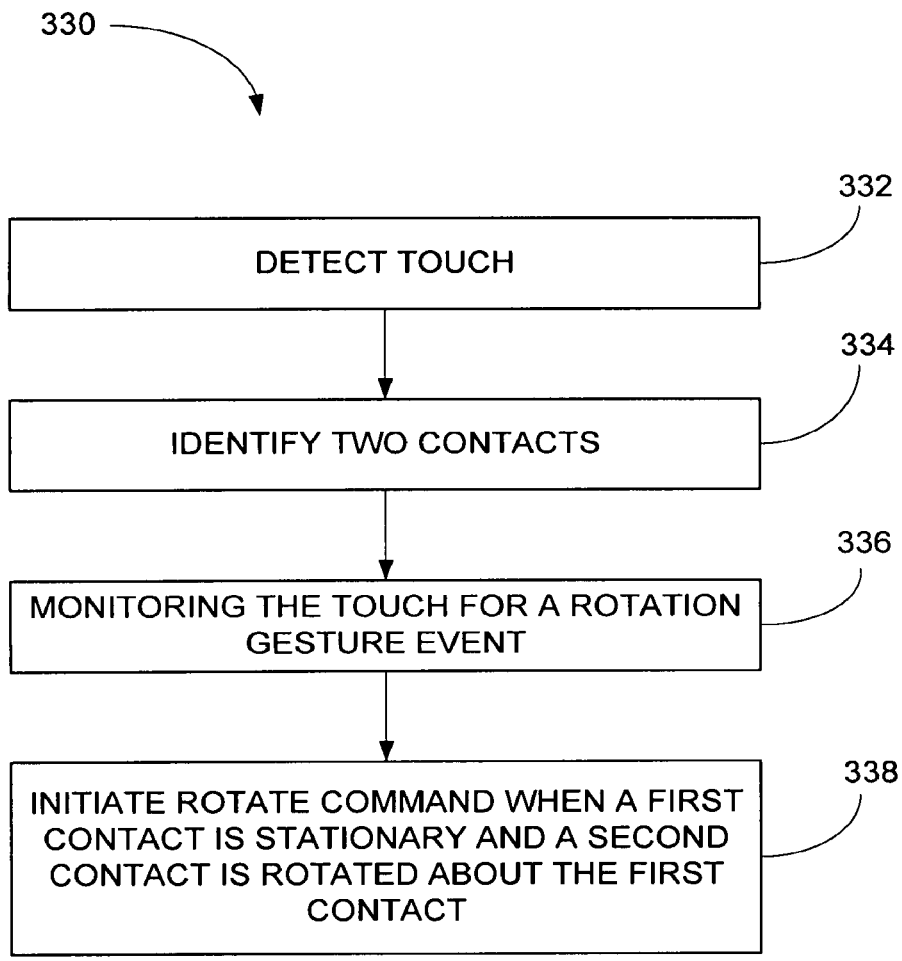
FIG. 17 shows an illustrative gesture operation, in accordance with one embodiment of the present invention.

FIG. 17 shows illustrative gesture operation 330, in accordance with one embodiment of the present invention. The gesture operation 330 may begin at block 332 where a touch is detected on a touch surface (e.g., touch pad, touch screen, etc.). Following block 332, the operation can proceed to block 334 where two contacts associated with the touch are identified. Thereafter in block 336, the operation can include monitoring the touch for a gesture event. In block 338, a rotate command can be initiated when a first contact is stationary and the second contact is rotated about the first contact.

Many users keep multiple windows open an any one time. This allows them to go back and forth between windows as needed. This can be beneficial when copying from one window and pasting in another window. In a typical process, the user would select one of the windows, thereby activating the window and then perform actions within the window. The user would then, select another window, thereby activating the new window and deactivating the old window and then perform actions within the new window. This is clumsy and consists of many steps. In order to overcome this, the present invention provides a method in FIG. 18 that gives the user the ability to go back and forth between windows without activating and deactivating. The windows become active when a pointing mechanism is located over the window. The pointing mechanism maybe a pointer or cursor in the case of a touch pad, or a finger in the case of a touch screen.

Figure 18:
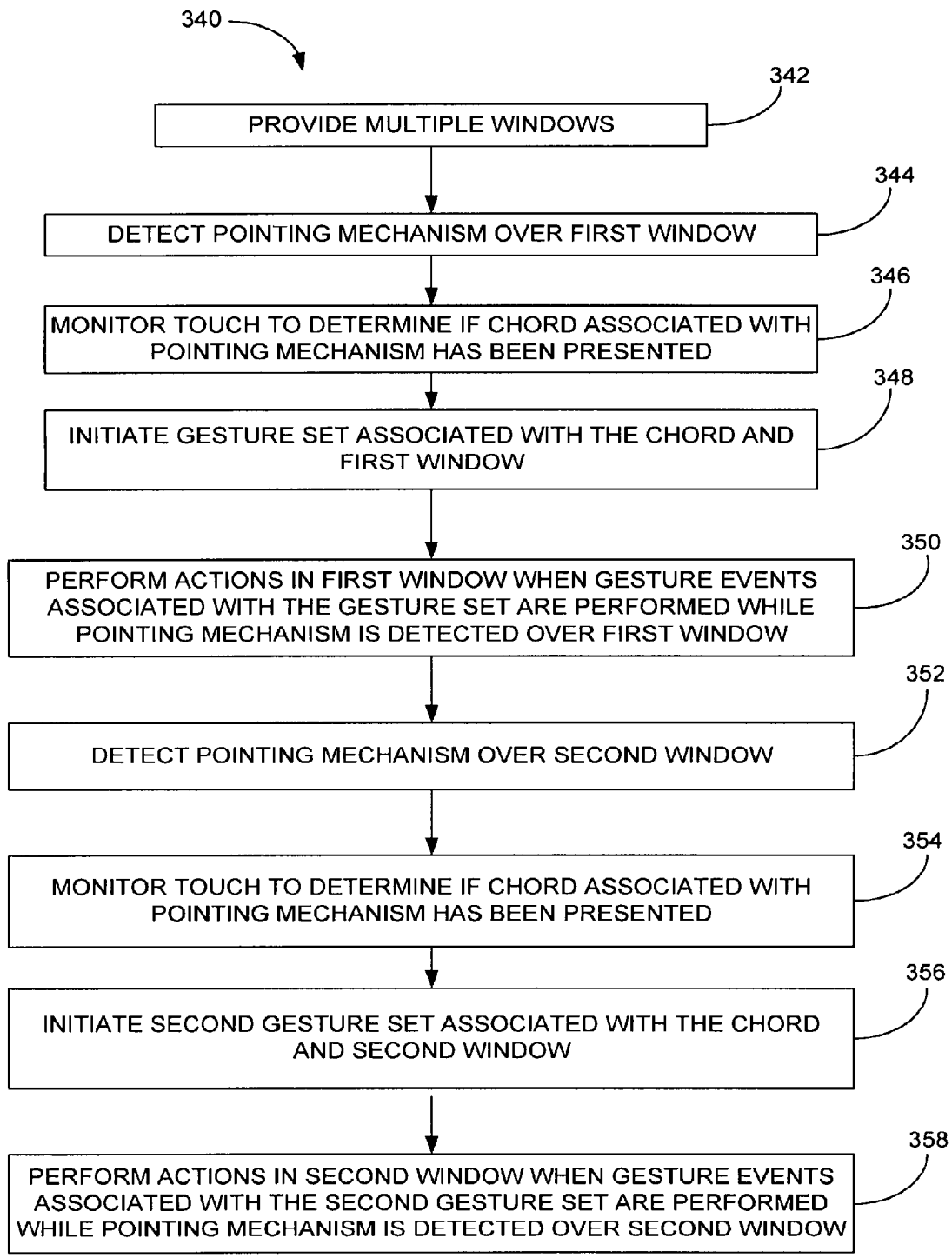
FIG. 18 shows an illustrative gesture operation, in accordance with one embodiment of the present invention.

FIG. 18 shows illustrative gesture operation 340, in accordance with one embodiment of the present invention. The gesture operation 340 includes providing multiple windows 342. For example, the windows may be opened programs on a desktop. Thereafter, in block 344, the operation can include detecting a pointing mechanism over the first window. For example, in the case of a touch pad, the pointing mechanism may be a cursor. In the case of a touch screen, the pointing mechanism may be a finger or group of fingers. Thereafter, in block 346, the touch can be monitored to determine if a chord associated with the pointing mechanism has been presented. In the case of a touch pad, this may be accomplished after the cursor is placed over the window. In the case of a touch screen, this may be accomplished while the finger is positioned over the window. Thereafter in block 348, a gesture set associated with the chord and first window can be initiated (e.g., the gesture set depends on both the chord and window). Thereafter, in block 350, actions can be performed in the first window when gesture events associated with the gesture set are performed on the touch surface. Thereafter, in block 352, the operation can include detecting a pointing mechanism over the second window. This may be accomplished at a different time than block 344 or it may occur simultaneously with block 344. The pointing mechanism may be the same pointing mechanism used for the first window (e.g., the pointing mechanism is moved from one window to the other) or alternatively the pointing mechanism maybe a second pointing mechanism (e.g., second cursor or second finger). Thereafter, in block 354, the touch surface can be monitored to determine if a chord associated with the second pointing mechanism has been presented. Thereafter in block 356, a gesture set associated with the chord and second window can be initiated. Thereafter, in block 358, actions can be performed in the second window when gesture events associated with the gesture set are performed on the touch surface.

In one example of FIG. 18, using a touch screen, if a user is performing copy and paste, the user can place their finger(s) from one hand over the first window and select an object to be copied. Thereafter, the user can perform a copy gesture over the first window. The user can also places fingers from a second hand over the second window and select a location for pasting. Thereafter, the user can perform a paste gesture over the second window.

In another example of FIG. 18, using a touch screen, if a user is performing a copy and paste, the user can place their finger(s) from one hand over the first window and select an object to be copied. Thereafter, the user can perform a copy gesture over the first window. The user can then move their hand to the second window. The user can place their fingers over the second window and selects a location for pasting. Thereafter, the user ca perform a paste gesture over the second window.

Figure 19:
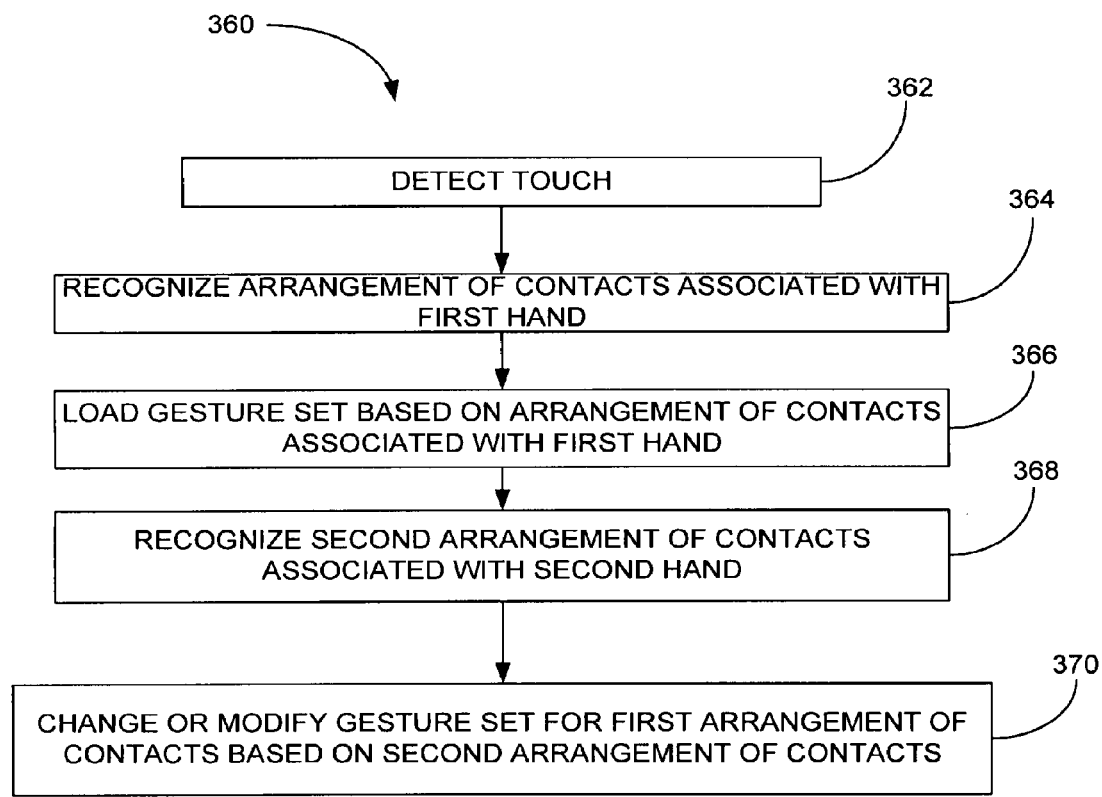
FIG. 19 shows an illustrative gesture operation, in accordance with one embodiment of the present invention.

FIG. 19 shows illustrative gesture operation 360, in accordance with one embodiment of the present invention. The gesture operation may begin at block 364 where the arrangement of contacts associated with a first hand are recognized. Following block 364, the operation can proceed to block 366 where a gesture set based on arrangement of contacts associated with the first hand is loaded. Following block 366, the operation can proceed to block 368 where a second arrangement of contacts associated with a second hand are recognized. Following block 368, the operation can proceed to block 370 where the gesture set of the first arrangement of contacts is changed or modified based on the second arrangement of contacts. As should be appreciated, the second hand can be used to swiftly modulate between different gesture sets as needed. This can also allows for a wider range of possible gesture sets. By way of example, if the first hand can provide 5 gestures sets based on number of fingers, and the second hand can provide 5 modifiers based on number of fingers, then 100 gesture sets can be created.

To cite an example of FIG. 19, using a touch pad, the user can place two fingers on the touch pad thereby initiating a gesture set associated with the two fingers. The user can perform gesture events using the two fingers. The user can decide that he needs to perform an action not offered by the two finger gesture set. The user can therefore place two fingers down from the opposite hand. This can load an entirely new gesture set to be performed by the first hand.

Figure 20:
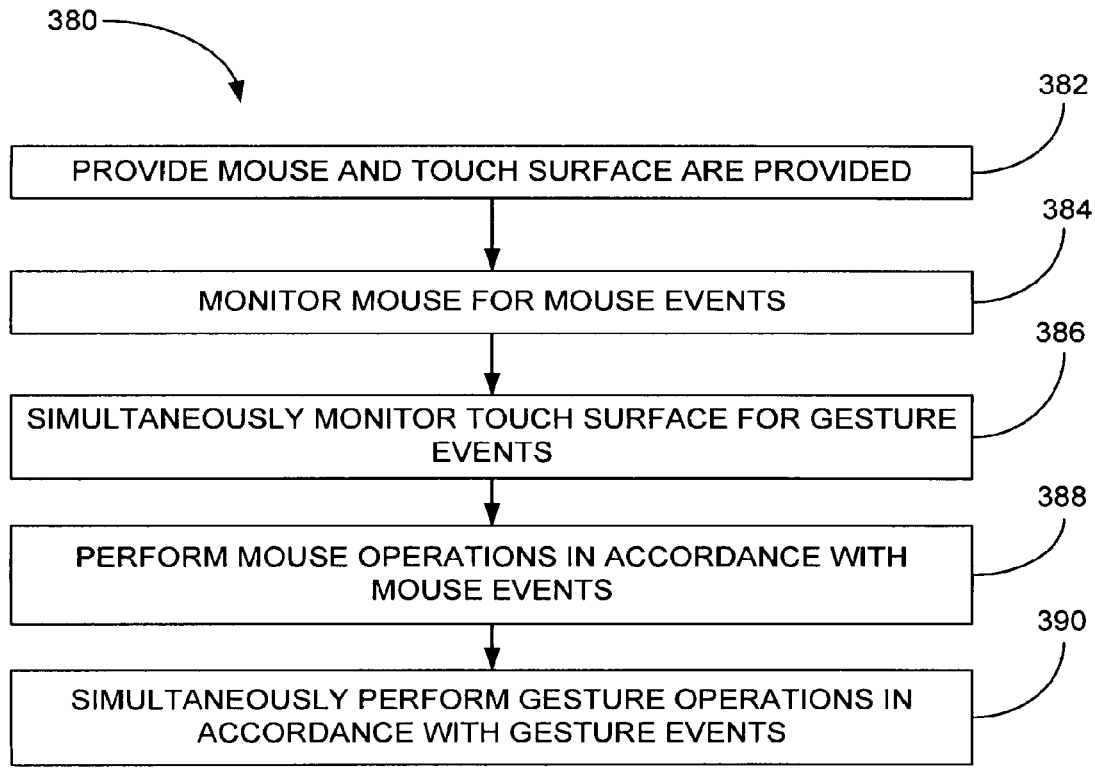
FIG. 20 shows an illustrative control operation, in accordance with one embodiment of the present invention.

FIG. 20 shows illustrative control operation 380, in accordance with one embodiment of the present invention. The control operation may begin at block 382 where a mouse and touch surface are provided. For example, a mouse may be connected to a laptop computer that includes a touch pad. Following block 382, the operation can proceed to block 384 where the mouse is monitored for mouse events (e.g., moving a cursor, button clicks, scrolling). Simultaneously, in block 386, the touch surface can monitored for gesture events. In block 388, mouse operations can be performed in accordance with mouse events. Simultaneously in block 390, gesture operations can be performed in accordance with gesture events. This method can allow a user to control a mouse with one hand while performing gestures with the opposite hand. The user can therefore be more productive.

In one example of FIG. 20, in a spread sheet program, a user can select cells using the mouse, then perform a copy gesture with the opposite hand on a touch surface. The user can then scroll or pan through the spreadsheet using a scroll or pan gesture. Once a desired location is found, the user can select the desired cells or cell for pasting using the mouse and then perform a paste gesture.

Figure 21:
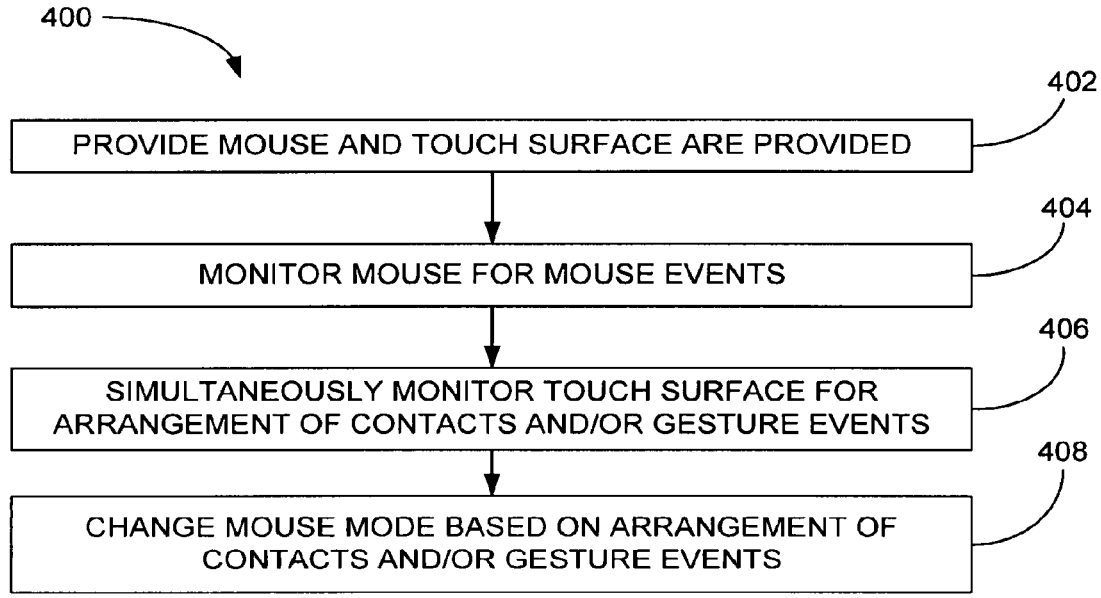
FIG. 21 shows an illustrative control operation, in accordance with one embodiment of the present invention.

FIG. 21 shows illustrative control operation 400, in accordance with one embodiment of the present invention. The control operation may begin at block 402 where a mouse and touch surface are provided. Following block 402, the operation can proceed to block 404 where the mouse is monitored for mouse events (e.g., moving a cursor, button clicks, scrolling). Simultaneously, in block 406, the touch surface can be monitored for gesture events. Thereafter, in block 408, the mouse mode maybe changed based on touch or gesture events performed at the touch surface. For example, the touching hand may be used to modify the functionality of the mouse that is operated with the other hand. By way of example, the presence of a finger on the touch surface may change the mouse from a tracking mode to a scrolling mode.

Figure 22:
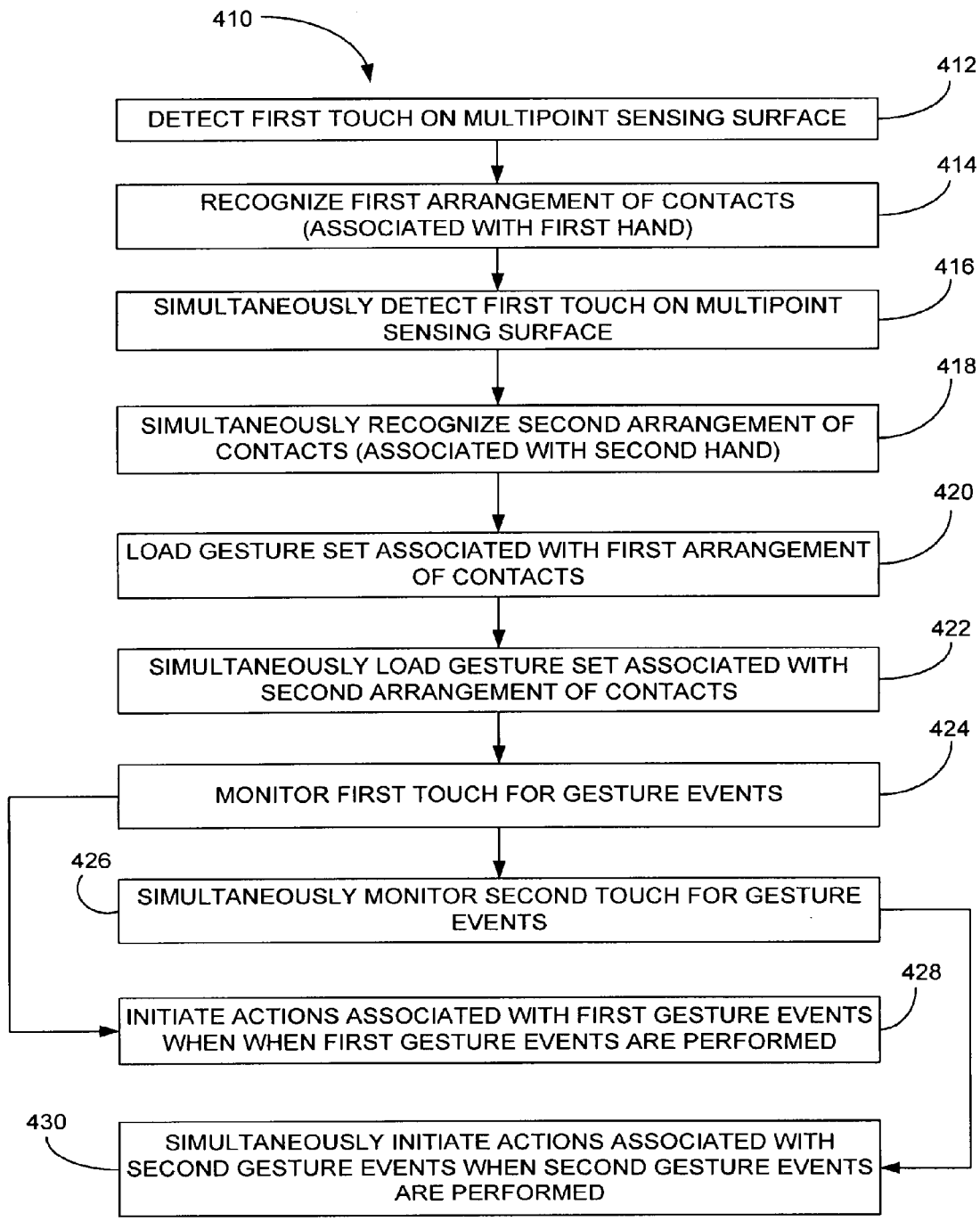
FIG. 22 shows an illustrative control operation, in accordance with one embodiment of the present invention.

FIG. 22 shows illustrative control operation 410, in accordance with one embodiment of the present invention. The operation may begin at block 412 where a first touch is detected on a touch surface. Following block 412, the operation can proceed to block 414 where the first arrangement of contacts is recognized. This may for example be accomplished with a first hand. Simultaneously, in blocks 416 and 418, a second touch can be detected on the touch surface and a second arrangement of contacts can be recognized. This may for example be accomplished with a second hand. In block 420, the gesture set for the first arrangement of contacts can be loaded. Simultaneously, in block 422, the gesture set for the second arrangement of contacts can be loaded. In block 424, the first touch can be monitored for first gesture events. Simultaneously, in block 426, the second touch can be monitored for second gesture events. In block 428, actions associated with the first gesture events can be implemented when the first gesture events are performed. Simultaneously, in block 430, actions associated with the second gesture events can be implemented when the second gesture events are performed.

Figure 23:
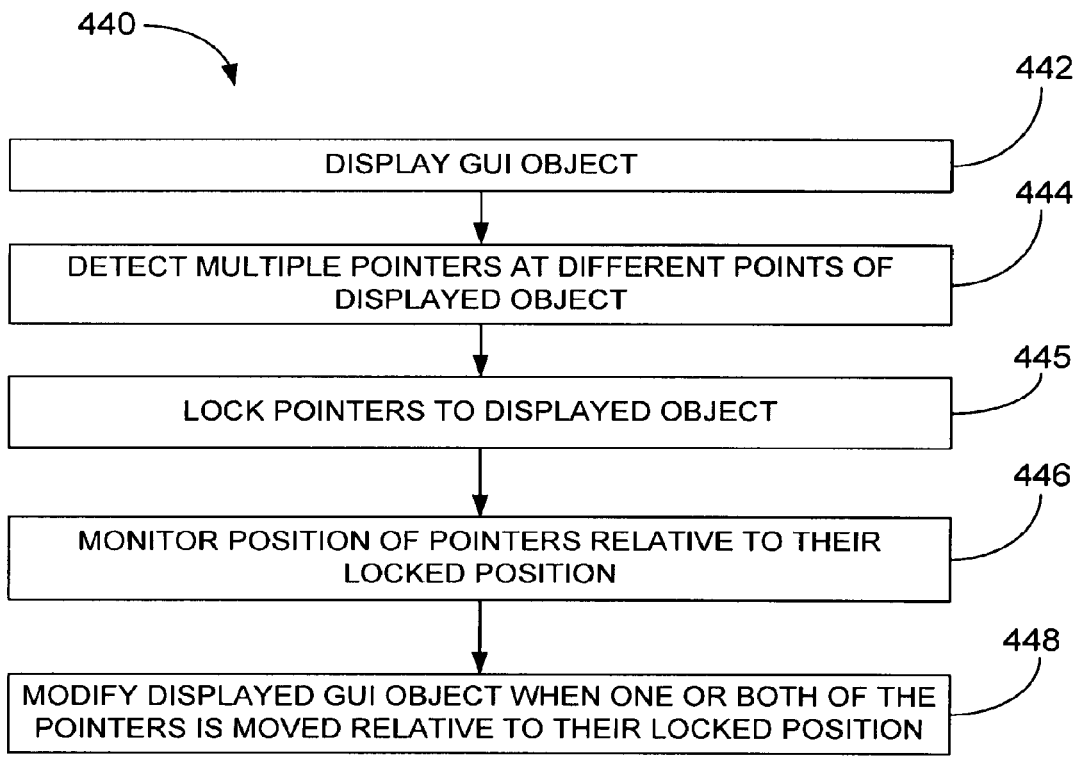
FIG. 23 shows an illustrative control operation, in accordance with one embodiment of the present invention.

FIG. 23 shows illustrative control operation 440, in accordance with one embodiment of the present invention. The operation 440 may start at block 442 where a GUI object is displayed. Thereafter, in block 444, multiple pointers can be detected at different points of the displayed GUI object. In the case of a touch screen, the first pointers may be finger(s) from a first hand, and the second pointer may be finger(s) from a second hand. In the case of a touch pad, the first pointer may be a cursor controlled by a first hand, and the second pointer may be a cursor controlled by a second hand. Once the pointers are detected, the pointers can be locked to the displayed object in block 445. This may be accomplished by pausing. For example, the user can place the pointers at points on the GUI object and then dwell there until the pointers are locked. Thereafter, in block 446, the position of the pointers can be monitored relative to their locked position. Thereafter, in block 448, the displayed object can be modified when position of one or more pointers is moved relative to its locked position. For example, the attributes of the GUI object including for example orientation, size and shape may be modified.

To cite an example of FIG. 23, in order to rotate an object, the user can place their pointers on the GUI object, and when locked, rotate one or two pointers. The GUI object can follow the rotation of the one or two pointers thereby changing its orientation. In order to change its size, the user can place the pointers on the GUI object and when locked, slide the two pointers together or away from one another. When slid together, the size of the object can be reduced. When slid apart, the size of the object can be increased. In order to change its shape, the user can place the pointers on the GUI object and when locked, slide one pointer up, down, right left. When slid away from the object, the object can be made larger in the direction of the slide. When slid towards the object, the object can be made smaller in the direction of the slide.

Figure 24:
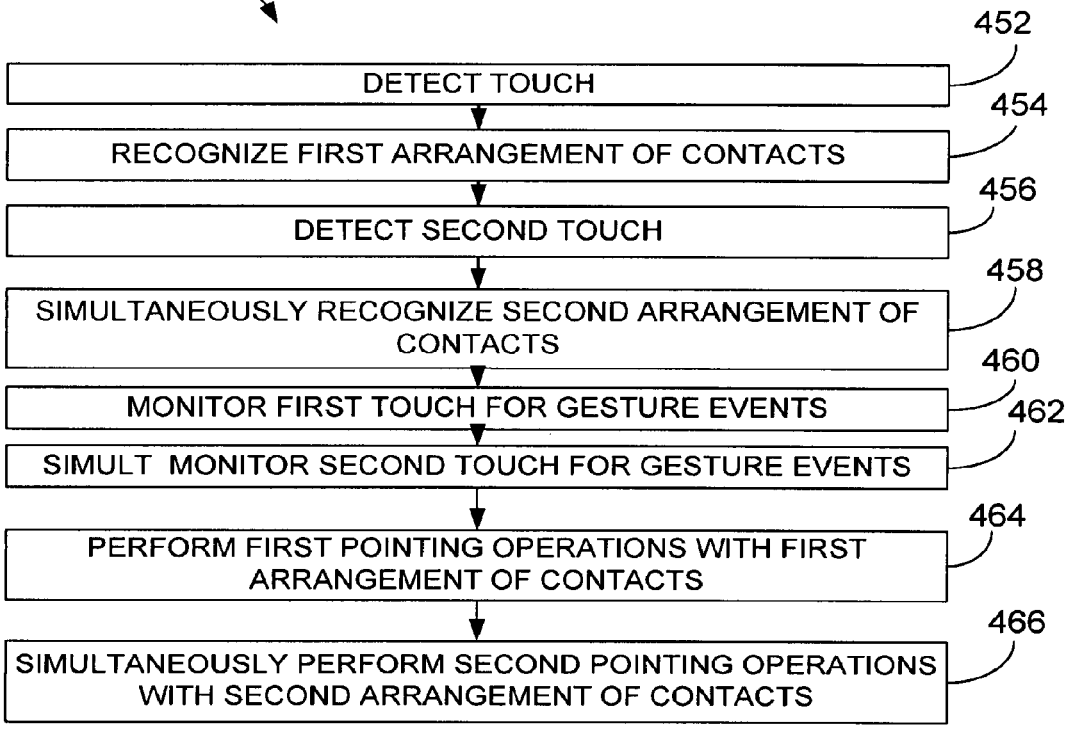
FIG. 24 shows an illustrative control operation, in accordance with one embodiment of the present invention

FIG. 24 shows illustrative control operation 450, in accordance with one embodiment of the present invention. The operation may begin at block 452 where a first touch is detected on a touch surface. This may for example be accomplished with a first hand. Following block 452, the operation can proceed to block 454 where the first arrangement of contacts associated with the first touch is recognized. Simultaneously, in blocks 456 and 458, a second touch can be detected on the touch surface and a second arrangement of contacts can be recognized. This may for example be accomplished with a second hand. In block 460, the first touch can be monitored for first gesture events. Simultaneously, in block 462, the second touch can be monitored for second gesture events. In block 464, pointing operations associated with the first gesture events can be implemented when the first gesture events are performed. Simultaneously, in block 466, pointing operations associated with the second gesture events can be implemented when the second gesture events are performed.

Figure 25:
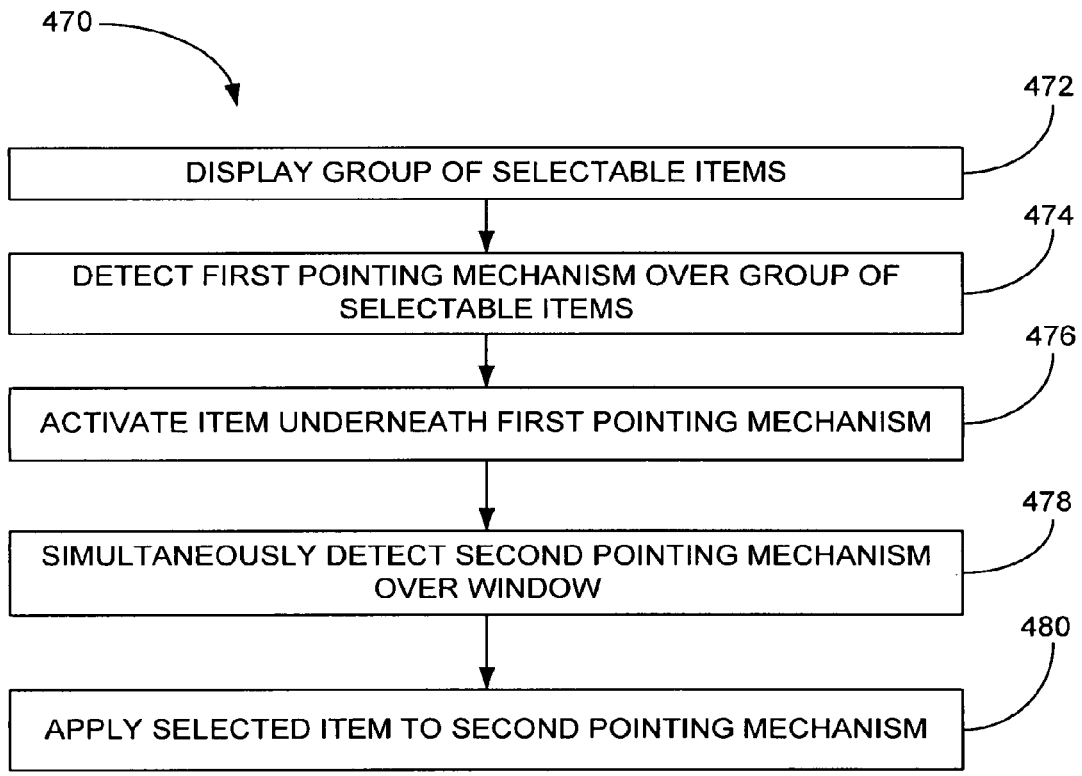
FIG. 25 shows an illustrative control operation, in accordance with one embodiment of the present invention.

FIG. 25 shows illustrative control operation 470, in accordance with one embodiment of the present invention. The control operation may begin at block 472 where a group of selectable items are displayed. The group of selectable items may for example be a color palette or a tool bar. After block 472, the operation can proceed to block 474 where a first pointing mechanism is detected over the group of selectable items. In the case of a touch screen the pointing mechanism may be a finger or group of fingers. In the case of a touch pad, the pointing mechanism may be a cursor or tool that is controlled by a finger or group of fingers. In block 476, the item underneath the first pointing mechanism can be activated (selected). The activated item may be based on the location of the pointing mechanism. Visual feedback may be provided so that the user has confirmation about their selection. By way of example, the activated item may be highlighted when the first pointing mechanism is positioned over the item. In block 478, a second pointing mechanism can be simultaneously detected over a window (e.g., both pointing mechanism operate at the same time). The window may for example be a canvas in a draw or paint program. In the case of a touch screen the second pointing mechanism may be a finger or group of fingers (from the opposite hand as the first pointing mechanism). In the case of a touch pad, the second pointing mechanism may be a cursor or tool that is controlled by a finger or group of fingers. In block 480, the selected item can be applied to the second pointer mechanism. For example, in the case of a toolbar, the tool functionality of the second pointer mechanism may be based on the selected item. Furthermore, in the case of a touch pad, the tool UI element may change along with the functionality so that the user knows what tool is active (e.g., pencil, paint brush, etc.). In the case of a palette, the output of the second pointer mechanism may be based on the selected item. For example, in the case of painting, when the user selects a color on the palette, the output of the second pointer changes to that color. The user can therefore adjust the color being applied to the canvas on the fly during a painting operation.

Figure 26:
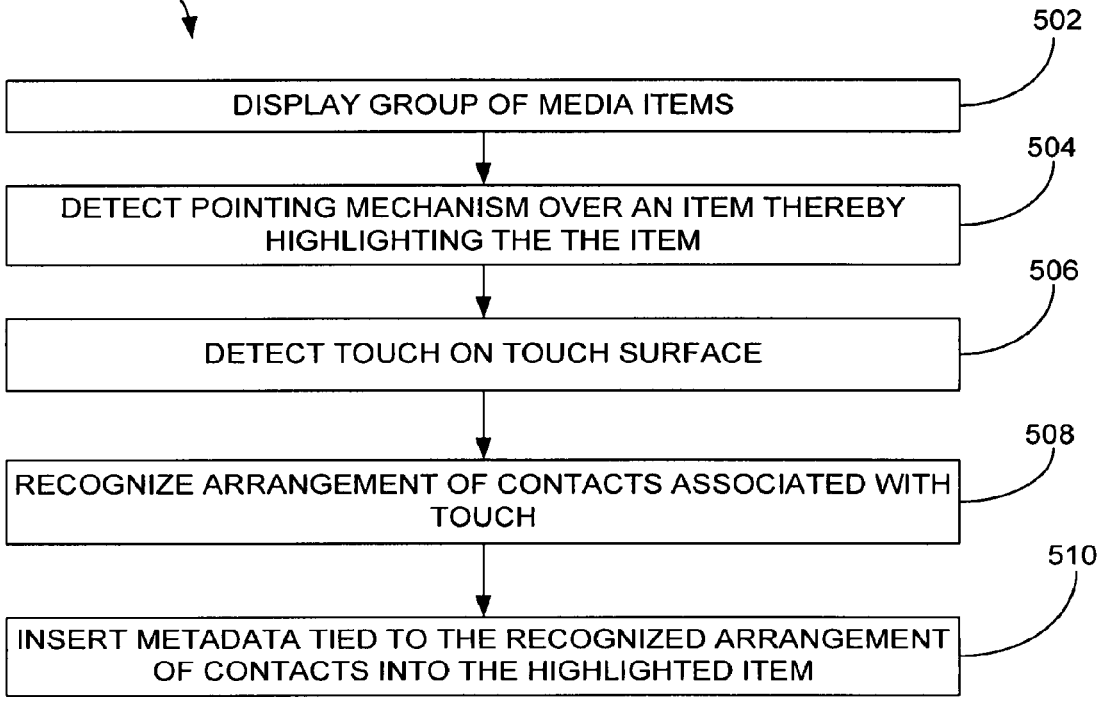
FIG. 26 shows an illustrative control operation, in accordance with one embodiment of the present invention.

FIG. 26 shows illustrative control operation 500, in accordance with one embodiment of the present invention. The control operation may begin at block 502 where a group of media items are displayed. The media items may for example be songs, video clips, movies, photos, games, and the like. The media items may for example be controlled by a media management program. iPhoto and iTunes manufactured by Apple Computer of Cupertino are examples of media management programs. In block 504, a pointer mechanism can be detected over an item thereby highlighting the item. The pointer mechanism may for example be controlled by a mouse or a hand chord (dominant hand). In block 506, a touch can be detected on a touch surface. The touch can be performed by the hand opposite the hand associated with the pointer mechanism. Thereafter, in block 508, the arrangement of contacts associated with the touch can be recognized. Thereafter, in block 510, metadata tied to the recognized arrangement of contacts can be inserted into the highlighted item. Each of arrangement of contacts may have a different metadata. For example, a single finger may have a first metadata, two finger may have a second metadata, three fingers may have a third metadata, four fingers may have a fourth metadata, five finger may have a fifth meta data, and so on. The metadata for each arrangement of contact may be related to the same functionality or they may have entirely different functionalities.

To cite an example of FIG. 26, the above process may be used to rate or rank media items. For example, a single finger may tie a 1 star ranking to a song, two fingers may tie a 2 star ranking to a song, three fingers may tie a 3 star ranking to a song, four fingers may tie a 4 star ranking to a song, and five fingers may tie a 5 star ranking to a song.

To cite another example of FIG. 26, the above process may be used to identify media items. For example, a single finger may tie a first person (e.g., wife Darcy) to a photo, a second finger may tie a second person (e.g., daughter Halley) to a photo, a third finger may tie a third person (e.g., cousin Camden) to a photo, a fourth finger may tie a forth person (uncle Chance) to a photo, and a fifth finger may tie a fifth person (e.g., grandma Shery) to a photo. Taps can be used to enlarge list. For example, the number of fingers at first touch down can be added to the number of fingers at second touch down to produce final arrangement of contacts. Three fingers followed by two fingers may still mean the fifth person. While five fingers and one finger (6 total fingers) may tie a sixth person (e.g., great grandma Terry) to a photo. Furthermore, five fingers and two fingers may tie a seventh person (e.g., dog Prima) to a photo, five fingers and three fingers may tie an eighth person (friend Lisa) to a photo, five fingers and four fingers may tie a ninth person to a photo, and five fingers and five fingers may tie a tenth person to a photo. Alternatively, the metadata may not be associated with a person but rather some other characteristic of photos (e.g., vacation, California, landscape, family, etc.)

Generally speaking, the media management program may need to be placed in a metadata inserting mode. This can be accomplished conventionally through onscreen controls or alternatively by the chord associated with the pointing mechanism.

Figure 27:
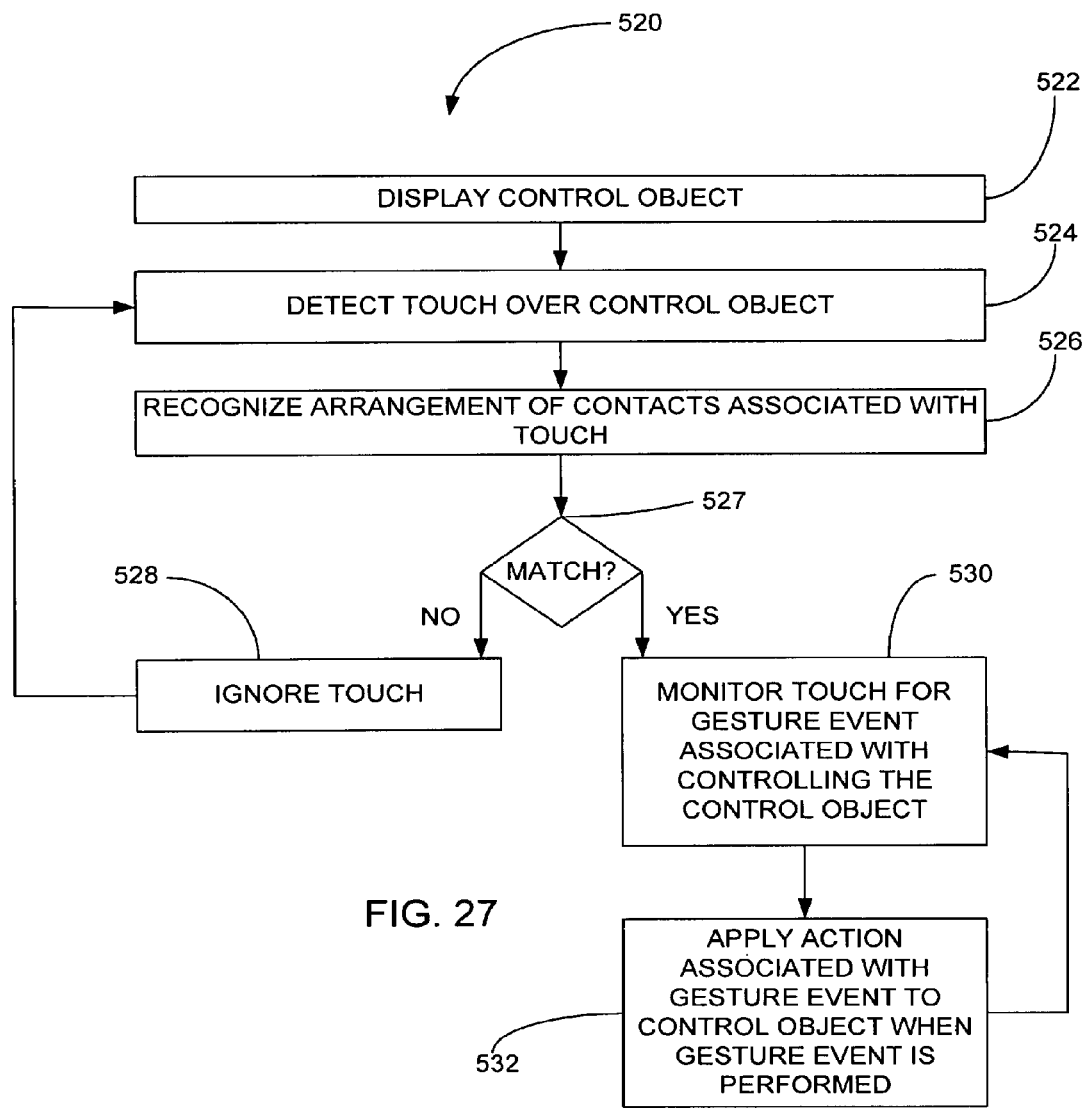
FIG. 27 shows an illustrative control operation, in accordance with one embodiment of the present invention.

FIG. 27 shows illustrative control operation 520, in accordance with one embodiment of the present invention. The control operation may begin at block 522 where a control object is displayed. The control object may for example be an onscreen button, dial, slider, switch, etc. In block 524, a touch can be detected over the control object. Thereafter, in block 526, the arrangement of contacts associated with the touch can be recognized. In block 527, a determination can be made as to whether or not the arrangement of contacts matches the arrangement of contacts associated with controlling the control object. If it does not match, the operation can proceed to block 528 where the touch is ignored. If it does match, the operation can proceed to block 530 where the touch is monitored for a gesture event associated with controlling the control object. If a gesture event is performed, the action associated therewith can be applied to the control object so that the control object can generate its commands (block 432).

In one embodiment of FIG. 27, the arrangement of contacts that initiates the controlling of the control object may be based on multiple contacts while the arrangement of contacts that is ignored may be based on single contact.

Figure 28:
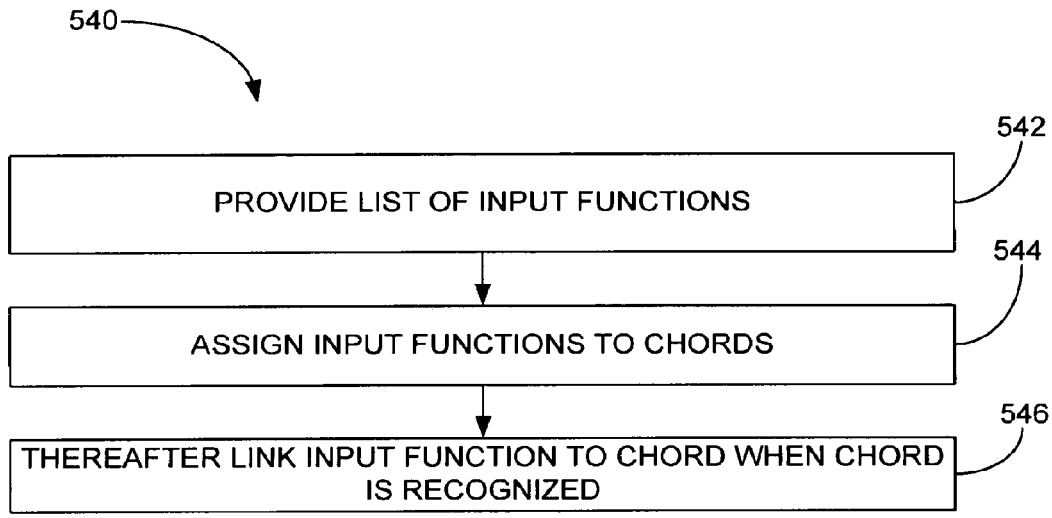
FIG. 28 shows an illustrative control operation, in accordance with one embodiment of the present invention.

FIG. 28 shows illustrative control operation 540, in accordance with one embodiment of the present invention. The control operation 540 can be performed using a control panel such as the one shown in FIG. 29. The operation may begin at block 542 where a list of input functions are provided. The input functions may have commands and gesture events that are linked to the commands. The commands may be related to the input function. For example, if the input function is editing, then the commands may be cancel, undo, paste, backtab, copy, tab, cut, redo and select all. The gesture events can be actions that can be performed by a chord. The gesture events may include rotations (clockwise and counter clockwise), translations as a group (up, down, right, left), translations relative to one another (spread, closed), taps, etc. The gesture events can be linked to commands in an intuitive manner. For example, the cut command may be initiated by closing the fingers together similar to a cutting action. Further, complimentary commands (cut/paste) are typically linked to complimentary gesture events (spread/closed). In block 544, the input function can be assigned to a particular chord. A chord may be an arrangement of fingers. The chords may be displayed in a list such that the user highlights a particular chord and then selects a particular input function. Chords may be assigned to multiple input functions.

In block 544, the user can assign input functions to a particular chord by selecting an input function from a menu of input functions and then selecting a chord from a menu list of chords. (e.g., highlight input function, and then select chord). Once the chord is selected, the input function can be tied to that chord for future operations (block 546). In some cases, the chord menu may include indication of the input function assigned thereto. In this particular embodiment, the commands may be already assigned to gesture events.

Figure 29A:
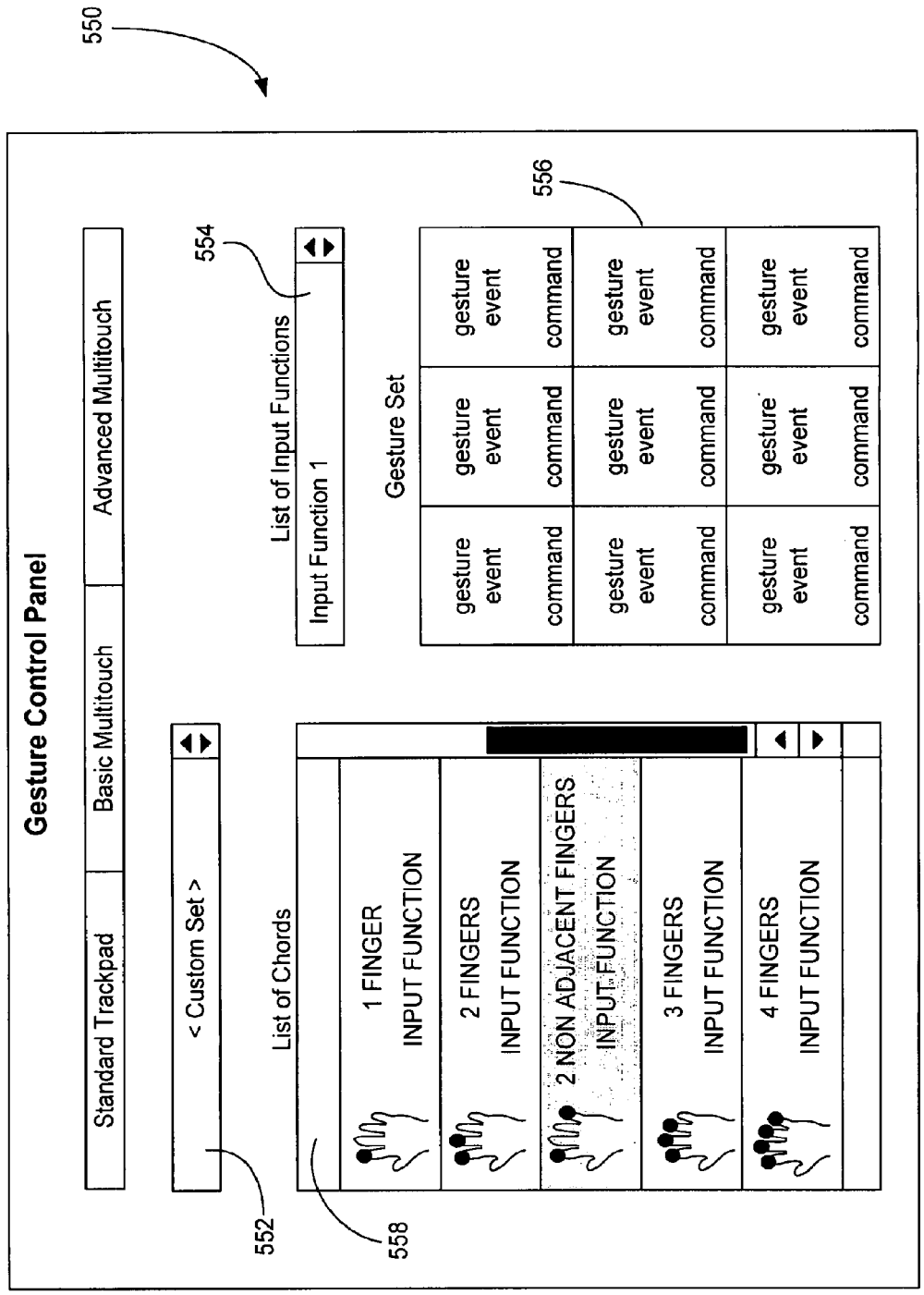
FIGS. 29A-G shows diagrams of an illustrative control panel, in accordance with one embodiment of the present invention.

FIGS. 29A-G are diagrams of control panel 550, in accordance with one embodiment of the present invention. FIG. 29A shows a basic control panel while FIG. 29B-29G show several examples of one control panel embodiment.

As shown in FIG. 29A, control panel 550 can include a gesture map control 552 in the form a pull down window. When a user selects the pull down window, the user can be presented with one or more gesture mapping options. The user may be presented with a default setting (usually set by the manufacturer) or alternatively the user can select a custom setting so that they can form their own gesture map. There may be more than one custom map. For example, different users may create different maps. When a user opens the control panel, they can select the desired custom map by selecting the gesture map control and then moving through the list of custom maps via a highlight bar. Once a desired map is found, the user can simply highlights it and then perform a primary click in order to set up the desired gesture map. Thereafter, the user can change their settings.

Control panel 550 also can include a menu of input functions 554 also in the form of a pull down window. When a user selects the pull down window, the user can be presented with a list of one or more input functions. The input functions may include for example, none, point, point/click, scroll, scroll and secondary click, primary click and drag, secondary click and drag, move window, expose & dashboard, web browser operations, editing operations, file operations and the like. In order to highlight one of the input function, the user can be provided with a highlight bar that traverses through the list in accordance with user controls.

Control panel 550 can also include a gesture set section 556 that shows commands associated with the input function that is highlighted, and gesture events assigned to the commands. The gesture set section may only be for feedback, but can also include the functionality of assigning commands to gesture events (or vice versa). Although the window can be widely varied, in the illustrated embodiment, the window may contain separated boxes, each of which contains a gesture event and a command associated therewith. In this embodiment, the boxes can be set up in a 3×3 matrix, and therefore there can be 9 different gesture events and 9 different commands for each input function. In most cases, oppositely performed gesture events may be placed across from one another. For example, rotate CCW can be located opposite of rotate CW, spread can be located opposite contract, left swipe can be located opposite right swipe, up swipe can be located opposite down swipe. If possible, complimentary command scan be linked to opposite gesture events thereby making them more intuitive.

Control panel 550 can also include a menu of chords 558. The chords can be laid out one on top of the other and move through a window via a scroll bar. The chords may include text identifiers as well as chord indicators showing examples of how to make the chord. In the illustrated embodiment, the chord indicator may be in the form of a hand with darkened circles covering the fingers used to make the chord. The chords may also include text identifiers for the input function assigned to the chord.

In one embodiment, in order to set up the gesture map, the user can highlight an input function and then move to the chord menu. Once at the chord menu, the user can select a desired chord for that input function by traversing through the list of chords, highlighting the desired chord and then performing a selection event as for example via a click. Thereafter, the input function can be assigned to the chord. In some cases, once the user assigns the input function to the chord, the input function identifier can be placed in the chord menu along with the chord. Furthermore, the input function may include an identifier indicating that is has been assigned. For example, a check may be placed by the assigned input function. During operations, when a user places the finger arrangement shown in the chord menu on the multipoint touch surface, the finger arrangement can be recognized as the chord and thereafter, the gesture set associated with the input function assigned to chord can be set as the primary or active gesture set.

Figure 29B:
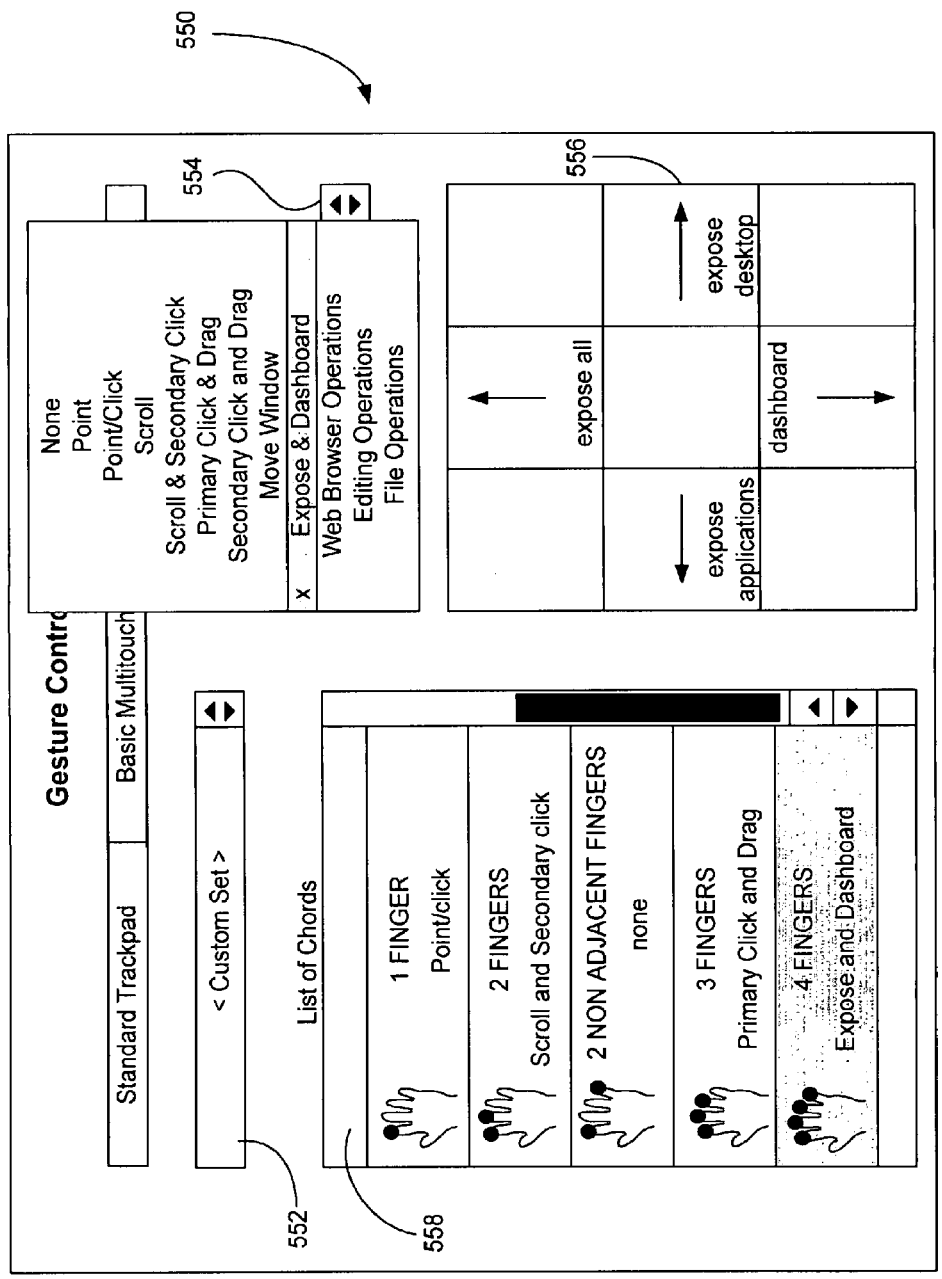

FIG. 29B shows an example where the input function menu may be opened and the user may be assigning the expose dashboard input function to the 4 finger chord. Furthermore, the gesture set may show the commands associated with the expose/dashboard input function and the gesture events used to initiate the commands. For example, a swipe upwards can initiate expose all, a right swipe can initiate expose desktop, a left swipe can initiate expose applications, and a downward swipe can initiate dashboard.

Figure 29C:
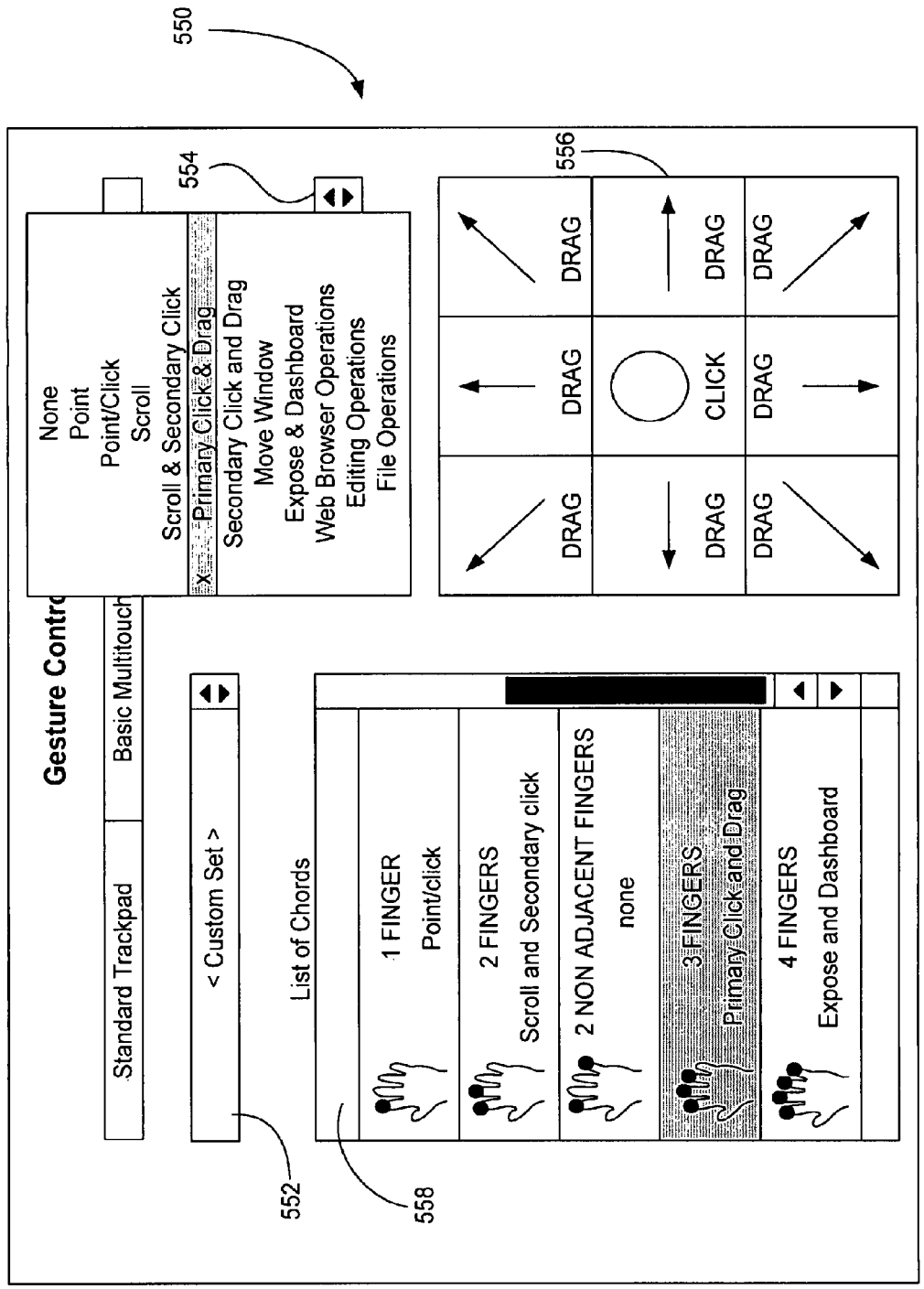

FIG. 29C shows an example where the input function menu may be opened and the user may be assigning the primary click and drag input function to the 3 finger chord. Furthermore, the gesture set may show the commands associated with the click and drag input function and the gesture events used to initiate the commands. For example, directions movements in any direction can be used to drag an object and a tap can be used to initiate a click.

Figure 29D:
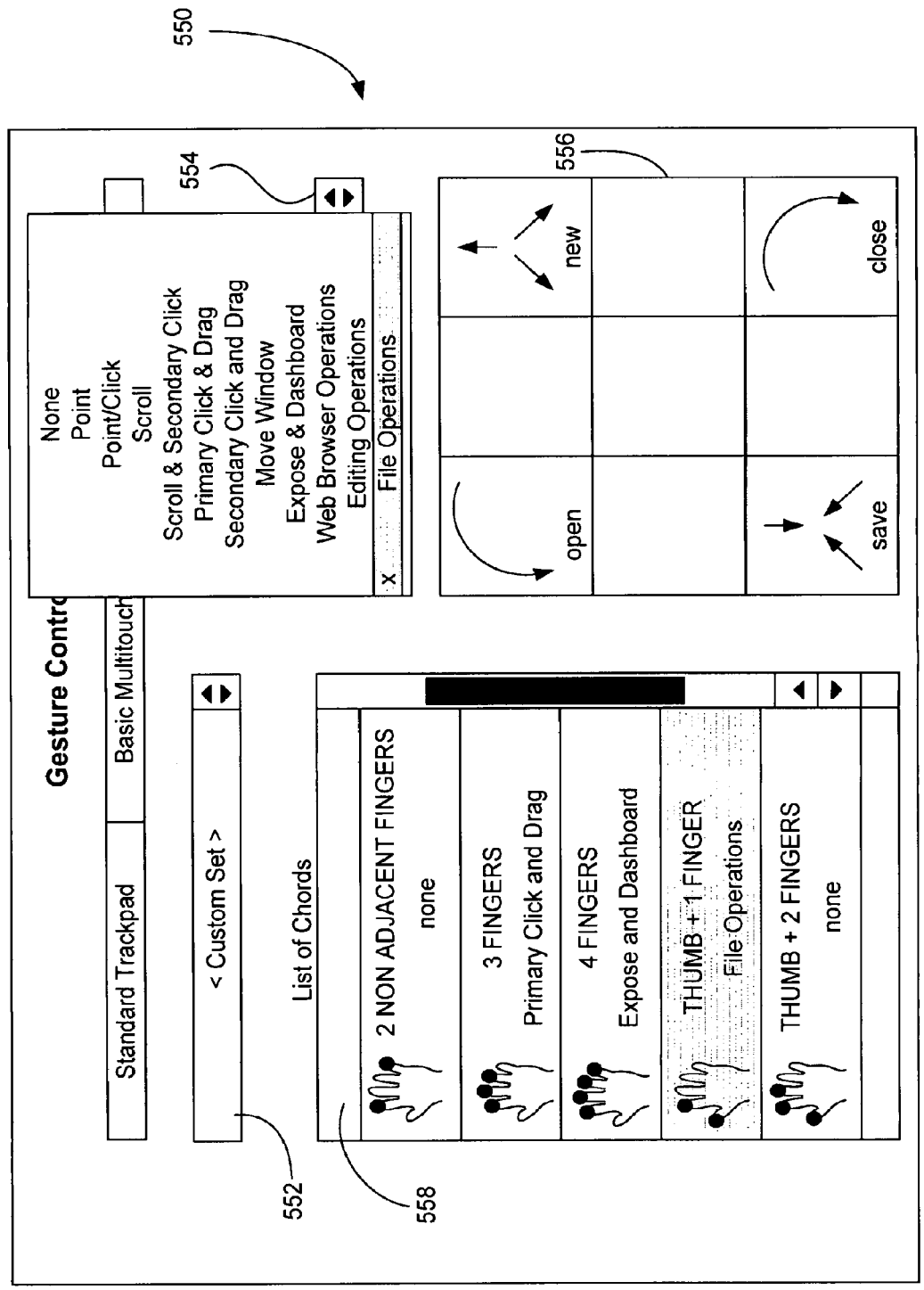

FIG. 29D shows an example where the input function menu may be opened and the user may be assigning the file operation input function to the Thumb+1 finger chord. Furthermore, the gesture set may show the commands associated with the file operation input function and the gesture events used to initiate the commands. For example, a rotational swipe CCW can be used to initiate open, a rotational swipe CW can be used to initiate close, spread can be used for new and contract can be used for save.

Figure 29E:
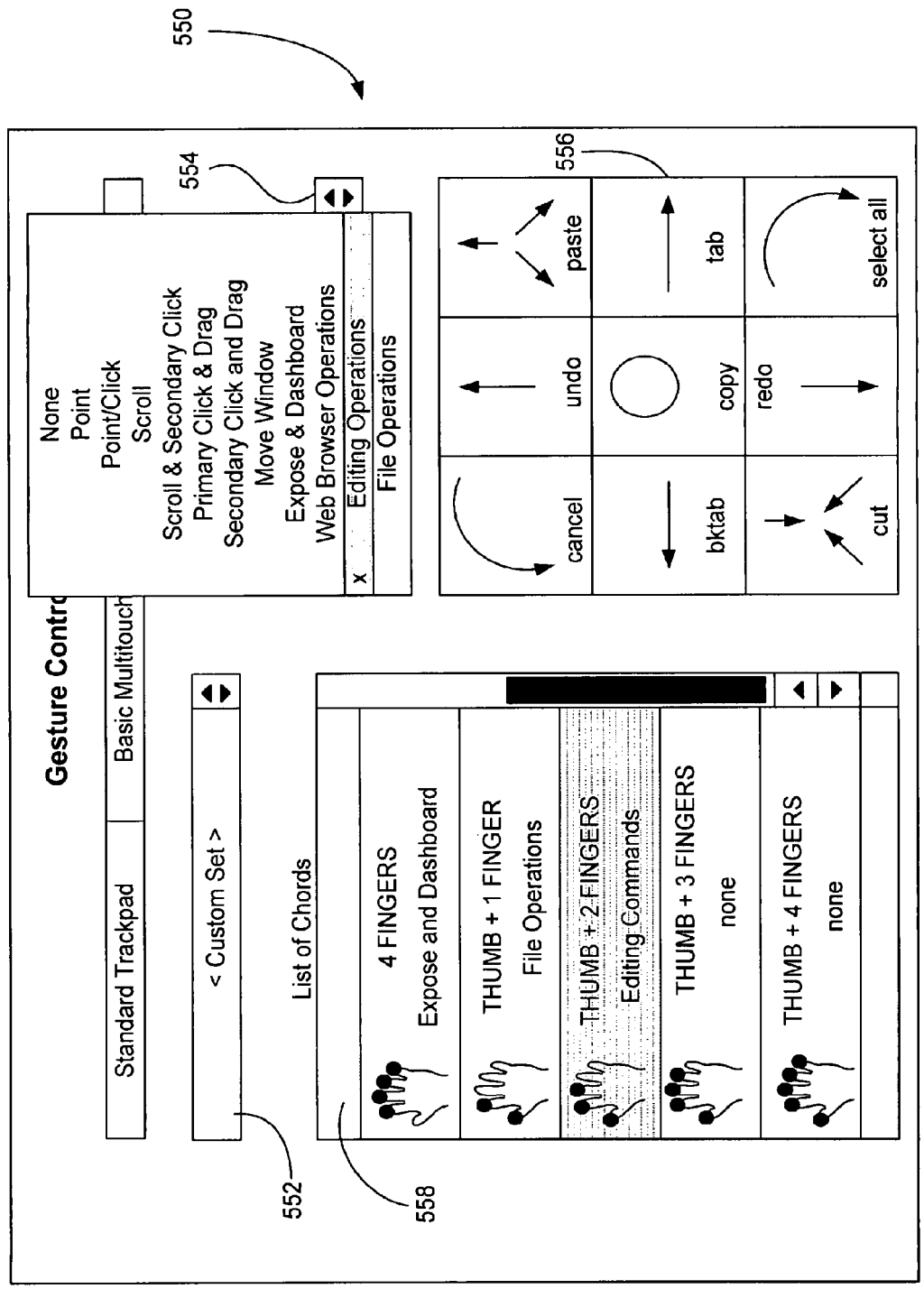

FIG. 29E shows an example where the input function menu may be opened and the user may be assigning the editing operations input function to the Thumb+2 finger chord. Furthermore, the gesture set may show the commands associated with the editing operation input function and the gesture events used to initiate the commands. For example, a swipe upwards can initiate undo, a right swipe can initiate tab, a left swipe can initiate bktab applications, and a downward swipe can initiate redo. Furthermore, a rotational swipe CCW can initiate cancel, a rotational swipe CW can initiate select all, spread can initiate paste and contract can initiate cut. Moreover, a tap can initiate copy.

Figure 29F:
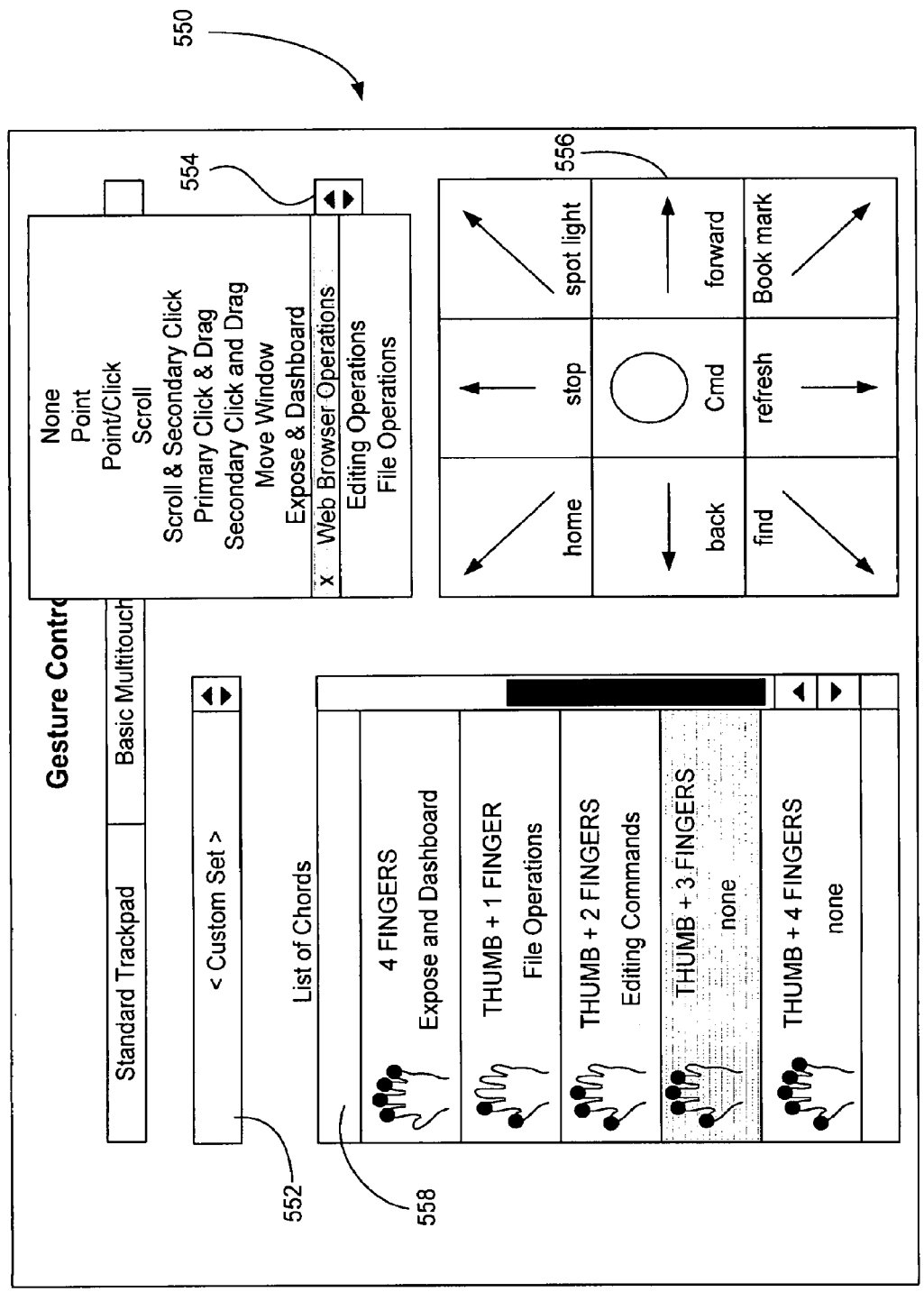

FIG. 29F shows an example where the input function menu may be opened and the user may be assigning the web browser operations input function to the thumb+3 finger chord, Furthermore, the gesture set may show the commands associated with the web browser operations input function and the gesture events used to initiate the commands. For example, a swipe upwards can initiate stop, a right swipe can initiate forward, a left swipe can initiate back, and a downward swipe can initiate refresh. Furthermore, a left upwards swipe can initiate home, a right upward swipe can initiate spot light, a left downwards swipe can initiate find, and a right downward swipe can initiate book mark.

Figure 29G:
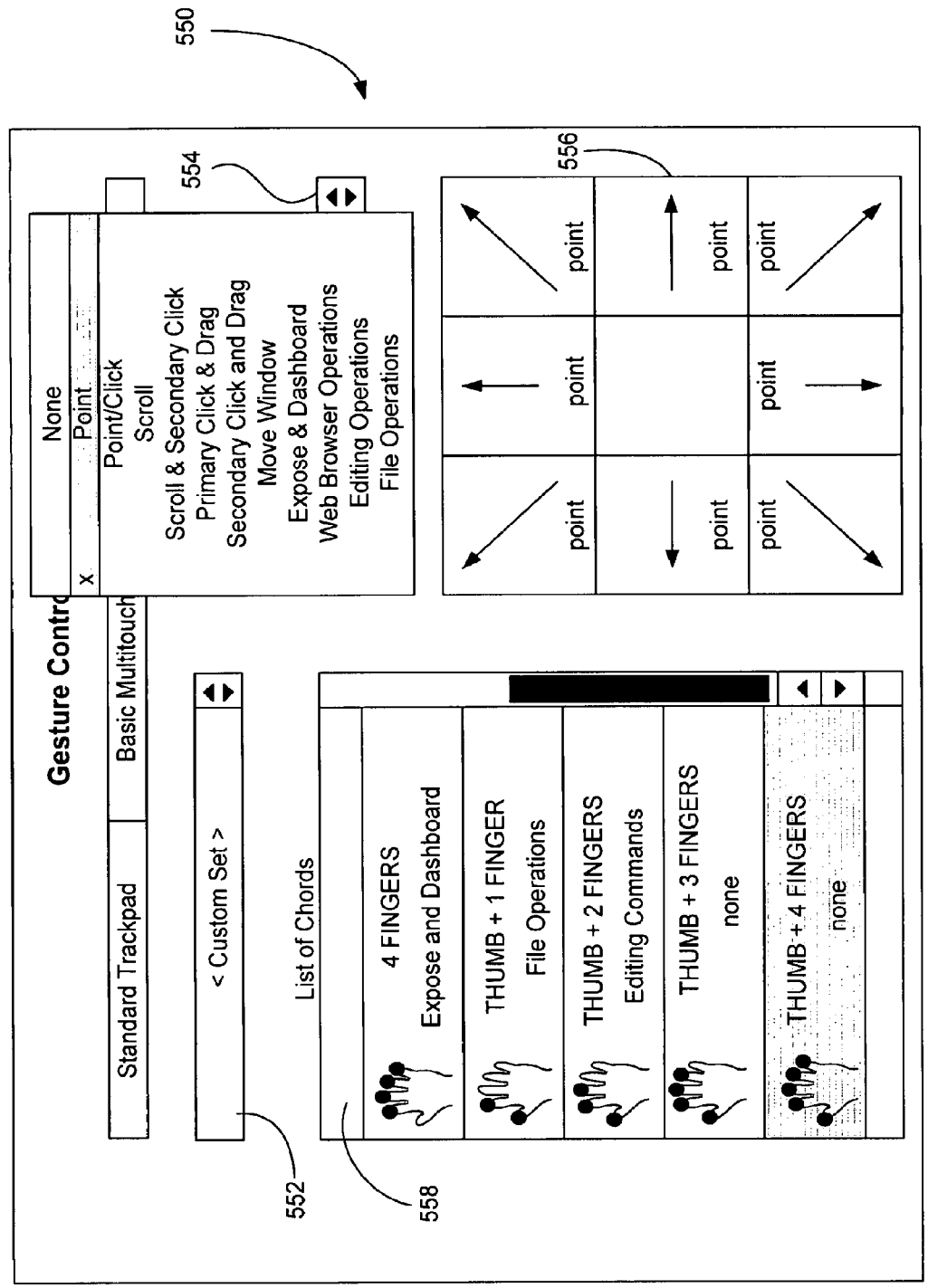

FIG. 29G shows an example where the input function menu may be opened and the user may be assigning the point input function to the thumb+4 finger chord. Furthermore, the gesture set may show the commands associated with the point input function and the gesture events used to initiate the commands. For example, directions movements in any direction can be used for pointing.

Figure 30:
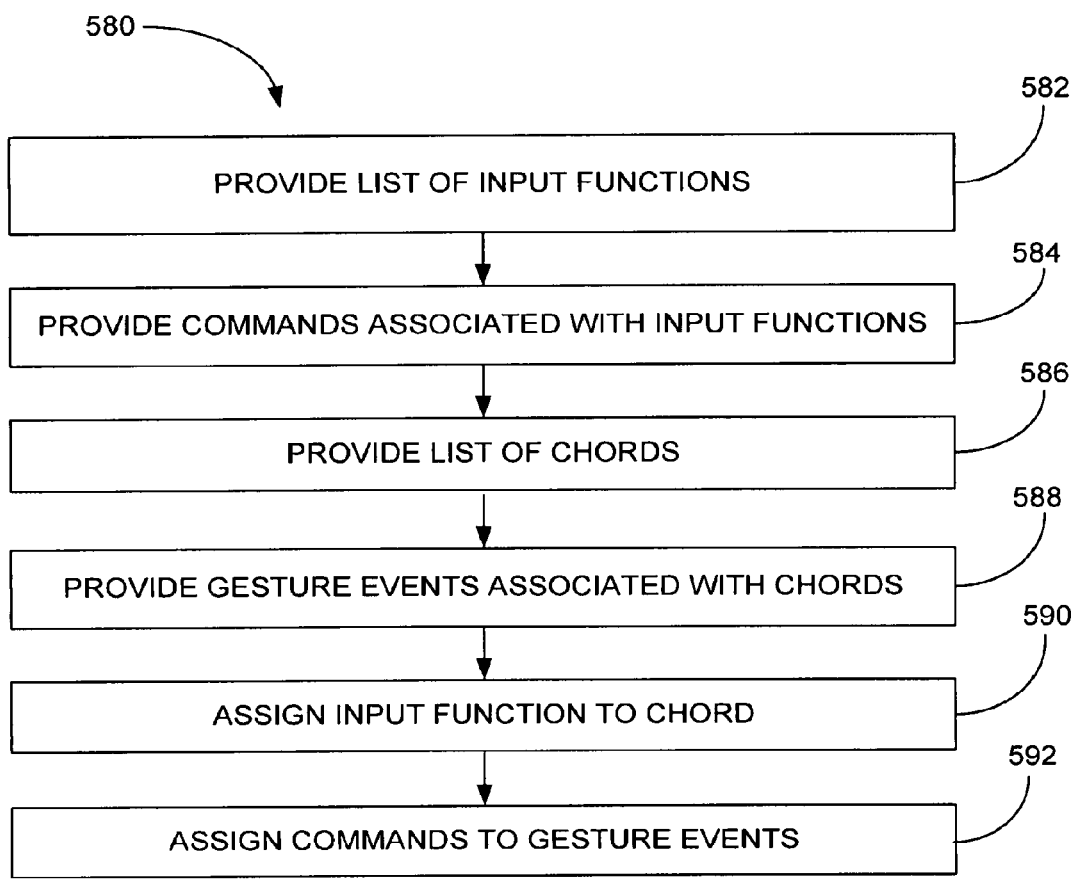
FIG. 30 shows an illustrative control operation, in accordance with one embodiment of the present invention.

FIG. 30 shows illustrative control operation 580, in accordance with one embodiment of the present invention. The control operation 580 can be performed using a control panel such as the one shown in FIG. 29. The operation may begin at block 582 where a list of input functions can be provided. In block 584, a list of commands associated with the input functions can be provided. In block 586, a list of chords can be provided. In block 588, a list of gesture events associated with the chords can be provided. In block 590, the input function can be assigned to a chord (or vice versa). In block 592, the commands can be assigned to gesture events. In an alternative operation, the operation 580 may include providing a list of all available commands rather than having a list associated with a particular input function. The user can assign any command to the input function. Also in an alternative operation, the operation may include providing a list of all available gesture events rather than having a list associated with a particular chord. The user can assign any gesture event to the chord.

Referring to FIG. 29, the user may assign input functions to a particular chord by selecting an input function from a menu of input functions, and then selecting a chord from a menu list of chords. (e.g., highlight input function, and then select chord). Once the chord is selected, the input function can be tied to that chord for future operations. In some cases, the chord menu may include indication of the input function assigned thereto. Furthermore, the user may assign commands to gesture events by moving the commands over a gesture. For example, the user can select and drag a particular command and drops it over the desired gesture event. Thereafter, the command can be tied to that gesture event for future operations.

Figure 31:
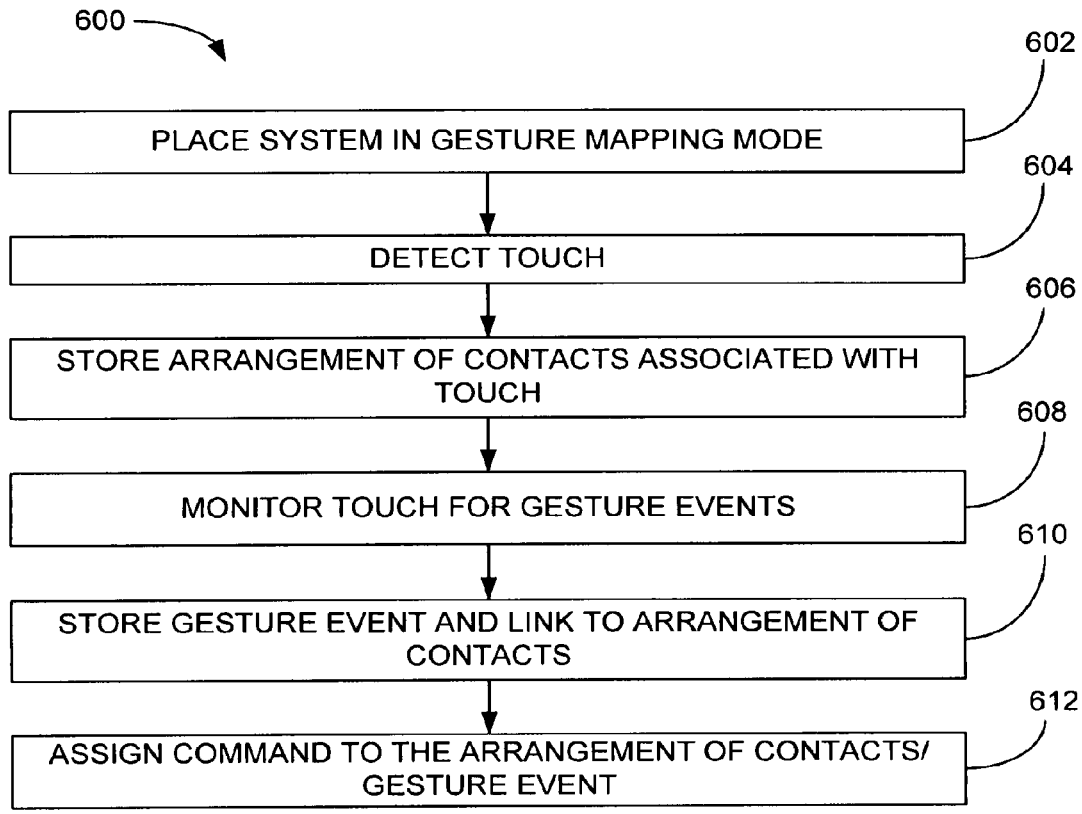
FIG. 31 shows an illustrative method of gesture mapping, in accordance with one embodiment of the present invention.

FIG. 31 shows illustrative gesture mapping method 600, in accordance with one embodiment of the present invention. The mapping 600 may begin at block 602 where the system is placed in a gesture mapping mode. Once in the gesture mapping mode, a touch can be detected in block 604. Thereafter, in block 606, the arrangement of contacts associated with the touch can be stored. For example, an image of the arrangement of contacts can be generated. Thereafter, in block 608, the touch can be monitored for a gesture event. Thereafter, in block 610, the gesture event can be stored. Thereafter, in block 612, a command can be assigned to the arrangement of contacts/gesture event. Once out of the gesture mapping mode, the command can be initiated by placing the arrangement of contacts down so that it can be recognized and then performing the gesture event.

Figure 32:
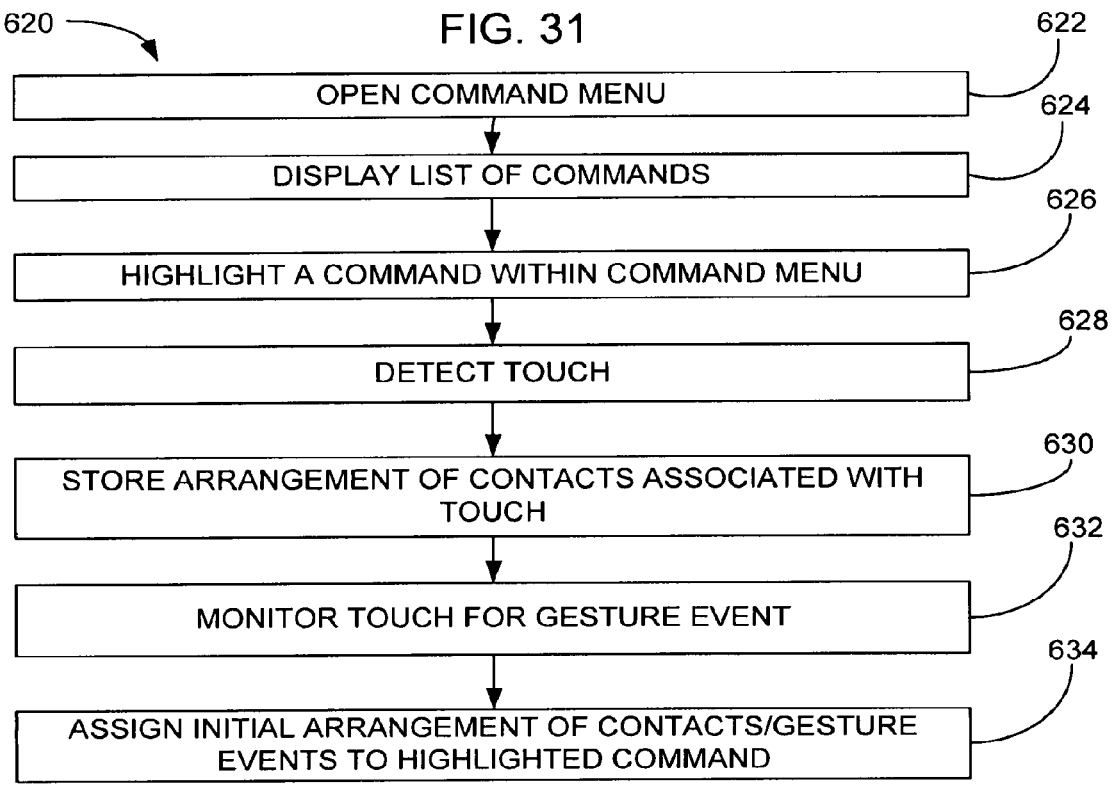
FIG. 32 shows an illustrative gesture mapping method, in accordance with one embodiment of the present invention.

FIG. 32 shows illustrative gesture mapping method 620, in accordance with one embodiment of the present invention. The gesture mapping method 620 may begin at block 622 where a command menu can be opened. The command menu may be any of those menus found in the heading of an application (e.g., File, Edit, View, Insert, Format, Tools, etc.). When the command menu is opened, a list of commands can be displayed (block 624). Following block 624, a highlight bar can be moved over a command in the list of commands via user control. Thereafter, in block 626, a touch can be detected on a touch surface while a command is highlighted. Thereafter, in block 628, the arrangement of contacts associated with the touch can be imaged and stored. Thereafter, in block 630, the touch can be monitored for a gesture event. Thereafter, in block 632, a gesture event can be imaged and stored when it is performed. Thereafter, in block 634, initial arrangement of contacts and gesture events can be assigned to the highlighted command. Once out of the gesture mapping mode, the command can be initiated by placing the arrangement of contacts down so that it can be recognized and then performing the gesture event.

Figure 33:
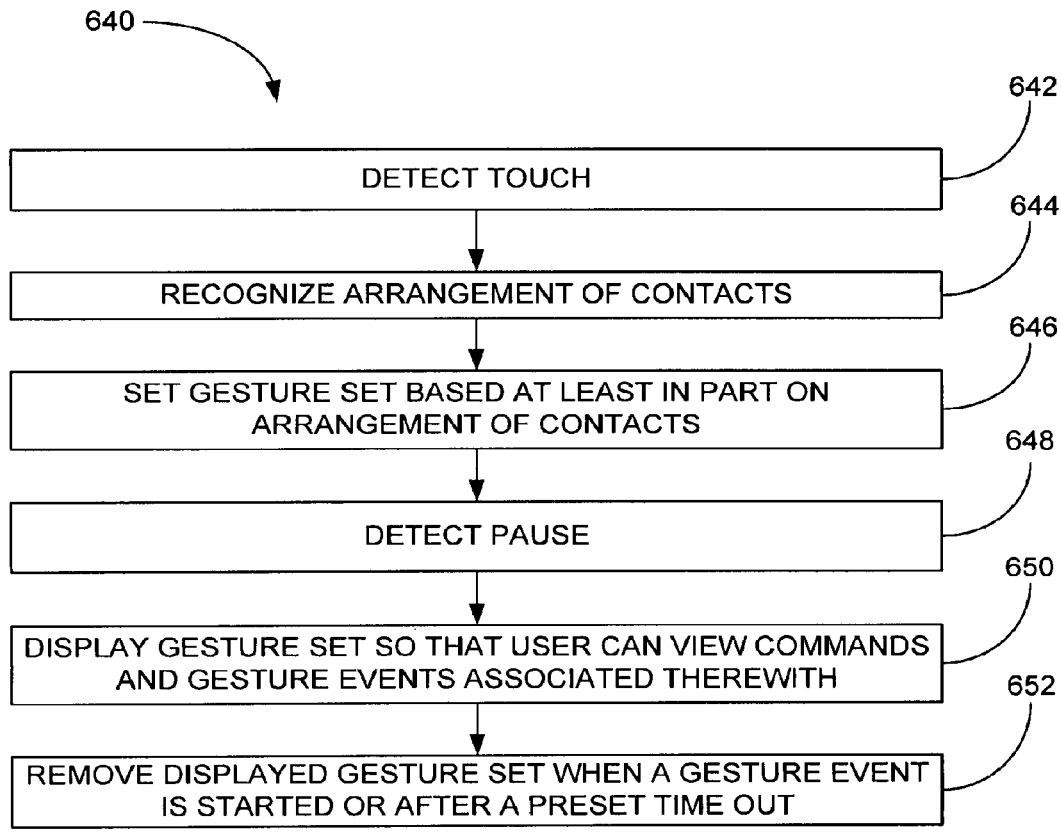
FIG. 33 shows an illustrative method of gesture feedback, in accordance with one embodiment of the present invention.

FIG. 33 shows illustrative gesture feedback method 640, in accordance with one embodiment of the present invention. The method 640 may begin at block 642 where a touch is detected. Thereafter, in block 644, the arrangement of contacts can be recognized. Thereafter, in block 646, the gesture set can be loaded based on at least in part the arrangement of contacts. Thereafter, in block 648, a pause can be detected during the touch (e.g., no gesture event is performed for a period of time). Thereafter, in block 650, the gesture set can be displayed so that the user can view commands and gesture events tied thereto (see for example FIG. 34). Thereafter, in block 652, the gesture set can be removed from display when a gesture event is started or after a preset time out.

Figure 34:
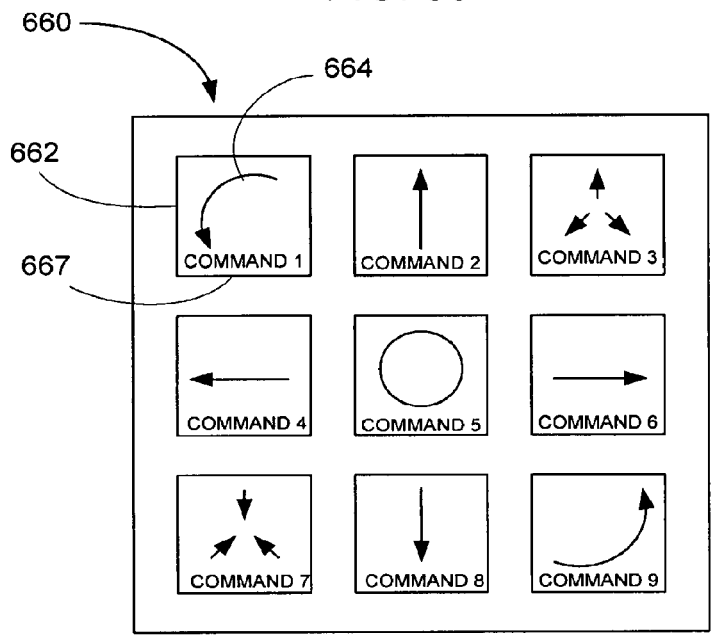
FIG. 34 shows an illustrative diagram of a gesture viewing window, in accordance with one embodiment of the present invention.

FIG. 34 shows illustrative gesture viewing window 660, in accordance with one embodiment of the present invention. A gesture viewing window can be a gesture menu that pops up containing information on how to perform a gesture event and what command will be initiated if the gesture event is performed. The user therefore can quickly imprint the gesture set into memory before performing a gesture event. The gesture window 660 may be a semi-transparent or opaque window that is displayed in the proximity of the first touch down point (or pause) and over any other displayed information. Although the window can be widely varied, in the illustrated embodiment, the window 660 may contain separated boxes 662, each of which can contain a gesture event 664 and a command 667 associated therewith. In this embodiment, the boxes may be set up in a 3×3 matrix, and therefore there may be 9 different gesture events and 9 different commands. In most cases, oppositely performed gesture events can be placed across from one another. For example, rotate CCW can be located opposite of rotate CW, spread can be located opposite contract, left swipe can be located opposite right swipe, up swipe can be located opposite down swipe. If possible, complimentary commands can be linked to opposite gesture events thereby making them more intuitive. For example, in the case of cut and paste, cut may be associated with contract while paste may be associated with spread. Furthermore, another may be associated with a tap (shown by a circle).

Figure 35:
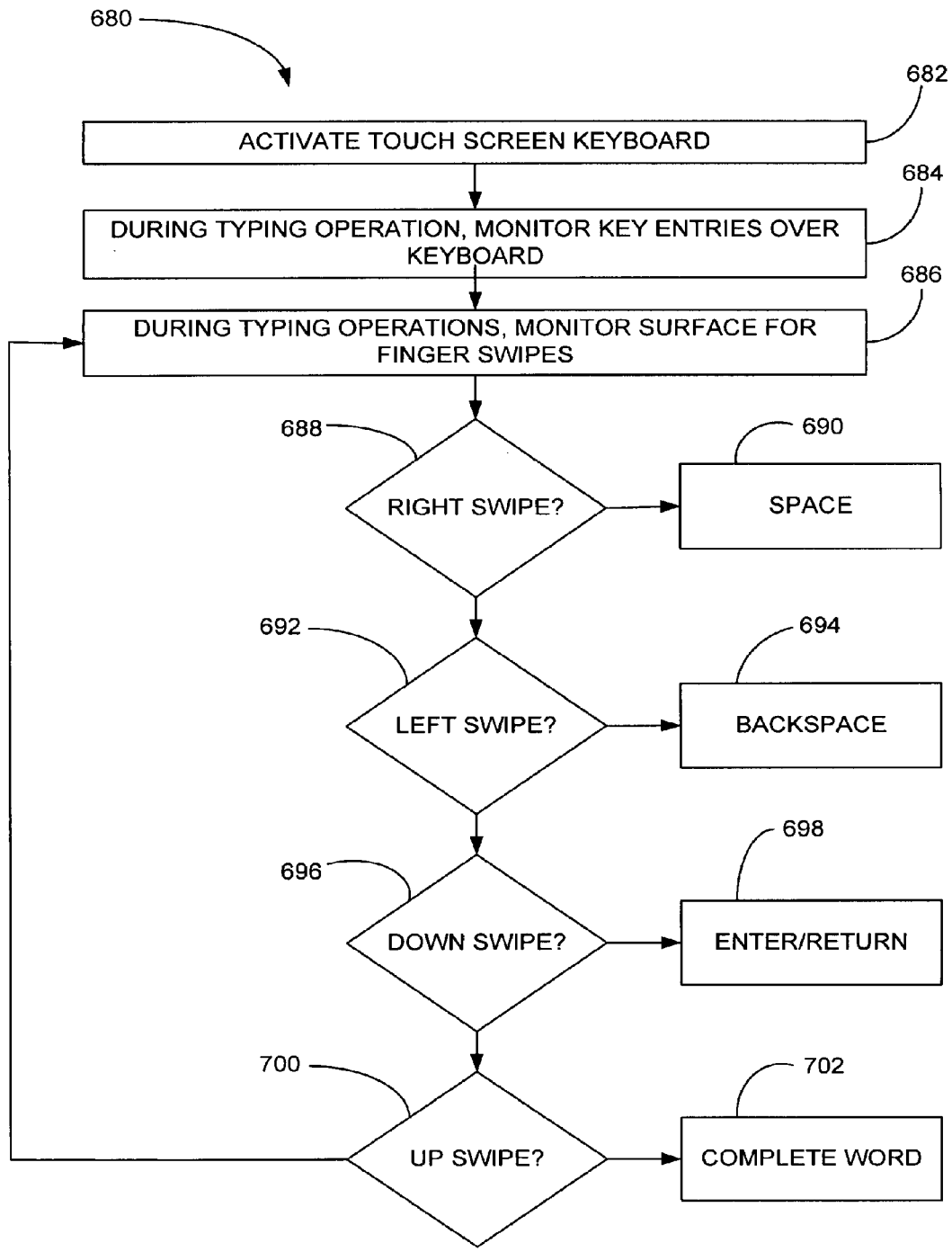
FIG. 35 shows an illustrative keyboard method implemented via a touch screen, in accordance with one embodiment of the present invention.

FIG. 35 shows illustrative keyboard method 680 implemented via a touch screen, in accordance with one embodiment of the present invention. The method 680 may begin at block 682 where a touch screen keyboard is activated (e.g., displayed and ready for receiving input). Thereafter, in block 684, the touch surface can be monitored for key entries (e.g., a finger tapping on a displayed key). Simultaneously, in block

686, the touch surface can be monitored for swiping gesture events. If the swiping gesture event is a right swipe, a space command can be performed (blocks 688 and 690). If the swiping gesture event is a left swipe, a backspace/delete command can be performed (blocks 692 and 694). If the swiping gesture event is a down swipe, an enter/return command can be performed (blocks 696 and 698). If the swiping gesture event is an up swipe, a page break command can be performed (blocks 700 and 702). It should be noted, however, that the methods is not limited to these commands and that other commands can be performed.

With so many combinations of chords, gesture events, commands to evaluate, it may be helpful to isolate strength and weaknesses and develop a guiding theory of which chords and gesture events fit well with which commands. It is generally believed that long term user experience is maximized by matching the best finger combinations with the most frequent commands. Mediocre finger combinations should only be used for less frequent commands. However, because of subtle issues such as cross talk, following this principal alone is not sufficient to create a great user experience.

Figure 36:
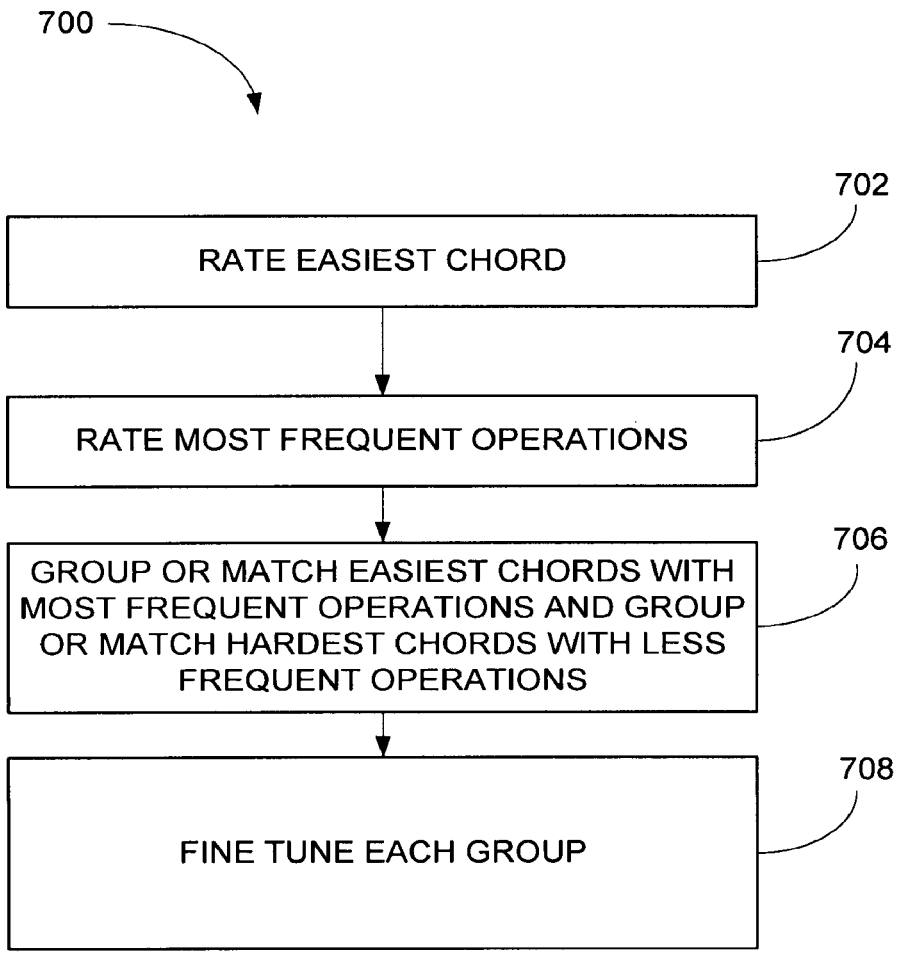
FIG. 36 shows an illustrative gesture design process, in accordance with one embodiment of the present invention.

FIG. 36 shows illustrative gesture design process 720, in accordance with one embodiment of the present invention. The design process 720 includes block 702 where the easiest chords may be rated or ranked. The chords may for example be rated based on speed, reliability, comfort and ease of use, simplicity, etc. This may also be based on the size of the touch surface as smaller surfaces cannot accommodate all finger combinations. FIG. 37 shows one example of a matrix for rating chords. It should be appreciated that this matrix is by way of example and not by way of limitation.

The design process also includes block 704 where the frequency of operations may be rated or ranked. For example, how often a particular user or a group of users performs a particular set of operations. Frequency rankings can vary according to the proportions of operations relative to each other (e.g., web browsing vs. editing). FIG. 38 shows one example of a matrix for ranking frequency of operations for a few operations. It should be appreciated that this list is by way of example and not by way of limitation as there are many more operations.

The design process can also include block 706 where the easiest chords are substantially grouped or matched with the most frequent operations and the hardest chords are substantially grouped or matched with the least frequent operations.

The design process can also includes fine tuning the groups. The fine tuning can be based on many factors including complimentary commands, intuitiveness, cross talk, sensible organization, etc. As should be appreciated, the design process may not be as simple as matching the easiest chord with the most frequent operation. In some cases, the easiest chord may not make sense for the most frequent operation. As such, the chords and the operations may be shifted while still trying to maintain easy with most frequent and hard with less frequent.

Figure 39:
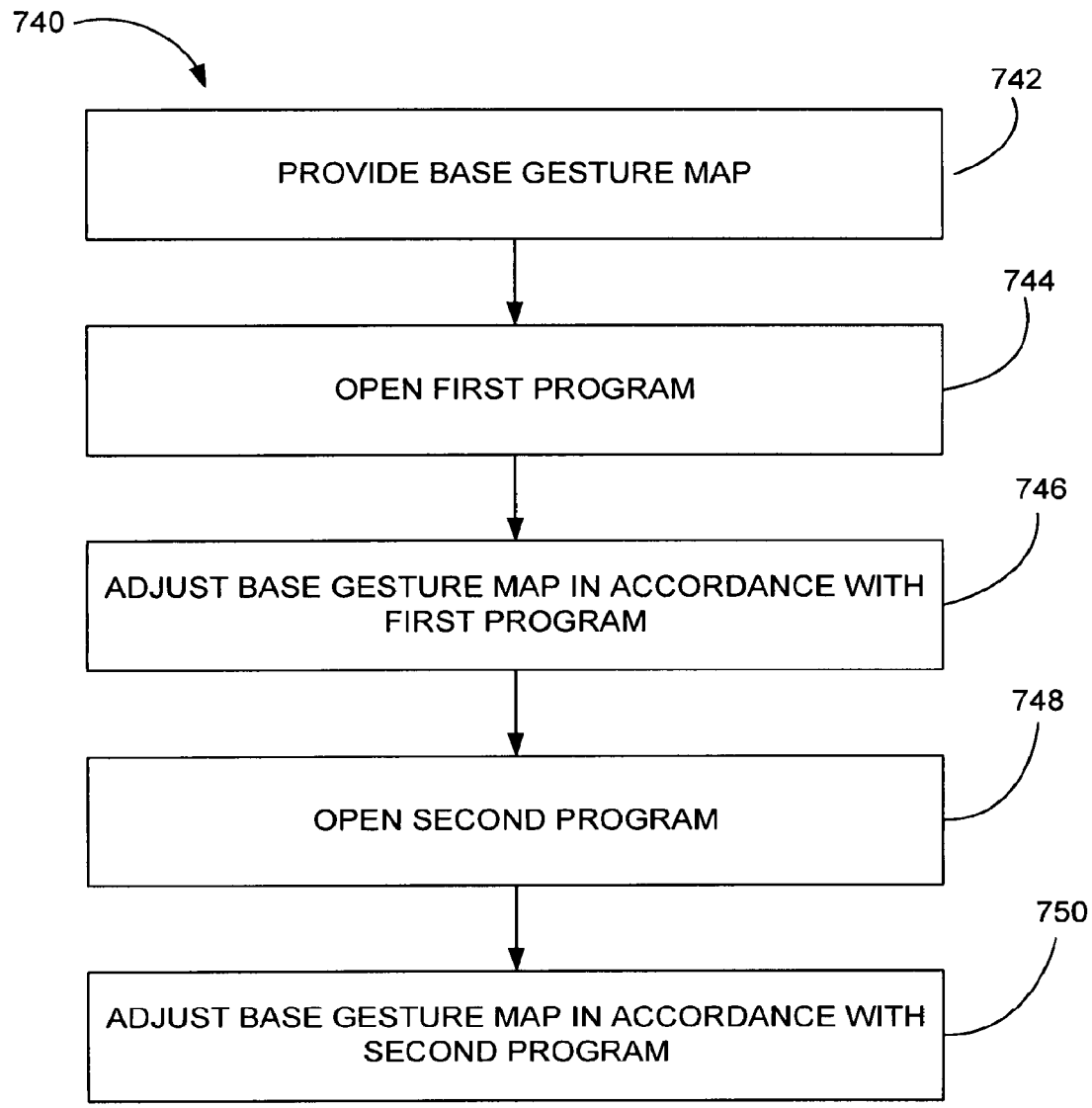
FIG. 39 shows an illustrative control operation, in accordance with one embodiment of the present invention.

FIG. 39 shows illustrative control operation 740, in accordance with one embodiment of the present invention. The control operation may start at block 742 where a base gesture map is provided. The base gesture map can include gesture preference settings including for example chords, commands gesture events, etc. Following block 742, the operation can proceed to block 744 where a first program is made active. The program may for example be a word processing program, media management program, spreadsheet program, media editing program, drawing program, etc. In block 746, the base gesture map can be adjusted in accordance with the first program while the first program is active. For example, the program may instruct the base gesture map to change the meanings of chords and gesture sets for this particular program. In block 748, a second program can be made active. In block 750, the base gesture map can be adjusted in accordance with the second program while the second program is active.

In one example of FIG. 39, a media editing program may adjust the gesture map as follows: one finger for pointing; two fingers for moving, scaling, rotating objects; three fingers for primary drag; four fingers for scroll pan; 5 fingers for pointing while a word processing program may adjust the gesture map as follows: 2 fingers for pointing text cursor, 3 fingers for selecting text, 4 fingers for paging, begin line and endline.

Figure 40:
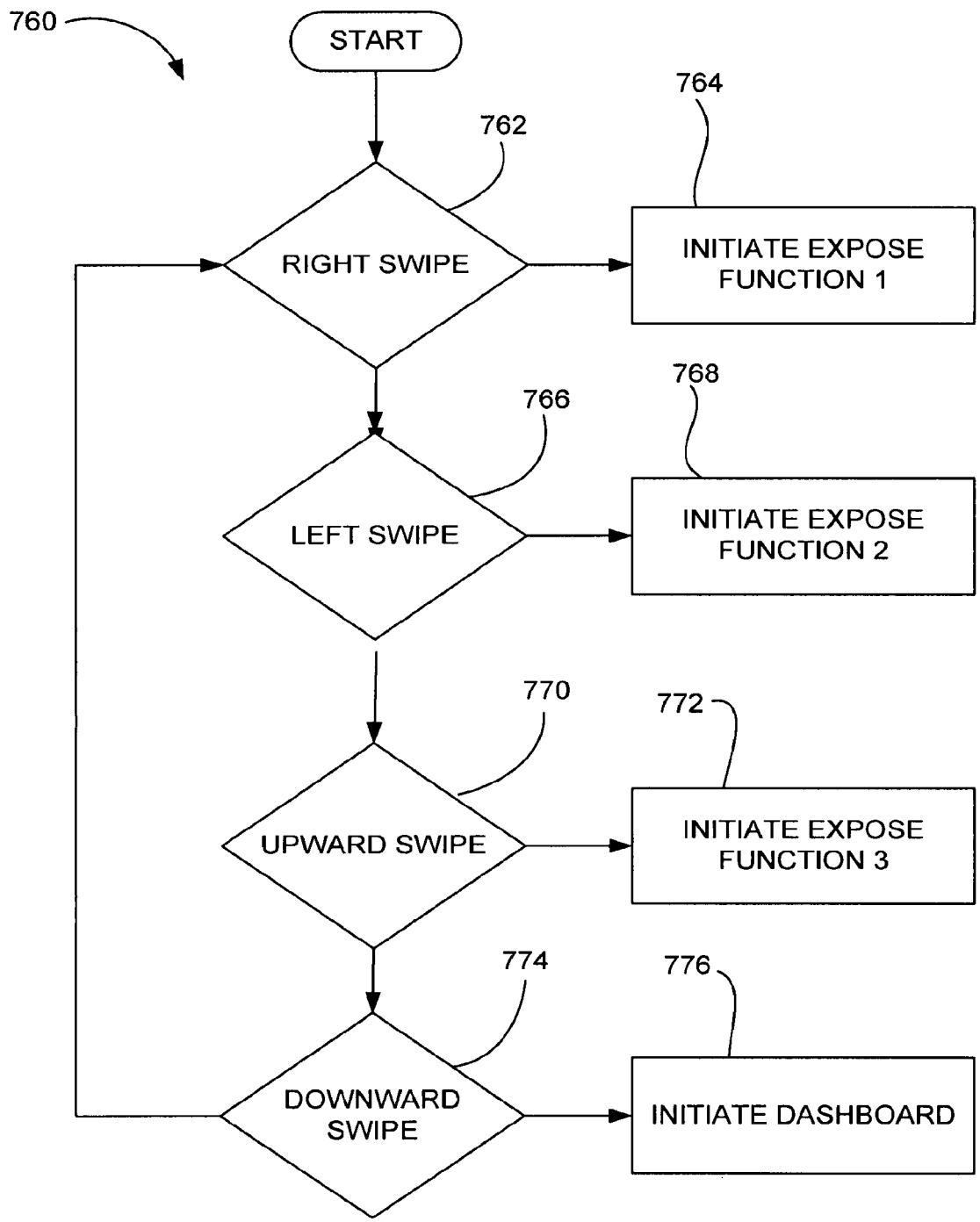
FIG. 40 shows an illustrative control operation, in accordance with one embodiment of the present invention.

FIG. 40 shows illustrative control operation 760, in accordance with one embodiment of the present invention. The control operation can be associated with a gesture set such as one that is implemented with a three finger chord. The control operation may start at block 762 where a determination is made as to whether or not a right swipe is detected. If so, the operation can proceed to block 764 where a first expose function is initiated. If not, the operation can proceed to block 766 where a determination is made as to whether or not a left swipe is detected. If so, the operation can proceed to block 768 where a second expose function is initiated. If not, the operation can proceed to block 770 where a determination is made as to whether or not an upward swipe is detected. If so, the operation can proceed to block 772 where a third expose function is initiated. If not, the operation can proceed to block 774 where a determination is made as to whether or not a downward swipe is detected. If so, the operation can proceed to block 776 where a dashboard function is initiated. If not, the operation can proceed back to 762.

Figure 41:
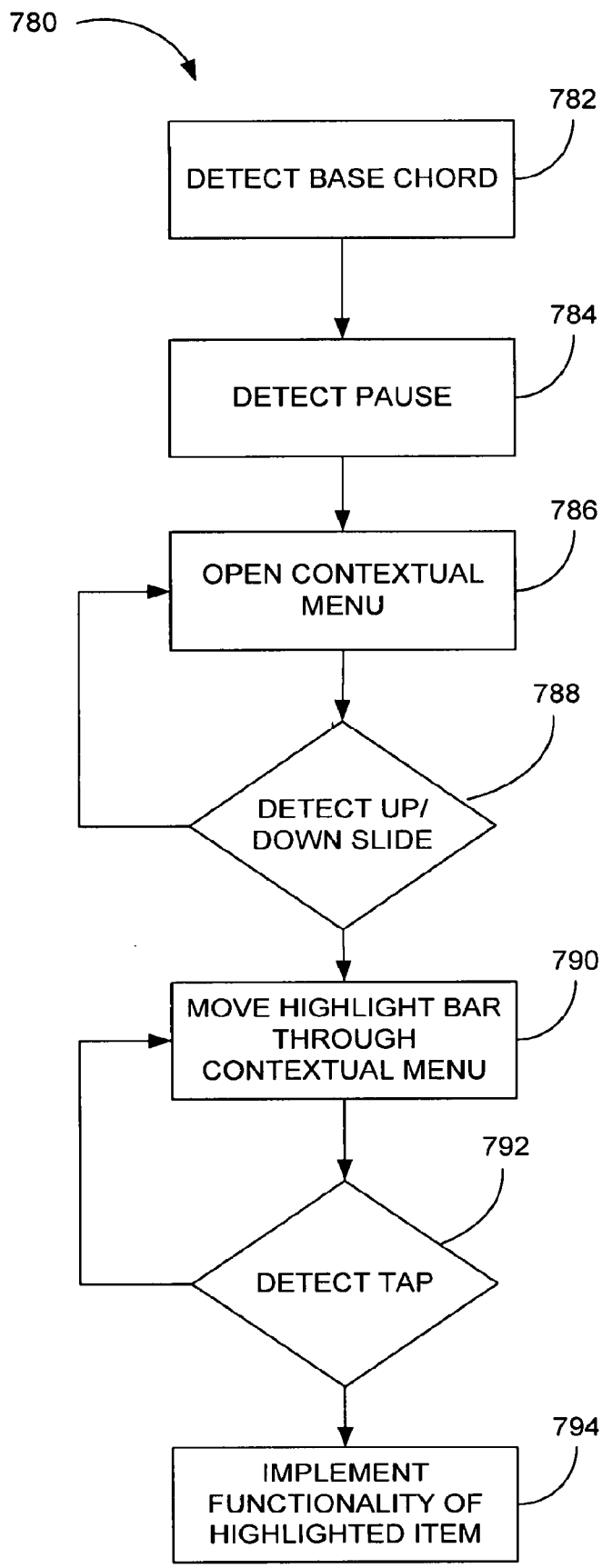
FIG. 41 shows an illustrative control operation, in accordance with one embodiment of the present invention.
Figure 45:
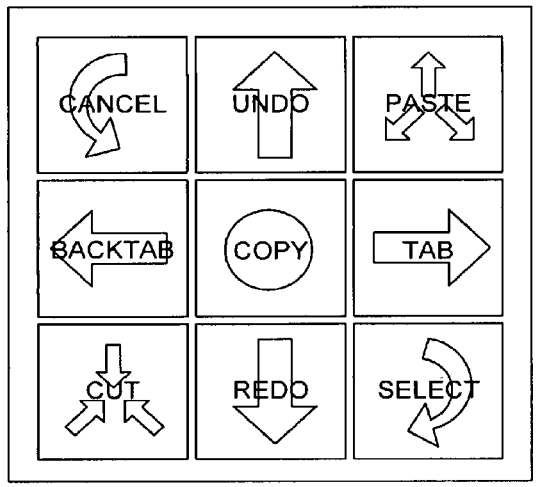
FIG. 45 is a diagram of a gesture set, in accordance with one embodiment of the present invention.
Figure 46:
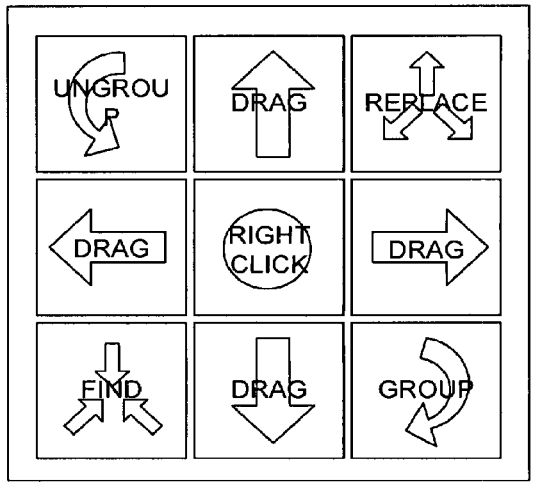
FIG. 46 is a diagram of a gesture set, in accordance with one embodiment of the present invention.
Figure 47:
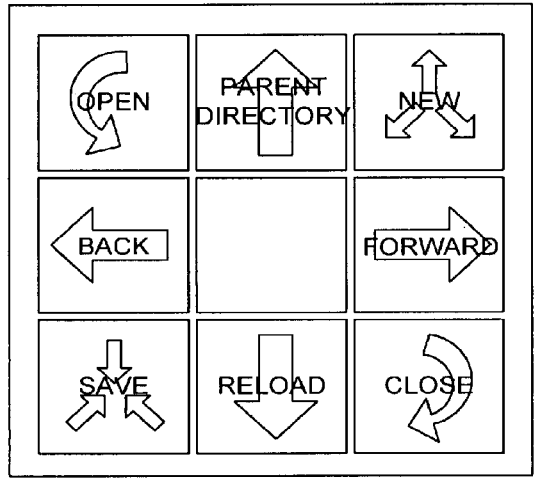
FIG. 47 is a diagram of a gesture set, in accordance with one embodiment of the present invention.
Figure 48:
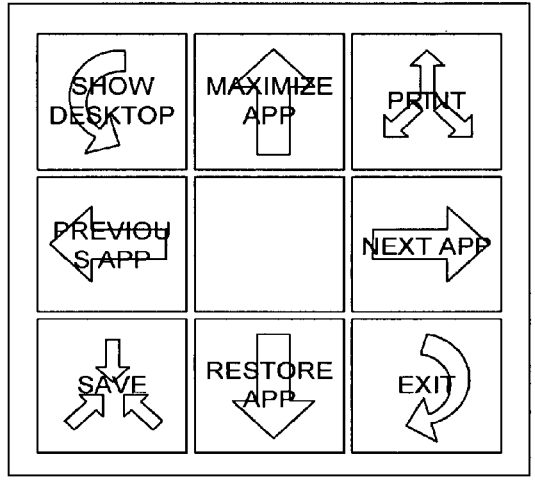
FIG. 48 is a diagram of a gesture set, in accordance with one embodiment of the present invention.

FIG. 41 shows illustrative control operation 780, in accordance with one embodiment of the present invention. The control operation may start at block 782 where a base chord is detected. The base chord may for example be three finger chord. During the touch stroke, a pause is detected (block 784). Thereafter, in block 786, a contextual menu can be opened due to the pause of the base chord. Thereafter, in block 788, a determination can be made as to whether or not an up or down slide is detected. If so, the operation can proceed to block 790 where a highlight bar is moved though the contextual menu in accordance with the sliding motion. Thereafter, in block 792, a determination can be made as to whether or not a tap is detected. If so, the operation can proceed to block 794 where the functionality of the highlighted item is implemented.

Dashboard is home to widgets: mini-applications that let you perform common tasks and provide you with fast access to information. With a swipe, Dashboard can appear, complete with widgets that bring a user a world of information—real-time weather, stock tickers, flight information and more—instantly. Dashboard can disappear just as easily, so that a user can get back to what they were doing. Dashboard is manufactured by Apple Computer of Cupertino, Calif.

Expose allows users to instantly access any open window with a single swipe—and stunning style that can never be imitated. Display all open windows as thumbnails, view windows of the current application or hide all windows to quickly locate a file on your desktop. Expose is manufactured by Apple Computer of Cupertino, Calif.

FIGS. 42-44 show various gesture maps, in accordance with multiple embodiments of the present invention. Each Figure includes four headings: 1) hand, 2) # of fingers (chord), 3) gesture event, and 4) behavior or action associated with gesture event.

FIGS. 45-48 show various gesture sets, in accordance with several embodiments of the present invention. In all of these Figures, the gesture sets include various motions shown by arrows (swipes, rotations, spread/contract), and one or more taps shown by circles. They also can include commands which are tied to the motions that they lie over. The gesture sets can be applied to different chords depending on the users needs. In one example, the gesture set of FIG. 45 may be applied to a Thumb+1 finger chord, the gesture set of FIG. 46 may be applied to a thumb+2 finger chord, the gesture set of FIG. 47 may be applied to a thumb+3 finger chord, and the gesture set of FIG. 48 may be applied to a spread thumb and 3 finger chord. It should be understood that the gesture sets as well as the chords are made by way of example and not by way of limitation. For example, in case of the gesture sets, different commands may be used, different gesture events may be used, different assignments may be used, etc.

Additional embodiments that are related FIGS. 8-11 will now be described.

Figure 49:
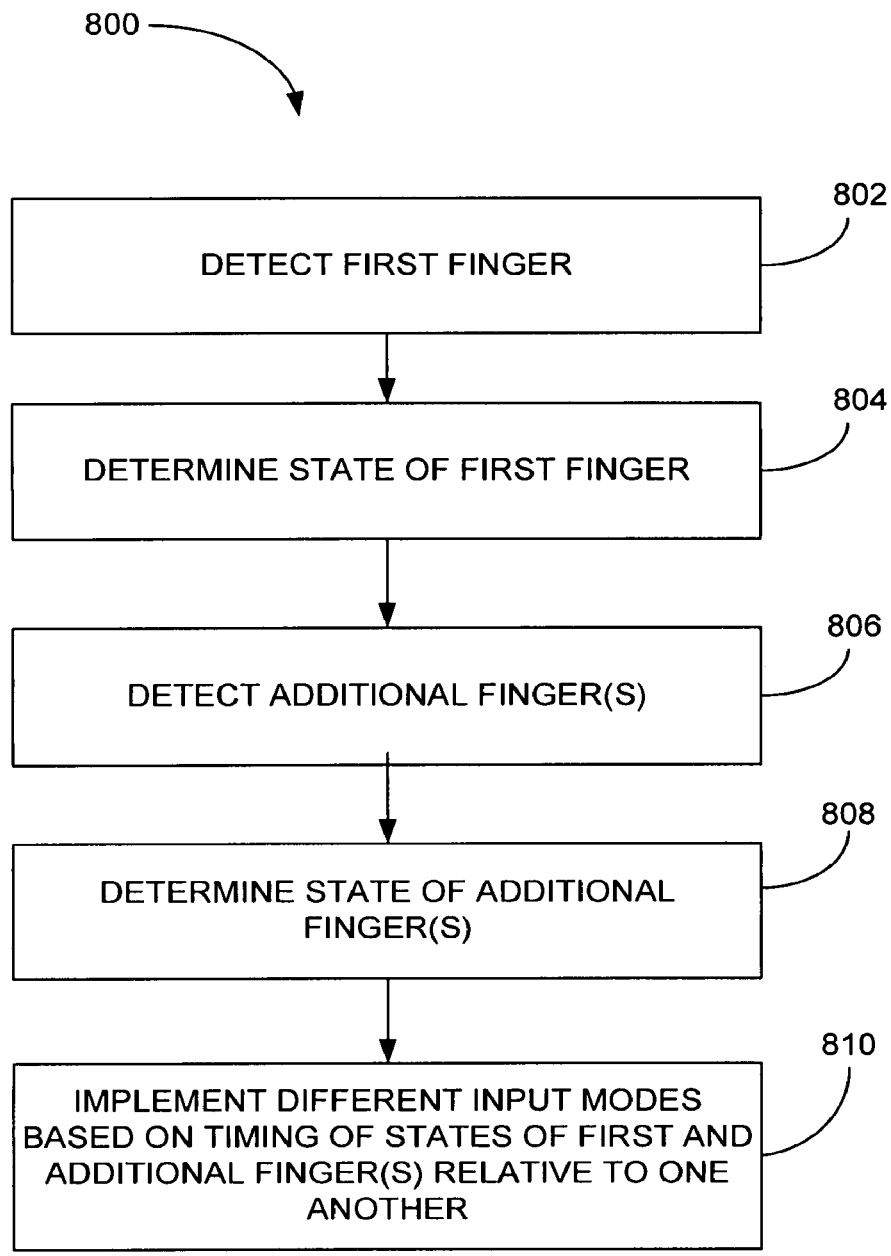
FIG. 49 shows an illustrative gesture operation, in accordance with one embodiment of the present invention.

FIG. 49 shows illustrative gesture operation 800, in accordance with one embodiment of the present invention. The operation 800 may begin at block 802 where only a first finger is detected. Thereafter, in block 804, the state of the first finger can be determined. The state may for example correspond to a particular orientation of the finger, the position of the finger relative to the touch surface, whether the finger is moving or stationary, the direction of finger motions and the like. Thereafter, in block 806, one or more additional fingers can be detected. For example, besides the first finger, a different second finger may be detected. In block 808, the state of the one or more additional fingers can be determined. Thereafter, in block 810, different input modes can be implemented based on timing of states of fist and additional fingers relative to one another. The different input modes can be widely varied, and may be selected form any of those discussed herein or any suitable or known input mode. One example of an input mode may be a pointing mode or dragging mode. Other modes may for example include scrolling, panning and the like.

In one example, the state of the first finger can include stationary or moving, and the state of a second finger can include whether the second finger is present or not. In this example, pointing operations can be implemented if only the first finger is detected. Furthermore, pointing operations can be switched to dragging operations if the second finger is detected when the first finger is stationary, and pointing operations are maintained if the second finger is detected when the first finger is moving. In so doing, a user can easily switch back and forth between pointing and dragging operations. For example, the user may move one finger over the touch surface to position it or a cursor over a file folder (e.g., pointing), stop the finger or cursor over the file folder, place a second finger down on the touch surface thus indicating that the file folder is desired to be dragged, and then move their first finger to another location to drag the file folder to a new location. The user can keep moving their finger and thus the file folder around, or simply pick up the first finger to finally locate the file fold within the screen.

Figure 50:
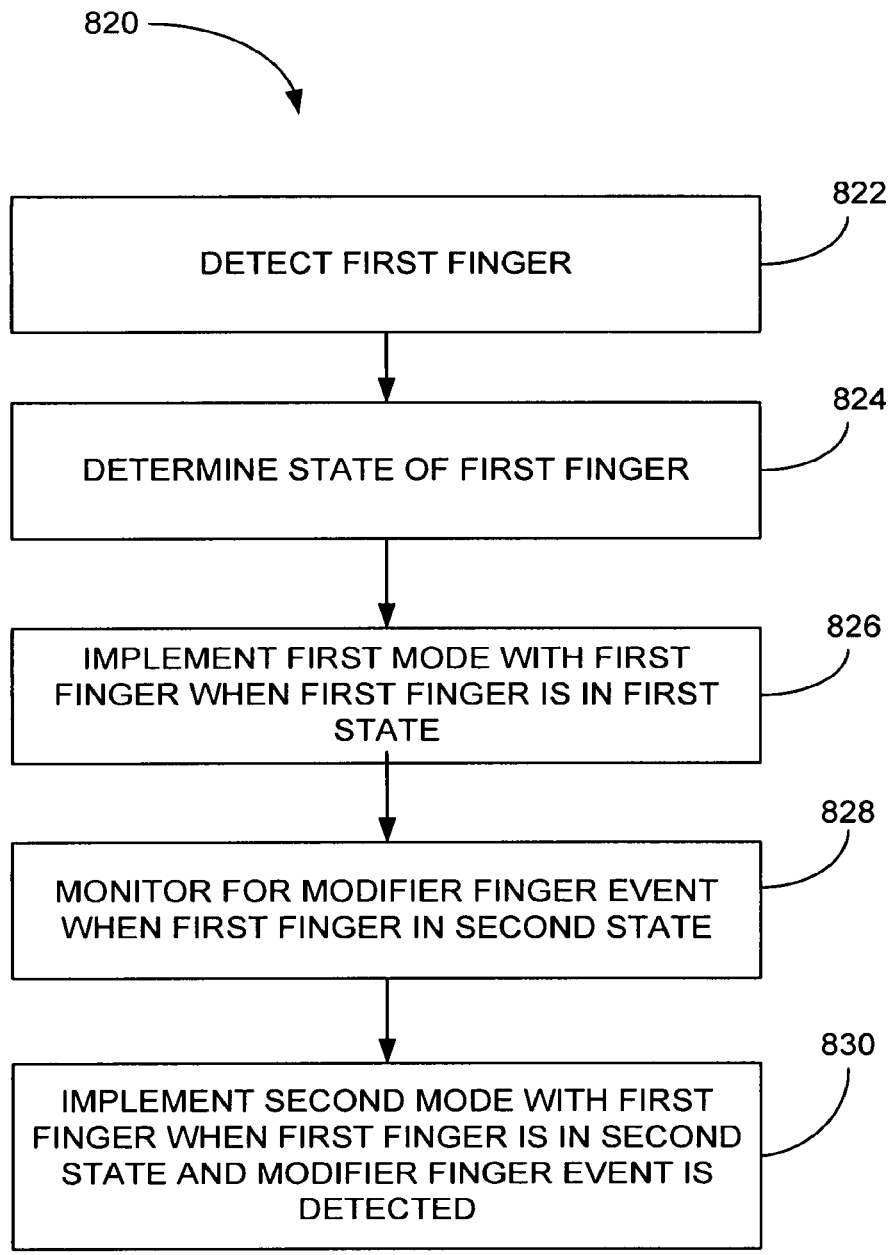
FIG. 50 shows an illustrative gesture operation, in accordance with one embodiment of the present invention.

FIG. 50 shows illustrative gesture operation 820, in accordance with one embodiment of the present invention. The operation 820 may begin at block 822 where only a first finger is detected. Thereafter, in block 824, the state of the first finger can determined. The state may for example correspond to a particular orientation of the finger, the position of the finger relative to the touch surface, whether the finger is moving or stationary, the direction of finger motions and the like. Thereafter, in block 826, a first input mode can be implemented with the first finger when the first finger is in a first state. In block 828, a modifier finger event can be monitored for. The modifier finger event may be provided by a finger other than the first finger. It may for example be a second finger. The event may be the presence of the second finger or it may be some type of gesturing event, or a specific chord. Thereafter, in block 830, a second can be implemented when the first finger is in second state and the modifier finger event is detected. The modifier event may for example be the presence of a second finger next to the first finger. In one example, the first mode is a pointing mode and the second mode is a dragging mode. Of course, the embodiment can be applied to other modes as needed.

Figure 51:
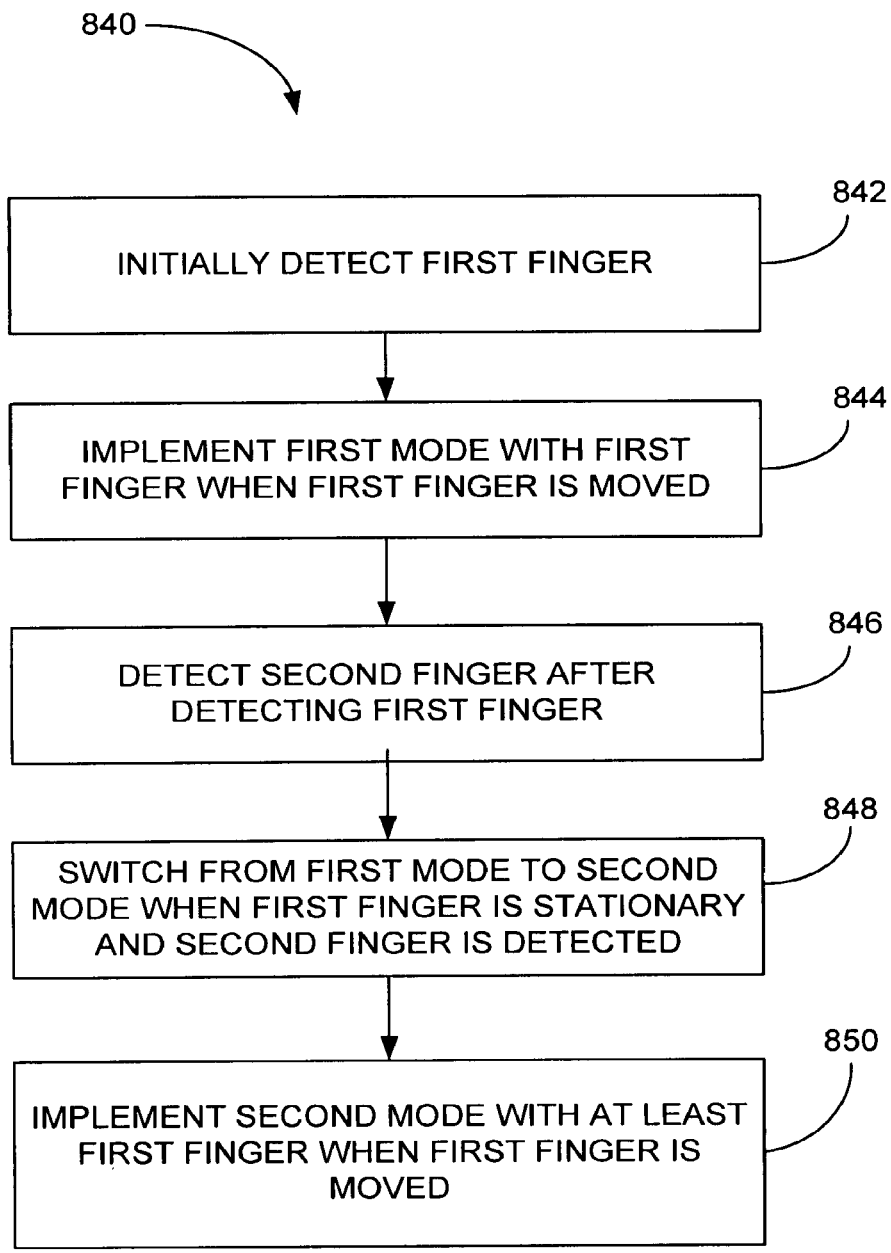
FIG. 51 shows an illustrative gesture operation, in accordance with one embodiment of the present invention.

FIG. 51 shows illustrative gesture operation 840, in accordance with one embodiment of the present invention. The operation 840 may begin at block 842 where a first finger is initially detected. Thereafter, in block 844, a first mode associated with the first finger can be implemented when the first finger is moved. Thereafter, in block 826, a second finger can be detected after the first finger is detected. In block 828, the first mode can be switched to a second mode when the first finger is stationary and the presence of a second finger is detected. The presence of the second finger may be location specific as for example to a specific location of the touch surface or a specific location relative to the first finger. In one example, the second finger should be detected proximate to the first finger. Thereafter, in block 830, the second mode can be implemented with at least the first finger when the first finger is moved. In one example, the first mode can be a pointing mode and the second mode can be a dragging mode. Of course, the embodiment can be applied to other modes as needed.

Figure 52:
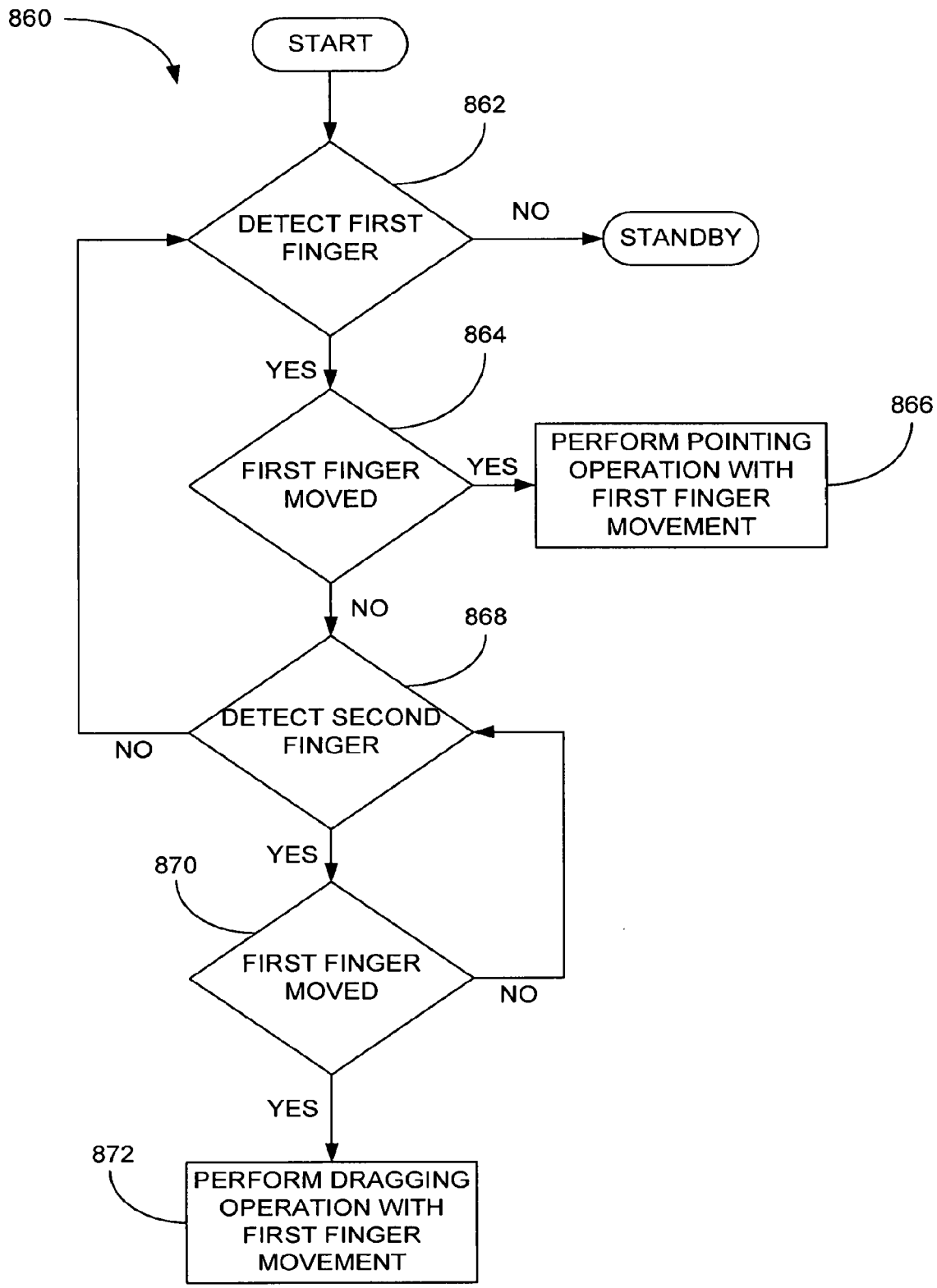
FIG. 52 shows an illustrative gesture operation, in accordance with one embodiment of the present invention.

FIG. 52 shows illustrative gesture operation 860, in accordance with one embodiment of the present invention. The operation 860 may begin at block 862 where a determination is made as to whether a single finger is detected. The single finger may be identified or not depending on the needs of the system. For example, in some cases, the operations may only be implemented if a specified finger is identified while in other cases, the method may be implemented if any single finger is detected If a single finger is detected, the operation can proceeds to block 864 where a determination is made as to whether or not the finger is moved. If the finger is moved, in block 866, pointing operations can be performed with first finger movement. If the first finger is no longer detected, the pointing operations may end. If the finger is not moved, in block 868, a determination can be made as to whether or not a second finger is detected while the first finger is stationary. If not, the operation can proceed back to block 862. If so, the operation can proceed to block 870 where a determination is made as to whether or not the first finger is moved after detecting the second finger. The second finger may or may not be required to move with the first finger. In most cases, the second finger can be picked up so that it is no longer detected. If the first finger is not moved, the operation can proceed back to block 868. If the first finger is moved, the operation can proceed to block 872 where dragging operations are performed in accordance with the first finger movement. If the first finger is no longer detected, the dragging operations can end.

Figure 53:
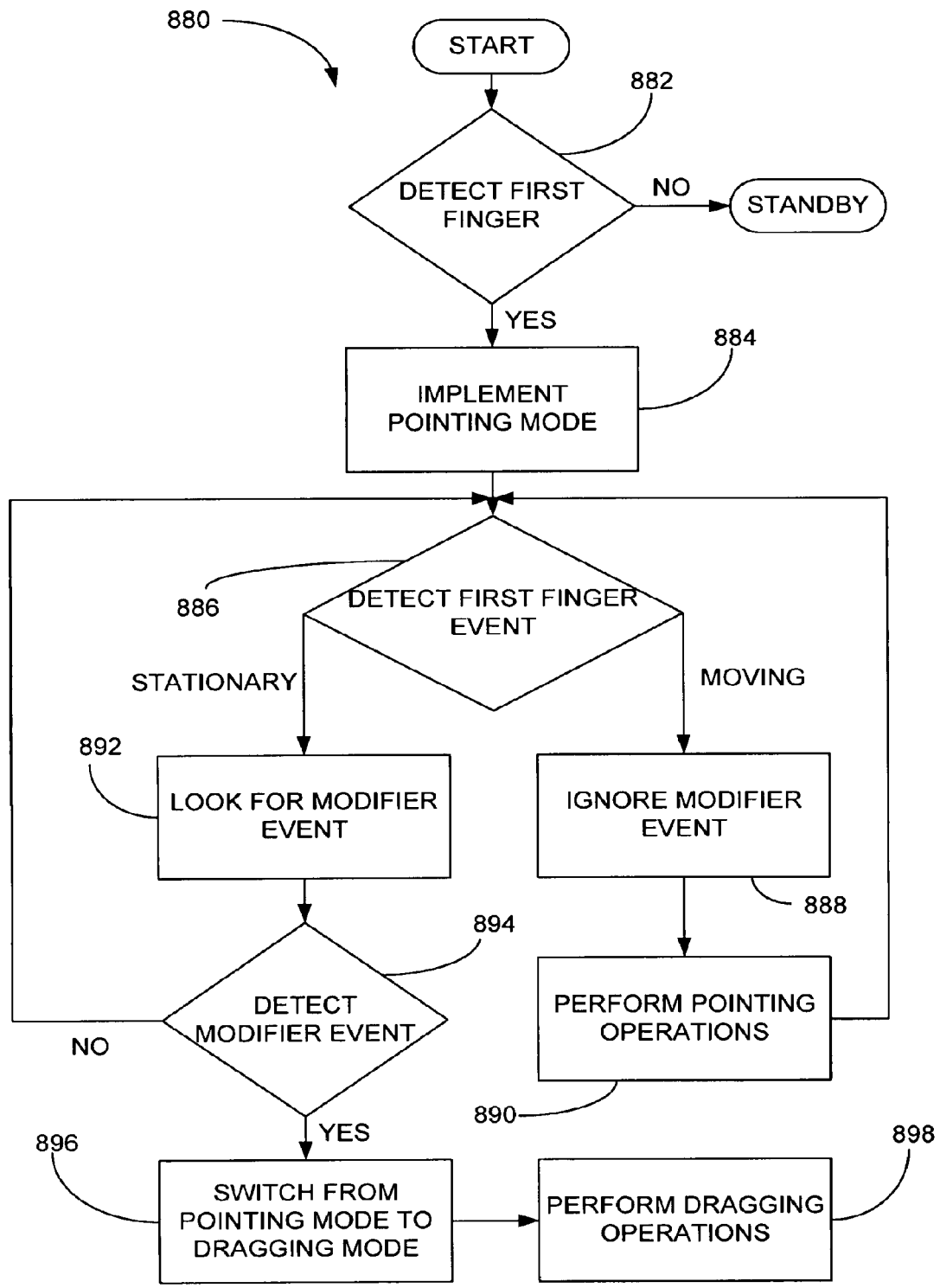
FIG. 53 shows an illustrative gesture operation, in accordance with one embodiment of the present invention.

FIG. 53 shows illustrative gesture operation 880, in accordance with one embodiment of the present invention. The operation 880 may begin at block 882 where a determination is made as to whether a first finger is detected. The first finger may be identified or not depending on the needs of the system. For example in some cases, the operation may only be implemented if a specified finger is identified while in other cases, the operation may be implemented if any single finger is detected. If a finger is detected, the operation can proceed to block 884 where a pointing mode is implemented. Thereafter, in block 886, a determination can be made as to whether or not the finger is moved. If the finger is moved, in block 888, subsequent modifier events may be ignored. For example, additional detected fingers can be ignored and only the movement of the first finger may be relevant. Thereafter, in block 890, pointing operations can be performed in accordance with the moving finger. If the first finger is no longer detected, the pointing operations can end. If the first finger is stationary, the operation can proceed to block 892 where a modifier event is looked for. A modifier event may for example be the addition of a finger, or a gesture made by a new finger, etc. Thereafter, in block 894, a determination can be made as to whether or not a specific modifier event is detected. If not, the operation can proceed back to block 886. If so, the operation can proceed to block 896 where the system is switched from pointing mode to a dragging mode. If the first finger is moved, the operation can proceed to block 898 where dragging operations are performed in accordance with the first finger movement. If the first finger is no longer detected, the dragging operations can end.

Figure 54:
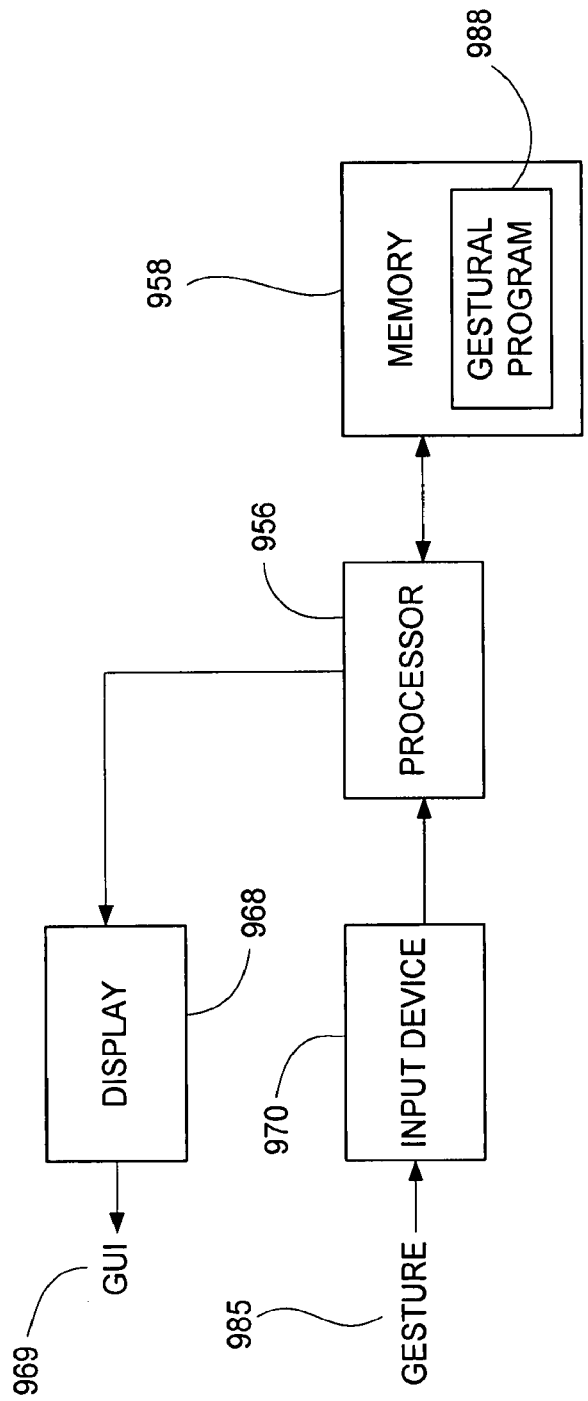
FIG. 54 shows an illustrative block diagram of an electronic system, in accordance with one embodiment of the present invention.

FIG. 54 shows illustrative electronic system 950, in accordance with one embodiment of the present invention. The electronic system may be configured with any of the previous embodiments. The electronic system 950 may correspond to a computer system such as a personal computer system that includes desktops, laptops, tablets or handheld computers. The electronic system may also correspond to other consumer electronic devices such as handheld devices including cell phones, PDAs, dedicated media players, and the like. Of course, the electronic system can be applied to other electronic devices.

The exemplary system 950 shown in FIG. 54 can include a processor 956 configured to execute instructions and to carry out operations associated with the system 950. For example, using instructions retrieved for example from memory, the processor 956 may control the reception and manipulation of input and output data between components of the computing system 950. The processor 956 can be implemented on a single-chip, multiple chips or multiple electrical components. For example, various architectures can be used for the processor 956, including dedicated or embedded processor, single purpose processor, controller, ASIC, and so forth.

In most cases, the processor 956 together with an operating system may operate to execute computer code and produce and use data. Operating systems are generally well known and will not be described in greater detail. By way of example, the operating system may correspond to OS/2, DOS, Unix, Linux, Palm OS, and the like. The operating system can also be a special purpose operating system, such as may be used for limited purpose appliance-type computing devices. The operating system, other computer code and data may reside within a memory block 958 that is operatively coupled to the processor 956. Memory block 958 can provide a place to store computer code and data that are used by the system 950. By way of example, the memory block 958 may include Read-Only Memory (ROM), Random-Access Memory (RAM), hard disk drive and/or the like. The information can also reside on a removable storage medium and loaded or installed onto the system 950 when needed. Removable storage mediums include, for example, CD-ROM, PC-CARD, memory card, floppy disk, magnetic tape, and a network component.

The system 950 can also include a display device 968 that is operatively coupled to the processor 956. The display device 968 may be a liquid crystal display (LCD) (e.g., active matrix, passive matrix and the like). Alternatively, the display device 968 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The display device 968 can be configured to display a graphical user interface (GUI) 969 that provides an easy to use interface between a user of the system and the operating system or application running thereon. Generally speaking, the GUI 969 represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI 969 can additionally or alternatively display information, such as non interactive text and graphics, for the user on the display device 968.

The system 950 can also includes one or more input devices 970 that are operatively coupled to the processor 956. The input devices 970 can be configured to transfer data from the outside world into the system 950. The input devices 970 may be integrated with the system 950 or they maybe separate components (e.g., peripheral devices). In some cases, the input devices 970 may be connected to the system 950 through wired connections (e.g., cables/ports). In other cases, the input devices 970 may be connected to the system 50 through wireless connections. By way of example, the data link may correspond to PS/2, USB, IR, RF, Bluetooth or the like.

The input device(s) 970 may for example be used to perform tracking and to make selections with respect to the GUI 969 on the display 968. The input device 970 may also be used to issue commands in the system 950.

In one embodiment, the input devices 970 may include a touch sensing device configured to receive input from a user's touch and to send this information to the processor 56. By way of example, the touch-sensing device may correspond to a touchpad, a touch screen and/or a touch sensitive housing.

In many cases, the touch-sensing device can recognize touches (or near touches), as well as the position and magnitude of touches on a touch sensitive surface. The touch sensing means can report the touches to the processor 956 and the processor 956 can interpret the touches in accordance with its programming. For example, the processor 956 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like.

Furthermore, the touch sensing means may be based on single point sensing or multipoint sensing. Single point sensing is capable of only distinguishing a single touch, while multipoint sensing is capable of distinguishing multiple touches that occur at the same time. Alternatively or additionally, proximity sensing devices may be used. Proximity sensing devices are capable of sensing objects in space rather than on a touch surface.

In one embodiment, the input devices 970 can include a multipoint input device. Multipoint input devices have advantages over conventional single point devices in that they can distinguish more than one object (finger) at the same time. By way of example, a multipoint device, which can be used herein, is shown and described in greater detail in U.S. patent application Ser. No. 10/840,862 and 11/015,434, both of which are herein incorporated by reference.

In accordance with one embodiment of the present invention, the system 950 can be designed to recognize gestures 985 applied to one or more of the input devices 970 (particularly touch devices) and to control aspects of the system 950 based on the gestures 985. As previously noted, a gesture may be defined as a stylized interaction with an input device that is mapped to one or more specific computing operations. The gestures 985 may be made through various hand, and more particularly finger motions. Alternatively or additionally, the gestures may be made with a stylus. In all of these cases, at least one of the input devices 970 such as a touch device can receives the gestures 985 and the processor 956 can execute instructions to carry out operations associated with the gestures 985. In addition, the memory block 958 may include a gesture operational program 988, which maybe part of the operating system or a separate application. The gestural operation program 988 can include a set of instructions that recognizes the occurrence of gestures 985 and informs one or more software agents of the gestures 985 and/or what action(s) to take in response to the gestures 985.

When a user performs one or more gestures, the input device 970 can relay gesture information to the processor 956. Using instructions from memory 958, and more particularly, the gestural operational program 988, the processor 956 can interpret the gestures 985 and controls different components of the system 950, such as memory 958, a display 968 based on the gestures 985. The gestures 985 maybe identified as commands for performing actions in applications stored in the memory 958, modifying GUI objects shown on the display 968, modifying data stored in memory 958, and/or for performing actions in I/O devices. By way of example, the commands may be associated with zooming, panning, scrolling, paging, rotating, sizing, and the like. As further examples, the commands may also be associated with launching a particular program, opening a file or document, viewing a menu, making a selection, executing instructions, logging onto the computer system, permitting authorized individuals access to restricted areas of the computer system, loading a user profile associated with a user's preferred arrangement of the computer desktop, and/or the like.

In one embodiment, the number of fingers in contact with the input device may indicate an input mode. For example, a single touch as for example by a single finger may indicate the desire to perform tracking, i.e., pointer or cursor movements, or selections, whereas multiple touches as for example by a group of fingers may indicate the desire to perform other gestures. The number of fingers for implementing gesturing may be widely varied. By way of example, two fingers may indicate a first input mode, three fingers may indicate a third input mode, etc. Alternatively, any number of fingers, i.e., more than one, may be used for the same input mode, which can include one or more gesture controls. The orientation of the fingers may similarly be used to denote the desired mode. The profile of the finger maybe detected to permit different modal operations based on whether the user has used his thumb or index finger, for example.

In one particular embodiment, a single finger can initiate tracking (or selection) and two or more fingers in close proximity to one another can initiate scrolling or panning. Two fingers can provide easy toggling between one and two fingers, i.e., the user can switch between modes very easily by simply picking or placing an additional finger. This has the advantage of being more intuitive than other forms of mode toggling. During tracking, cursor movement can be controlled by the user moving a single finger on the touch sensitive surface of a touch sensing device. The sensor arrangement of the touch sensing device can interpret the finger motion and generate signals for producing corresponding movement of the cursor on the display. During scrolling, screen movement can be controlled by the user moving dual fingers on the touch sensitive surface of the touch sensing device. When the combined fingers are moved in the vertical direction, the motion can be interpreted as a vertical scroll event, and when the combined fingers are moved in the horizontal direction, the motion can be interpreted as a horizontal scroll event. The same can be said for panning although panning can occur in all directions rather than just the horizontal and vertical directions.

In some examples, a gesture operation can be performed based on one or more selected contacts, with additional contacts being ignored. The selection of the one or more contacts can be based on the motion of the contacts. For example, one or more contacts having significant motion compared to the remaining contacts can be selected for a scrolling gesture or a zooming gesture, and any motion of the remaining contacts can be ignored. As the motion of the contacts changes, different contacts can be selected. For example, if a second contact having the maximum motion of all the contacts has significantly more motion than the currently-selected first contact, then the second contact can be selected instead and the gesture operation can continue based on the motion of the second contact. These examples may also apply to gestures of any number of fingers, including four- and five-finger gestures.

Figure 55:
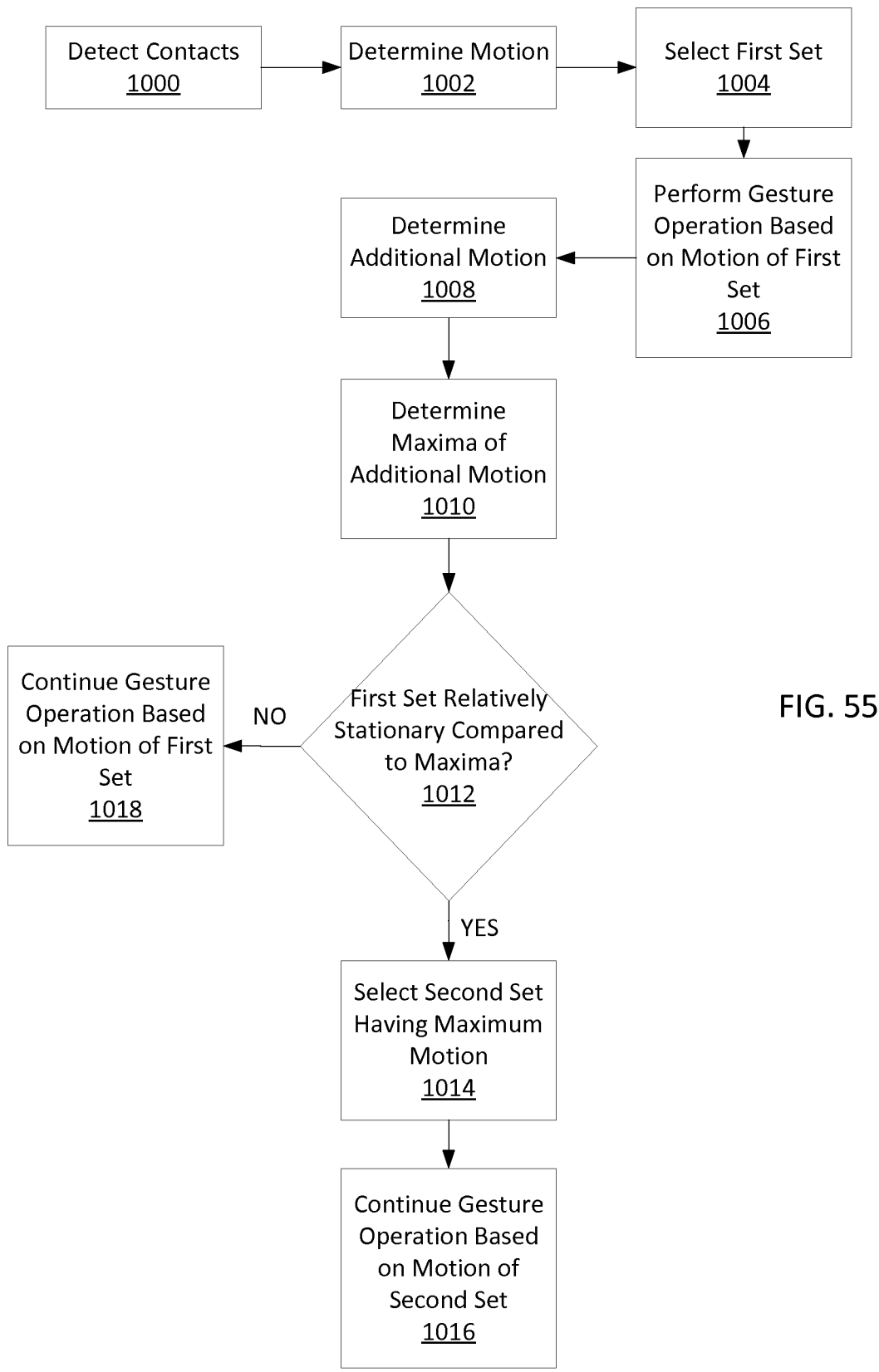
FIG. 55 illustrates an exemplary method of selecting a set of one or more contacts for a gesture operation according to some examples of the disclosure.

FIG. 55 illustrates an exemplary method of selecting a set of one or more contacts for a gesture operation according to some examples of the disclosure. First, a plurality of contacts can be detected (step 1000). The plurality of contacts can correspond to touches in a multipoint sensing area of a multipoint sensing device. A motion of each of the contacts can be determined (step 1002). The motion can include position changes, velocity, and/or acceleration, among other possibilities. A first set of one or more contacts can be selected for a gesture operation (step 1004). In some examples, the selection can be based on the motion of each of the contacts. For example, a velocity of each contact can be determined and the contact with the highest velocity can be selected, or a change in position of each contact can be determined with respect to a previous point in time, and the one or more contacts with the greatest change in position can be selected. In some examples, the selection can be based on other criteria. Gesture operations can include, scrolling, panning, zooming, rotating, swiping, and the like. The gesture operation can be performed based on the motion of the selected first set of contacts (step 1006). For example, a scrolling operation can be performed based on the motion of a selected contact, or a zooming operation can be performed based on the motion of two selected contacts.

Additional motion of each of the contacts can be determined (step 1008). The selected contacts can change based on this additional motion. In some examples, one or more maxima of the additional motion can be determined (step 1010). For example, the fastest contact can be determined, or the fastest two contacts can be determined. In some examples, a change in position can be determined for each contact with respect to a previous point in time, and one or more contacts with the greatest change in position can be determined. Then, it can be determined whether the currently-selected one or more contacts of the first set are relatively stationary compared to the one or more maxima (step 1012). This determination can be based on a comparison between the one or more maxima and the one or more contacts of the first set. In some examples, the comparison can include comparing a motion of the first set to a scalar multiple of a motion of the maxima. For example, if a currently-selected contact of the first set has a change in position less than a scalar multiple of a change in position of one of the maxima contacts, then the currently-selected contact of the first set can be determined to be relatively stationary compared to the one or more maxima. The scalar multiple can be less than 1, so that the motion of the first set can be compared to a fraction of the motion of the maxima. This determination can further include additional comparisons between contacts of the currently-selected first set and the one or more maxima.

If the first set is determined not to be relatively stationary compared to the one or more maxima (step 1012), then the first set can continue to be selected and the gesture operation can be continued based on the motion of the first set (step 1018). However, if the first set is determined to be relatively stationary compared to the one or more maxima (step 1012), then a second set of contacts can be selected, at least one contact of the second set having a maximum motion (step 1014). For example, if one or more maxima are determined, then at least one contact having a maximum motion can be selected in the second set. Then, the gesture operation can be continued based on motion of the second set instead of the first set (step 1016). In some examples, motion of the first set can be subsequently ignored.

In some examples, the motion of the one or more maxima may be compared to motion of one or more of the plurality of contacts. One or more of the plurality of contacts may be determined to be relatively stationary compared to the one or more maxima in a manner as discussed above. Subsequent motion of the contacts determined to be relatively stationary may be subsequently. In some examples, a liftoff of the currently-selected set of contacts may be detected. In such a case, if the only remaining contacts have been determined to be relatively stationary, then the gesture operation may be ended and/or the motion of the remaining contacts may be subsequently ignored.

The embodiments described herein can be implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several embodiments, there are alterations, permutations, and equivalents, which fall within the scope of this invention. For example, although the invention is primarily directed at touch devices, it should be noted that the invention may also be implemented with proximity sensing devices. In addition, methods may be implemented to automatically synching gesture preferences across multiple devices. For example, when a palm device is connected to a host computer. It should also be noted that there are many alternative ways of implementing the methods and apparatuses of the present invention. For example, although the invention has been primarily directed at methods associated with multipoint sensing devices, it should be noted that some of the methods may be directed at single point sensing devices. It is therefore intended that the following appended claims be interpreted as including all such alterations, permutations, and equivalents as fall within the true spirit and scope of the present invention.

What is claimed is:
1. A method comprising:
   detecting a plurality of contacts corresponding to touches in a multipoint sensing area of a multipoint sensing device;
   determining a motion of the plurality of contacts;
   selecting a first set of one or more of the plurality of contacts;
   performing a gesture operation based on the motion of the first set;
   determining additional motion of the plurality of contacts;
   determining a maximum motion from the additional motion;
   comparing the maximum motion to the additional motion of the first set;
   based on the comparison, selecting a second set of one or more of the plurality of contacts, at least one contact of the second set having the maximum motion; and
   continuing the gesture operation based on the motion of the second set.
2. The method of claim 1, further comprising:
   comparing the maximum motion to the additional motion of one or more of the plurality of contacts;
   detecting a liftoff of the second set; and
   ending the gesture operation based on the liftoff of the second set and further based on the comparison of the maximum motion to the additional motion of one or more of the plurality of contacts.
3. The method of claim 1, further comprising:
   comparing the maximum motion to the additional motion of one or more of the plurality of contacts;
   detecting a liftoff of the second set and continued contact of a subset of the plurality of contacts; and
   ignoring motion of the subset based on the comparison of the maximum motion to the additional motion of one or more of the plurality of contacts.
4. The method of claim 1, wherein determining additional motion of the plurality of contacts includes determining a change in position of the plurality of contacts.
5. The method of claim 1, wherein determining a maximum motion from the additional motion includes determining the greatest change in position of the plurality of contacts.
6. The method of claim 1, wherein comparing the maximum motion to the additional motion of the first set includes comparing a scalar multiple of the maximum motion to the additional motion of the first set.
7. The method of claim 1, further comprising:
   determining that one or more contacts of the first set are relatively stationary based on the comparison of the maximum motion to the additional motion of the first set;
   wherein the selecting of the second set is further based on the determination that one or more contacts of the first set are relatively stationary.
8. The method of claim 1, wherein the gesture operation is one of scrolling, panning, zooming, rotating, and swiping.

9. An electronic system comprising:
a multipoint sensing device that provides a multipoint sensing area for receiving inputs detecting a plurality of contacts corresponding to touches in the multipoint sensing area; and
a gesture module configured to perform a gesture operation by
determining a motion of the plurality of contacts,
selecting a first set of one or more of the plurality of contacts,
performing the gesture operation based on the motion of the first set,
determining additional motion of the plurality of contacts,
determining a maximum motion from the additional motion,
comparing the maximum motion to the additional motion of the first set,
based on the comparison, selecting a second set of one or more of the plurality of contacts, at least one contact of the second set having the maximum motion, and
continuing the gesture operation based on the motion of the second set.

10. The electronic system of claim 9, wherein the gesture module is further configured to perform the gesture operation by:
comparing the maximum motion to the additional motion of one or more of the plurality of contacts;
detecting a liftoff of the second set; and
ending the gesture operation based on the liftoff of the second set and further based on the comparison of the maximum motion to the additional motion of one or more of the plurality of contacts.

11. The electronic system of claim 9, wherein the gesture module is further configured to perform the gesture operation by:
comparing the maximum motion to the additional motion of one or more of the plurality of contacts;
detecting a liftoff of the second set and continued contact of a subset of the plurality of contacts; and
ignoring motion of the subset based on the comparison of the maximum motion to the additional motion of one or more of the plurality of contacts.

12. The electronic system of claim 9, wherein determining additional motion of the plurality of contacts includes determining a change in position of the plurality of contacts.

13. The electronic system of claim 9, wherein determining a maximum motion from the additional motion includes determining the greatest change in position of the plurality of contacts.

14. The electronic system of claim 9, wherein comparing the maximum motion to the additional motion of the first set includes comparing a scalar multiple of the maximum motion to the additional motion of the first set.

15. The electronic system of claim 9, wherein the gesture module is further configured to perform the gesture operation by:
determining that one or more contacts of the first set are relatively stationary based on the comparison of the maximum motion to the additional motion of the first set;
wherein the selecting of the second set is further based on the determination that one or more contacts of the first set are relatively stationary.

16. The electronic system of claim 9, wherein the gesture operation is one of scrolling, panning, zooming, rotating, and swiping.

* * * * *